United States Patent
Pei et al.

(10) Patent No.: US 12,020,857 B2
(45) Date of Patent: Jun. 25, 2024

(54) COIL MODULE, WIRELESS CHARGING TRANSMITTING APPARATUS, WIRELESS CHARGING RECEIVING APPARATUS, WIRELESS CHARGING SYSTEM, AND TERMINAL

(71) Applicant: Huawei Technologies Co., Ltd., Shenzhen (CN)

(72) Inventors: Changsheng Pei, Dongguan (CN); Yongfa Zhu, Dongguan (CN); Zhiqiang Zeng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 668 days.

(21) Appl. No.: 17/155,579

(22) Filed: Jan. 22, 2021

(65) Prior Publication Data
US 2021/0142942 A1 May 13, 2021

Related U.S. Application Data

(63) Continuation of application No. PCT/CN2019/089310, filed on May 30, 2019.

(30) Foreign Application Priority Data

Aug. 4, 2018 (CN) .......... 201810881202.X
Feb. 12, 2019 (CN) .......... 201910111453.4

(51) Int. Cl.
*H01F 38/14* (2006.01)
*H01F 27/28* (2006.01)
(Continued)

(52) U.S. Cl.
CPC .......... *H01F 38/14* (2013.01); *H01F 27/2871* (2013.01); *H01F 27/29* (2013.01); *H02J 7/02* (2013.01); *H02J 50/10* (2016.02)

(58) Field of Classification Search
CPC ...... H01F 38/14; H01F 27/2871; H01F 27/29; H02J 50/10; H02J 7/02
(Continued)

(56) References Cited

U.S. PATENT DOCUMENTS 9,165,708 B2 10/2015 Lim et al.
9,912,174 B2 3/2018 Soar
(Continued)

FOREIGN PATENT DOCUMENTS

CN 103366931 B 11/2016
CN 107045933 A 8/2017
(Continued)

OTHER PUBLICATIONS

Kim, J.H. et al., "New Structure for High Q-Factor Printed Antenna in Wireless Power Transmission," IEEE EUROCON, Jul. 6-8, 2017 5 pages.

*Primary Examiner* — Richard V Muralidar
(74) *Attorney, Agent, or Firm* — SLATER MATSIL, LLP

(57) ABSTRACT

A coil module includes a first planar coil winding and a second planar coil winding. A first coil of the first planar coil winding includes a first outer side part and a first inner side part. A first coil of the second planar coil winding includes a second outer side part and a second inner side part. An end part of the first outer side part is connected to an end part of the second inner side part, and an end part of the second outer side part is connected to an end part of the first inner side part.

20 Claims, 26 Drawing Sheets

(51) Int. Cl.
  *H01F 27/29*    (2006.01)
  *H02J 7/02*     (2016.01)
  *H02J 50/10*    (2016.01)

(58) Field of Classification Search
  USPC .......................................... 320/108; 307/104
  See application file for complete search history.

(56)          References Cited

U.S. PATENT DOCUMENTS 10,504,648 B2 * 12/2019  Ryu .................. H01F 27/28
  2011/0133877 A1   6/2011  Chiu et al.
  2016/0126001 A1   5/2016  Chien et al.
  2018/0174746 A1*  6/2018  Ryu .................. H04B 5/0037
  2021/0012959 A1*  1/2021  Pei .................... H02J 50/10
  2021/0151250 A1*  5/2021  Zhu .................. H02J 50/10

FOREIGN PATENT DOCUMENTS

CN        107046333 A      8/2017
  CN        107230547 A     10/2017
  CN        107492436 A     12/2017
  CN        108321914 A      7/2018
  CN        109087791 A     12/2018
  CN        109961942 A      7/2019
  EP         0968505 B1      1/2005
  EP         3148047 A1      3/2017
  EP         3809430 A1      4/2021
  TW        200609961 A      3/2006
  TW          I598899 B      9/2017
  WO       2016010374 A1     1/2016
  WO       2017139092 A1     8/2017

* cited by examiner

COIL MODULE, WIRELESS CHARGING TRANSMITTING APPARATUS, WIRELESS CHARGING RECEIVING APPARATUS, WIRELESS CHARGING SYSTEM, AND TERMINAL

CROSS-REFERENCE TO RELATED APPLICATIONS

This application is a continuation of International Application No. PCT/CN2019/089310, filed on May 30, 2019, which claims priority to Chinese Patent Application No. 201810881202.X, filed on Aug. 4, 2018 and Chinese Patent Application No. 201910111453.4, filed on Feb. 12, 2019. The disclosures of the aforementioned applications are hereby incorporated by reference in their entireties.

TECHNICAL FIELD

This application relates to the field of wireless charging technologies, and in particular, to a coil module, a wireless charging transmitting apparatus, a wireless charging receiving apparatus, a wireless charging system, and a terminal.

BACKGROUND

Currently, charging an electronic device by using a wireless charging technology becomes increasingly popular. A device for implementing the wireless charging technology is referred to as a wireless charger. During specific implementation, a wireless charger is provided with a transmitting coil, an electronic device is provided with a receiving coil, an alternating current carried by the transmitting coil in the wireless charger generates a magnetic field, and the receiving coil in the electronic device generates a voltage through magnetic coupling, thereby charging the electronic device.

Because wireless charging is to transmit energy through magnetic coupling between a transmitting coil and a receiving coil, a very strong magnetic field exists between the transmitting coil and the receiving coil. In this case, if a coil winding of a wireless charging coil (that is, the transmitting coil or the receiving coil) is relatively wide, a relatively large eddy current loss is caused in the coil winding when the magnetic field passes through the coil winding. To resolve this problem, as shown in FIG. 1, a wireless charging coil usually includes a coil winding and a cutting opening, and the cutting opening segments the coil winding into two small windings with relatively small widths. Because a width of each small winding is less than a width of the coil winding before the segmentation, an eddy current loss of the coil module can be reduced.

However, after the cutting opening segments the coil winding into the two small windings with relatively small widths, as shown in FIG. 2, when a current I flows through the coil winding, a current $I_1$ and a current $I_2$ in a same direction respectively flow through the two small windings. In this case, if a magnetic field passes through the cutting opening, induced currents $I_E$ in different directions are respectively generated in the two small windings on two sides of the cutting opening due to electromagnetic induction. Consequently, a circulating current loss is caused in the coil winding, and wireless charging efficiency is reduced.

SUMMARY

This application provides a coil module, a wireless charging transmitting apparatus, a wireless charging receiving apparatus, a wireless charging system, and a terminal, to resolve a problem of relatively low wireless charging efficiency in the related art. The technical solutions are as follows.

According to a first aspect, a coil module is provided. The module includes a first planar coil winding and a second planar coil winding that are insulated from each other, and the first planar coil winding and the second planar coil winding each include a plurality of coils.

A first coil of the first planar coil winding includes a first outer side part and a first inner side part. An end part of the first coil of the first planar coil winding includes an end part of the first outer side part and an end part of the first inner side part. Between the first outer side part and the first inner side part, there is a gap extending along a coiling direction of the first coil of the first planar coil winding. A first coil of the second planar coil winding includes a second outer side part and a second inner side part. An end part of the first coil of the second planar coil winding includes an end part of the second outer side part and an end part of the second inner side part. Between the second outer side part and the second inner side part, there is a gap extending along a coiling direction of the first coil of the second planar coil winding. The end part of the first outer side part is connected to the end part of the second inner side part, and the end part of the second outer side part is connected to the end part of the first inner side part.

The first coil of the first planar coil winding is an innermost coil of the first planar coil winding, and the first coil of the second planar coil winding is an innermost coil of the second planar coil winding, or the first coil of the first planar coil winding is an outermost coil of the first planar coil winding, and the first coil of the second planar coil winding is an outermost coil of the second planar coil winding.

It should be noted that the first planar coil winding (or the second planar coil winding) is a conductive pattern formed by winding a conductor. The conductive pattern may be a circular ring, an elliptic ring, or the like. Any one of the plurality of coils included in the first planar coil winding (or the second planar coil winding) is formed by evenly winding the conductor 360 degrees.

In addition, the first planar coil winding and the second planar coil winding may be insulated from each other by using an insulating medium. The insulating medium between the first planar coil winding and the second planar coil winding is used to isolate the first planar coil winding from the second planar coil winding, so that parts of the first planar coil winding and the second planar coil winding other than mutually connected parts remain insulated from each other.

In this embodiment of this application, a serial cross-connection structure is formed between the first coil of the first planar coil winding and the first coil of the second planar coil winding. The end part of the first coil of the first planar coil winding is connected to the end part of the first coil of the second planar coil winding. Specifically, the end part of the first outer side part is connected to the end part of the second inner side part, and the end part of the first inner side part is connected to the end part of the second outer side part. In this way, on a plane on which the first planar coil winding (or the second planar coil winding) is located, a projection of a target conducting wire that is constituted by the first outer side part and the second inner side part crosses a projection of a target conducting wire that is constituted by the first inner side part and the second outer side part. In this case, when a magnetic field passes through the gap between the first outer side part and the first inner side part and passes through the gap between the second outer side part and the second inner side part, a direction of an induced current generated on the first outer side part and the second inner side part is opposite to that of an induced current generated on the first inner side part and the second outer side part. Therefore, the induced currents can cancel out at least a part of each other, thereby effectively reducing a circulating current loss in the first planar coil winding and the second planar coil winding, and improving wireless charging efficiency of the coil module.

With reference to the first aspect, in a first possible implementation, the end part of the first outer side part and the end part of the second inner side part are connected to each other through at least one first via hole. Specifically, the at least one first via hole penetrates the end part of the first outer side part and the end part of the second inner side part, and the end part of the first outer side part and the end part of the second inner side part are electrically connected to each other through the at least one first via hole.

With reference to the first aspect or the first possible implementation of the first aspect, in a second possible implementation, the end part of the second outer side part and the end part of the first inner side part are connected to each other through at least one second via hole. Specifically, the at least one second via hole penetrates the end part of the second outer side part and the end part of the first inner side part, and the end part of the second outer side part and the end part of the first inner side part are electrically connected to each other through the at least one second via hole.

In this embodiment of this application, when an insulation layer is disposed between the first planar coil winding and the second planar coil winding, the end part of the first outer side part and the end part of the second inner side part can be easily and quickly connected to each other through the at least one first via hole, and the end part of the second outer side part and the end part of the first inner side part can be easily and quickly connected to each other through the at least one second via hole.

With reference to the first aspect or the second possible implementation of the first aspect, in a third possible implementation, the module further includes a first connection part. The first connection part is located between the first outer side part and the second inner side part. The end part of the first outer side part and the end part of the second inner side part are connected to each other by using the first connection part.

With reference to the first aspect, the first possible implementation of the first aspect, or the third possible implementation of the first aspect, in a fourth possible implementation, the module further includes a second connection part. The second connection part is located between the second outer side part and the first inner side part. The end part of the second outer side part and the end part of the first inner side part are connected to each other by using the second connection part.

It should be noted that the first connection part is not electrically connected to the second connection part. The first connection part is not electrically connected to a part of the coil module other than the end part of the first outer side part and the end part of the second inner side part. The second connection part is not electrically connected to a part of the coil module other than the end part of the first inner side part and the end part of the second outer side part.

In addition, the first connection part may be a single connection part, or may be formed by sequentially connecting a plurality of connection parts in series in a length direction. The plurality of connection parts may be connected in series through a via hole, or may be connected in series through welding. Similarly, the second connection part may be a single connection part, or may be formed by sequentially connecting a plurality of connection parts in series in a length direction. The plurality of connection parts may be connected in series through a via hole, or may be connected in series through welding.

In this embodiment of this application, the end part of the first outer side part and the end part of the second inner side part can be easily and flexibly connected to each other by using the first connection part, and the end part of the second outer side part and the end part of the first inner side part can be easily and quickly connected to each other through the at least one second via hole.

With reference to any one of the first aspect, or the first to the fourth possible implementations of the first aspect, in a fifth possible implementation, the module further includes a third connection part and a fourth connection part.

Parts in the first planar coil winding other than the first outer side part and the first inner side part include a first segment and a second segment. There is an opening between the first segment and the second segment. The first segment includes a third outer side part and a third inner side part. Between the third outer side part and the third inner side part, there is a gap extending along a coiling direction of the first segment. The second segment includes a fourth outer side part and a fourth inner side part. Between the fourth outer side part and the fourth inner side part, there is a gap extending along a coiling direction of the second segment. Parts in the second planar coil winding other than the second outer side part and the second inner side part include a third segment and a fourth segment. There is an opening between the third segment and the fourth segment. The third segment includes a fifth outer side part and a fifth inner side part. Between the fifth outer side part and the fifth inner side part, there is a gap extending along a coiling direction of the third segment. The fourth segment includes a sixth outer side part and a sixth inner side part. Between the sixth outer side part and the sixth inner side part, there is a gap extending along a coiling direction of the fourth segment.

The third outer side part and the fifth outer side part are connected in parallel. The third inner side part and the fifth inner side part are connected in parallel. The fourth outer side part and the sixth outer side part are connected in parallel. The fourth inner side part and the sixth inner side part are connected in parallel. The third connection part is located between the third outer side part and the fourth inner side part. The third outer side part and the fourth inner side part are connected to each other by using the third connection part. The fourth connection part is located between the fifth inner side part and the sixth outer side part. The fifth inner side part and the sixth outer side part are connected to each other by using the fourth connection part.

It should be noted that the first coil of the first planar coil winding and the first coil of the second planar coil winding are in a serial cross-connection structure, and the first and the second segments of the first planar coil winding and the third and the fourth segments of the second planar coil winding are in a parallel cross-connection structure.

In addition, the third connection part is not electrically connected to the fourth connection part. The third connection part is not electrically connected to a part of the coil module other than the third outer side part, the fifth outer side part, the fourth inner side part, and the sixth inner side part. The fourth connection part is not electrically connected to a part of the coil module other than the fifth inner side part, the third inner side part, the sixth outer side part, and the fourth outer side part.

In this embodiment of this application, the third outer side part, the fifth outer side part, the third connection part, the fourth inner side part, and the sixth inner side part form one target conducting wire, and the third inner side part, the fifth inner side part, the fourth connection part, the fourth outer side part, and the sixth outer side part form one target conducting wire. Projections of the two target conducting wires cross each other on the plane on which the first planar coil winding (or the second planar coil winding) is located. In this case, when a magnetic field passes through the gap between the third outer side part and the third inner side part, the gap between the fifth outer side part and the fifth inner side part, the gap between the fourth outer side part and the fourth inner side part, and the gap between the sixth outer side part and the sixth inner side part, induced currents generated on the two target conducting wires are in opposite directions. Therefore, the induced currents can cancel out at least a part of each other, thereby effectively reducing a circulating current loss in the first planar coil winding and the second planar coil winding, and improving wireless charging efficiency of the coil module.

With reference to the fifth possible implementation of the first aspect, in a sixth possible implementation, the first segment and the second segment are located at an $N^{th}$ coil of the first planar coil winding, the third segment and the fourth segment are located at an $M^{th}$ coil of the second planar coil winding, the $N^{th}$ coil is any coil between the innermost coil of the first planar coil winding and the outermost coil of the first planar coil winding, and the $M^{th}$ coil is any coil between the innermost coil of the second planar coil winding and the outermost coil of the second planar coil winding. One end of the $N^{th}$ coil extends to one end of an $(N-1)^{th}$ coil in the first planar coil winding, where the $(N-1)^{th}$ coil is located at an inner side of the $N^{th}$ coil and is adjacent to the $N^{th}$ coil. The other end of the $N^{th}$ coil extends to one end of an $(N+1)^{th}$ coil in the first planar coil winding, where the $(N+)^{th}$ coil is located at an outer side of the $N^{th}$ coil and is adjacent to the $N^{th}$ coil. The $M^{th}$ coil has another opening in addition to the opening between the third segment and the fourth segment. One end of an $(M-1)^{th}$ coil in the second planar coil winding passes through the another opening and extends to one end of a $K^{th}$ coil that is in the second planar coil winding and that is located at an outer side of the $M^{th}$ coil, where the $(M-1)^{th}$ coil is located at an inner side of the $M^{th}$ coil and is adjacent to the $M^{th}$ coil.

In this embodiment of this application, in the first planar coil winding and the second planar coil winding, the $(N+)^{th}$ coil and the $N^{th}$ coil may be first connected in series, next, the $N^{th}$ coil and the $M^{th}$ coil are connected in parallel, and the $N^{th}$ coil, the $(N-1)^{th}$ coil, and the first coil of the first planar coil winding are sequentially connected in series, then the first coil of the first planar coil winding and the first coil of the second planar coil winding are connected in series, and finally, the first coil of the second planar coil winding, the $(M-1)^{th}$ coil, and the $K^{th}$ coil are sequentially connected in series.

With reference to any one of the first aspect, or the first to the sixth possible implementations of the first aspect, in a seventh possible implementation, if the first coil of the first planar coil winding is the innermost coil of the first planar coil winding, and the first coil of the second planar coil winding is the innermost coil of the second planar coil winding, the module includes a first conducting wire and a second conducting wire.

One end of the first conducting wire is a first end of the module, and the other end of the first conducting wire is connected to an end part of a first target coil. One end of the second conducting wire is a second end of the module, and the other end of the second conducting wire is connected to an end part of a second target coil. One of the first end of the module and the second end of the module is a lead-in end, and the other is a lead-out end.

It should be noted that the first target coil is the last coil, connected in series to an end part of the innermost coil of the first planar coil winding, in the plurality of coils of the first planar coil winding in a sequence from the innermost coil to the outermost coil. In other words, the first target coil is an outermost coil in at least one coil sequentially connected in series to the end part of the innermost coil of the first planar coil winding. The second target coil is the last coil connected in series to an end part of the innermost coil of the second planar coil winding, in the plurality of coils of the second planar coil winding in a sequence from the innermost coil to the outermost coil. In other words, the second target coil is an outermost coil in at least one coil sequentially connected in series to the end part of the innermost coil of the second planar coil winding.

In this embodiment of this application, the first planar coil winding and the second planar coil winding may be connected to an external circuit by using the first conducting wire and the second conducting wire, so that the external circuit can provide electric energy for the first planar coil winding and the second planar coil winding by using the first conducting wire and the second conducting wire, or the first planar coil winding and the second planar coil winding can output electric energy to the external circuit by using the first conducting wire and the second conducting wire.

With reference to the seventh possible implementation of the first aspect, in an eighth possible implementation, along a length direction of the first conducting wire, the first conducting wire includes a first conducting sub-wire and a second conducting sub-wire that are separated from each other, and along a coiling direction of the first target coil, the first target coil includes a seventh outer side part and a seventh inner side part that are separated from each other. An end part of the seventh outer side part is connected to an end part of the first conducting sub-wire, and an end part of the seventh inner side part is connected to an end part of the second conducting sub-wire.

It should be noted that a line formed by connecting the seventh outer side part and the first conducting sub-wire may cross or may not cross a line formed by connecting the seventh inner side part and the second conducting sub-wire. Optionally, the first conducting sub-wire is located at an outer side of the second conducting sub-wire. In this case, the first conducting sub-wire may be considered as an extension and a bending part of the seventh outer side part. Similarly, the second conducting sub-wire may be considered as an extension and a bending part of the seventh inner side part. In addition, a gap between the first conducting sub-wire and the second conducting sub-wire and a gap between the seventh outer side part and the seventh inner side part are cut once, so that there is no crossing. On the contrary, if the first conducting sub-wire is located at an inner side of the second conducting sub-wire, the line formed by connecting the seventh outer side part and the first conducting sub-wire crosses the line formed by connecting the seventh inner side part and the second conducting sub-wire.

With reference to the seventh or the eighth possible implementation of the first aspect, in a ninth possible implementation, along a length direction of the second conducting wire, the second conducting wire includes a third conducting sub-wire and a fourth conducting sub-wire that are separated from each other, and along a coiling direction of the second target coil, the second target coil includes an eighth outer side part and an eighth inner side part that are separated from each other. An end part of the eighth outer side part is connected to an end part of the third conducting sub-wire, and an end part of the eighth inner side part is connected to an end part of the fourth conducting sub-wire.

For whether a line formed by connecting the eighth outer side part and the third conducting sub-wire crosses a line formed by connecting the eighth inner side part and the fourth conducting sub-wire, refer to the foregoing related descriptions about whether the line formed by connecting the seventh outer side part and the first conducting sub-wire crosses the line formed by connecting the seventh inner side part and the second conducting sub-wire. No further details are provided herein.

Optionally, the third conducting sub-wire is formed by bending an extension part of the eighth outer side part, and the fourth conducting sub-wire is formed by bending an extension part of the eighth inner side part. In other words, the second conducting wire is integrated with the second target coil, and extends from the second target coil.

In this embodiment of this application, each of the first conducting wire and the second conducting wire may be separated into conducting sub-wires whose widths are relatively small, and each of the first target coil and the second target coil may be separated into an outer side part and an inner side part whose widths are relatively small, so that an eddy current loss of the coil module can be reduced.

With reference to any one of the first aspect, or the first to the sixth possible implementations of the first aspect, in a tenth possible implementation, if the first coil of the first planar coil winding is the outermost coil of the first planar coil winding, and the first coil of the second planar coil winding is the outermost coil of the second planar coil winding, the module includes a first conducting wire and a second conducting wire.

One end of the first conducting wire is a first end of the module, and the other end of the first conducting wire is connected to an end part of a third target coil. One end of the second conducting wire is a second end of the module, and the other end of the second conducting wire is connected to an end part of a fourth target coil. One of the first end of the module and the second end of the module is a lead-in end, and the other is a lead-out end.

It should be noted that the third target coil is the last coil connected in series to an end part of the outermost coil of the first planar coil winding, in the plurality of coils of the first planar coil winding in a sequence from the outermost coil to the innermost coil. In other words, the third target coil is an innermost coil in at least one coil sequentially connected in series to the end part of the outermost coil of the first planar coil winding. The fourth target coil is the last coil connected in series to an end part of the outermost coil of the second planar coil winding, in the plurality of coils of the second planar coil winding in a sequence from the outermost coil to the innermost coil. In other words, the fourth target coil is an innermost coil in at least one coil sequentially connected in series to the end part of the outermost coil of the second planar coil winding.

In this embodiment of this application, the first planar coil winding and the second planar coil winding may be connected to an external circuit by using the first conducting wire and the second conducting wire, so that the external circuit can provide electric energy for the first planar coil winding and the second planar coil winding by using the first conducting wire and the second conducting wire, or the first planar coil winding and the second planar coil winding can output electric energy to the external circuit by using the first conducting wire and the second conducting wire.

With reference to the tenth possible implementation of the first aspect, in an eleventh possible implementation, along a length direction of the first conducting wire, the first conducting wire includes a first conducting sub-wire and a second conducting sub-wire that are separated from each other, and along a coiling direction of the third target coil, the third target coil includes a seventh outer side part and a seventh inner side part that are separated from each other. An end part of the seventh outer side part is connected to an end part of the first conducting sub-wire, and an end part of the seventh inner side part is connected to an end part of the second conducting sub-wire. For details, refer to related descriptions in the eighth possible implementation.

With reference to the tenth or the eleventh possible implementation of the first aspect, in a twelfth possible implementation, along a length direction of the second conducting wire, the second conducting wire includes a third conducting sub-wire and a fourth conducting sub-wire that are separated from each other, and along a coiling direction of the fourth target coil, the fourth target coil includes an eighth outer side part and an eighth inner side part that are separated from each other. An end part of the eighth outer side part is connected to an end part of the third conducting sub-wire, and an end part of the eighth inner side part is connected to an end part of the fourth conducting sub-wire. For details, refer to related descriptions in the ninth possible implementation.

In this embodiment of this application, each of the first conducting wire and the second conducting wire may be separated into conducting sub-wires whose widths are relatively small, and each of the third target coil and the fourth target coil may be separated into an outer side part and an inner side part whose widths are relatively small, so that an eddy current loss of the coil module can be reduced.

According to a second aspect, a coil module is provided. The module includes a first connection part, a second connection part, a first conducting wire, a second conducting wire, and a first planar coil winding and a second planar coil winding that are insulated from each other. The first planar coil winding and the second planar coil winding each include a plurality of coils.

An innermost coil of the first planar coil winding includes a first segment and a second segment. There is an opening between the first segment and the second segment. The first segment includes a first outer side part and a first inner side part. Between the first outer side part and the first inner side part, there is a gap extending along a coiling direction of the first segment. The second segment includes a second outer side part and a second inner side part. Between the second outer side part and the second inner side part, there is a gap extending along a coiling direction of the second segment. A first end of the second segment is an end part of the innermost coil of the first planar coil winding. A second end of the second segment is opposite to the first end of the second segment and is close to a first end of the first segment. An innermost coil of the second planar coil winding includes a third segment and a fourth segment. There is an opening between the third segment and the fourth segment. The third segment includes a third outer side part and a third inner side part. Between the third outer side part and the third inner side part, there is a gap extending along a coiling direction of the third segment. The fourth segment includes a fourth outer side part and a fourth inner side part. Between the fourth outer side part and the fourth inner side part, there is a gap extending along a coiling direction of the fourth segment. A first end of the third segment is an end part of the innermost coil of the second planar coil winding. A second end of the third segment is opposite to the first end of the third segment and is close to a first end of the fourth segment.

The first outer side part and the third outer side part are connected in parallel. The first inner side part and the third inner side part are connected in parallel. The second outer side part and the fourth outer side part are connected in parallel. The second inner side part and the fourth inner side part are connected in parallel. The first connection part is located between the first outer side part and the second inner side part. The first outer side part and the second inner side part are connected to each other by using the first connection part. The second connection part is located between the third inner side part and the fourth outer side part. The third inner side part and the fourth outer side part are connected to each other by using the second connection part.

One end of the first conducting wire is a first end of the module. The other end of the first conducting wire is connected to a second end of the first segment. One end of the second conducting wire is a second end of the module. The other end of the second conducting wire is connected to a second end of the fourth segment. One of the first end of the module and the second end of the module is a lead-in end, and the other is a lead-out end.

It should be noted that the first connection part is not electrically connected to the second connection part. The first connection part is not electrically connected to a part of the coil module other than the first outer side part and the second inner side part. The second connection part is not electrically connected to a part of the coil module other than the third inner side part and the fourth outer side part.

Optionally, the first outer side part and the second inner side part are connected to each other by using the first connection part. Specifically, the first outer side part, the first connection part, and the second inner side part may be integrally formed.

Optionally, the third inner side part and the fourth outer side part are connected to each other by using the second connection part. Specifically, the third inner side part, the second connection part, and the fourth outer side part may be integrally formed.

In addition, a winding direction of the plurality of coils of the first planar coil winding is opposite to a winding direction of the plurality of coils of the second planar coil winding. In this case, a flow direction of a current in the first planar coil winding is the same as a flow direction of a current in the second planar coil winding. In addition, after flowing into the first conducting wire, a current first flows through the first planar coil winding, then flows through the second planar coil winding, and finally flows out of the second conducting wire. Alternatively, after flowing into the second conducting wire, a current first flows through the second planar coil winding, then flows through the first planar coil winding, and finally flows out of the first conducting wire.

In this embodiment of this application, a parallel cross-connection structure is formed between the innermost coil of the first planar coil winding and the innermost coil of the second planar coil winding. To be specific, the first outer side part, the third outer side part, the first connection part, the second inner side part, and the fourth inner side part form one target conducting wire, and the first inner side part, the third inner side part, the second connection part, the second outer side part, and the fourth outer side part form one target conducting wire. Projections of the two target conducting wires cross each other on a plane on which the first planar coil winding (or the second planar coil winding) is located. In this case, when a magnetic field passes through the gap between the first outer side part and the first inner side part, the gap between the third outer side part and the third inner side part, the gap between the second outer side part and the second inner side part, and the gap between the fourth outer side part and the fourth inner side part, induced currents generated on the two target conducting wires are in opposite directions. Therefore, the induced currents can cancel out at least a part of each other, thereby effectively reducing a circulating current loss in the first planar coil winding and the second planar coil winding, and improving wireless charging efficiency of the coil module.

With reference to the second aspect, in a first possible implementation, the module further includes a third connection part and a fourth connection part.

A target coil of the first planar coil winding includes a fifth segment. There is an opening between the fifth segment and the first segment. The fifth segment includes a fifth outer side part and a fifth inner side part. The target coil is a coil in the first planar coil winding, at an outer side of the innermost coil of the first planar coil winding, and adjacent to the innermost coil of the first planar coil winding. Between the fifth outer side part and the fifth inner side part, there is a gap extending along a coiling direction of the target coil. The other end of the first conducting wire is connected to the second end of the first segment by using the target coil.

The third connection part is located between the first outer side part and the fifth inner side part. The first outer side part and the fifth inner side part are connected to each other by using the third connection part. The fourth connection part is located between the first inner side part and the fifth outer side part. The first inner side part and the fifth outer side part are connected to each other by using the fourth connection part.

It should be noted that the third connection part is not electrically connected to the fourth connection part. The third connection part is not electrically connected to a part of the coil module other than the first outer side part, the third outer side part, and the fifth inner side part. The fourth connection part is not electrically connected to a part of the coil module other than the first inner side part, the third inner side part, and the fifth outer side part.

In this embodiment of this application, on the plane on which the first planar coil winding (or the second planar coil winding) is located, a projection of a target conducting wire that is constituted by the first outer side part, the third connection part, and the fifth inner side part crosses a projection of a target conducting wire that is constituted by the first inner side part, the fourth connection part, and the fifth outer side part. In this case, when a magnetic field passes through the gap between the first outer side part and the first inner side part and passes through the gap between the fifth outer side part and the fifth inner side part, a direction of an induced current generated on the first outer side part and the fifth inner side part is opposite to that of an induced current generated on the fifth outer side part and the first inner side part. Therefore, the induced currents can cancel out at least a part of each other, thereby effectively reducing a circulating current loss in the first planar coil winding and the second planar coil winding, and improving wireless charging efficiency of the coil module.

According to a third aspect, a coil module is provided. The module includes a first connection part, a second connection part, and a first planar coil winding and a second planar coil winding that are insulated from each other. The first planar coil winding and the second planar coil winding each include a plurality of coils.

The first planar coil winding includes a first segment and a second segment along a winding direction of the first planar coil winding. There is an opening between the first segment and the second segment. The first segment includes a first outer side part and a first inner side part. Between the first outer side part and the first inner side part, there is a gap extending along a coiling direction of the first segment. The second segment includes a second outer side part and a second inner side part. Between the second outer side part and the second inner side part, there is a gap extending along a coiling direction of the second segment. The first connection part is located between the first outer side part and the second inner side part. The first outer side part and the second inner side part are connected to each other by using the first connection part.

The second planar coil winding includes a third segment. Along a thickness direction of the first planar coil winding, an end part that is of the third segment and that is close to the first segment at least partially overlaps an end part that is of the second segment and that is close to the first segment. The third segment includes a third outer side part and a third inner side part. Between the third outer side part and the third inner side part, there is a gap extending along a coiling direction of the third segment. The second connection part is located between the third outer side part and the first inner side part. The third outer side part and the first inner side part are connected to each other by using the second connection part. One end that is of the third outer side part and that is close to the first inner side part is connected to one end that is of the second outer side part and that is close to the first inner side part.

It should be noted that, the first connection part is not electrically connected to a part of the coil module other than the first outer side part, the second inner side part, and the third inner side part, and the second connection part is not electrically connected to a part of the coil module other than the third outer side part, the second outer side part, and the first inner side part.

In this embodiment of this application, usually, the first planar coil winding is referred to as a first-layer coil winding, and the second planar coil winding is referred to as a second-layer coil winding. In this case, the third outer side part and the second outer side part are connected to each other in a cross-layer manner. In this way, a serial cross-connection between the first segment and the second segment in the first planar coil winding can be implemented by using the first connection part and the second connection part. In this case, on a plane on which the first planar coil winding (or the second planar coil winding) is located, a projection of a target conducting wire that is constituted by the first outer side part, the first connection part, and the second inner side part crosses a projection of a target conducting wire that is constituted by the first inner side part, the second connection part, and the second outer side part. In this case, when a magnetic field passes through the gap between the first outer side part and the first inner side part and passes through the gap between the second outer side part and the second inner side part, a direction of an induced current generated on the first outer side part and the second inner side part is opposite to that of an induced current generated on the second outer side part and the first inner side part. Therefore, the induced currents can cancel out at least a part of each other, thereby effectively reducing a circulating current loss in the first planar coil winding and the second planar coil winding, and improving wireless charging efficiency of the coil module.

With reference to the third aspect, in a first possible implementation, the first outer side part, the first connection part, and the second inner side part are integrally formed.

With reference to the third aspect or the first possible implementation of the third aspect, in a second possible implementation, the second connection part includes a first portion and a second portion that are separated from each other, the first portion and the first inner side part are integrally formed, the second portion and the third outer side part are integrally formed, and an end part of the first portion and an end part of the second portion that are close to each other are connected to each other.

It should be noted that the end part of the first portion and the end part of the second portion that are close to each other are one end that is of the first portion and that is away from the first inner side part and one end that is of the second portion and that is away from the third outer side part. When the end part of the first portion and the end part of the second portion that are close to each other are connected to each other, at least one via hole may penetrate the end part of the first portion and the end part of the second portion that are close to each other. The end part of the first portion and the end part of the second portion that are close to each other may be electrically connected to each other through the at least one via hole.

With reference to the third aspect, the first possible implementation of the third aspect, or the second possible implementation of the third aspect, in a third possible implementation of the third aspect, at least one first via hole penetrates the end that is of the second outer side part and that is close to the first inner side part and the end that is of the third outer side part and that is close to the first inner side part, and the end that is of the second outer side part and that is close to the first inner side part and the end that is of the third outer side part and that is close to the first inner side part are electrically connected to each other through the at least one first via hole.

In this embodiment of this application, the end that is of the second outer side part and that is close to the first inner side part and the end that is of the third outer side part and that is close to the first inner side part can be easily and quickly connected to each other through the at least one first via hole.

With reference to any one of the third aspect, or the first to the third possible implementations of the third aspect, in a fourth possible implementation, one end that is of the second inner side part and that is close to the first outer side part is connected to one end that is of the third inner side part and that is close to the first outer side part.

In this embodiment of this application, the second inner side part and the third inner side part are connected to each other in a cross-layer manner. In this way, a serial cross-connection between the first segment in the first planar coil winding and the third segment in the second planar coil winding can be implemented by using the first connection part and the second connection part. In this case, on the plane on which the first planar coil winding (or the second planar coil winding) is located, a projection of a target conducting wire that is constituted by the first outer side part, the first connection part, and the third inner side part crosses a projection of a target conducting wire that is constituted by the first inner side part, the second connection part, and the third outer side part. In this case, when a magnetic field passes through the gap between the first outer side part and the first inner side part and passes through the gap between the third outer side part and the third inner side part, a direction of an induced current generated on the first outer side part and the third inner side part is opposite to that of an induced current generated on the third outer side part and the first inner side part. Therefore, the induced currents can cancel out at least a part of each other, thereby effectively reducing a circulating current loss in the first planar coil winding and the second planar coil winding, and improving wireless charging efficiency of the coil module.

With reference to the fourth possible implementation of the third aspect, in a fifth possible implementation, at least one second via hole penetrates the end that is of the second inner side part and that is close to the first outer side part and the end that is of the third inner side part and that is close to the first outer side part, and the end that is of the second inner side part and that is close to the first outer side part and the end that is of the third inner side part and that is close to the first outer side part are electrically connected to each other through the at least one second via hole.

In this embodiment of this application, the end that is of the second inner side part and that is close to the first outer side part and the end that is of the third inner side part and that is close to the first outer side part can be easily and quickly connected to each other through the at least one second via hole.

According to a fourth aspect, a wireless charging transmitting apparatus is provided. The apparatus includes a direct current/alternating current conversion circuit, a control unit, and the coil module according to any one of the first aspect to the third aspect.

An input end of the direct current/alternating current conversion circuit is connected to a direct current power source. Under control of the control unit, the direct current/alternating current conversion circuit converts a direct-current signal input by the direct current power source into an alternating-current signal, and transmits the alternating-current signal to the coil module, so that the coil module transmits the alternating-current signal.

In this embodiment of this application, the wireless charging transmitting apparatus includes the coil module. A circulating current loss in a first planar coil winding and a second planar coil winding included in the coil module is relatively small. Therefore, wireless charging efficiency of the wireless charging transmitting apparatus can be improved.

Further, the apparatus further includes a matching circuit. The matching circuit is connected between the direct current/alternating current conversion circuit and the coil module, and is configured to resonate with the coil module.

In this embodiment of this application, the alternating-current signal output by the direct current/alternating current conversion circuit can be efficiently transmitted to the coil module by using the matching circuit.

According to a fifth aspect, a wireless charging receiving apparatus is provided. The apparatus includes an alternating current/direct current conversion circuit, a control unit, a load, and the coil module according to any one of the first aspect to the third aspect.

The coil module is connected to an input end of the alternating current/direct current conversion circuit. The coil module receives an alternating-current signal, and transmits the alternating-current signal to the alternating current/direct current conversion circuit. Under control of the control unit, the alternating current/direct current conversion circuit converts the alternating-current signal into a direct-current signal, and outputs the direct-current signal to the load, to supply power to the load.

In this embodiment of this application, the wireless charging receiving apparatus includes the coil module. A circulating current loss in a first planar coil winding and a second planar coil winding included in the coil module is relatively small. Therefore, wireless charging efficiency of the wireless charging receiving apparatus can be improved.

Further, the apparatus further includes a matching circuit. The matching circuit is connected between the coil module and the alternating current/direct current conversion circuit, and is configured to resonate with the coil module.

In this embodiment of this application, the alternating-current signal output by the coil module can be efficiently transmitted to the alternating current/direct current conversion circuit by using the matching circuit.

According to a sixth aspect, a wireless charging system is provided. The system includes the wireless charging transmitting apparatus according to the fourth aspect, and includes the wireless charging receiving apparatus according to the fifth aspect, and the wireless charging transmitting apparatus is configured to wirelessly charge the wireless charging receiving apparatus.

In this embodiment of this application, the wireless charging system includes the wireless charging transmitting apparatus and the wireless charging receiving apparatus. The wireless charging transmitting apparatus and the wireless charging receiving apparatus each include a coil module. A circulating current loss in a first planar coil winding and a second planar coil winding included in the coil module is relatively small. Therefore, wireless charging efficiency of the wireless charging system can be improved.

According to a seventh aspect, a terminal is provided. The terminal includes an alternating current/direct current conversion circuit, a charging control unit, a workload circuit, and the coil module according to any one of the first aspect to the third aspect.

The coil module is connected to an input end of the alternating current/direct current conversion circuit.

The coil module receives an alternating-current signal, and transmits the alternating-current signal to the alternating current/direct current conversion circuit. Under control of the charging control unit, the alternating current/direct current conversion circuit converts the alternating-current signal into a direct-current signal, and outputs the direct-current signal to the workload circuit.

In this embodiment of this application, the terminal includes the coil module. A circulating current loss in a first planar coil winding and a second planar coil winding included in the coil module is relatively small. Therefore, wireless charging efficiency of the terminal can be improved.

The technical solutions provided in this application can bring at least the following beneficial effects.

The coil module includes the first planar coil winding and the second planar coil winding that are insulated from each other, and the first planar coil winding and the second planar coil winding each include a plurality of coils. The first coil of the first planar coil winding includes the first outer side part and the first inner side part. The end part of the first coil of the first planar coil winding includes the end part of the first outer side part and the end part of the first inner side part. Between the first outer side part and the first inner side part, there is the gap extending along the coiling direction of the first coil of the first planar coil winding. The first coil of the second planar coil winding includes the second outer side part and the second inner side part. The end part of the first coil of the second planar coil winding includes the end part of the second outer side part and the end part of the second inner side part. Between the second outer side part and the second inner side part, there is the gap extending along the coiling direction of the first coil of the second planar coil winding. The end part of the first outer side part is connected to the end part of the second inner side part, and the end part of the second outer side part is connected to the end part of the first inner side part. In this way, on the plane on which the first planar coil winding (or the second planar coil winding) is located, the projection of the target conducting wire that is constituted by the first outer side part and the second inner side part crosses the projection of the target conducting wire that is constituted by the first inner side part and the second outer side part. In this case, when a magnetic field passes through the gap between the first outer side part and the first inner side part and passes through the gap between the second outer side part and the second inner side part, a direction of an induced current generated on the first outer side part and the second inner side part is opposite to that of an induced current generated on the first inner side part and the second outer side part. Therefore, the induced currents can cancel out at least a part of each other, thereby effectively reducing a circulating current loss in the first planar coil winding and the second planar coil winding, and improving wireless charging efficiency of the coil module.

REFERENCE NUMERALS

1: a first planar coil winding, 2: a second planar coil winding;

11: a first outer side part, 12: a first inner side part, 21: a second outer side part, 22: a second inner side part, 31: a third outer side part, 32: a third inner side part, 41: a fourth outer side part, 42: a fourth inner side part, 51: a fifth outer side part, 52: a fifth inner side part, 61: a sixth outer side part, 62: a sixth inner side part, 71: a seventh outer side part, 72: a seventh inner side part, 81: an eighth outer side part, 82: an eighth inner side part;

L1: a first connection part, L2: a second connection part, L3: a third connection part, L4: a fourth connection part;

D1: a first conducting wire, D2: a second conducting wire, d1: a first conducting sub-wire, d2: a second conducting sub-wire, d3: a third conducting sub-wire, d4: a fourth conducting sub-wire;

291: a direct current power source, 292: a direct current/alternating current conversion circuit, 293: a control unit, 294: a coil module, 295: a matching circuit;

331: a direct current/alternating current conversion circuit, 332: a control unit, 333: a load, 334: a coil module, 335: a matching circuit;

371: a wireless charging transmitting apparatus, 372: a wireless charging receiving apparatus; and 381: a workload circuit, 382: an alternating current/direct current conversion circuit, 383: a charging control unit, 384: a coil module, 385: a matching circuit.

DETAILED DESCRIPTION OF ILLUSTRATIVE EMBODIMENTS

To make objectives, technical solutions, and advantages of this application clearer, the following further describes implementations of this application in detail with reference to the accompanying drawings.

Figure 1:
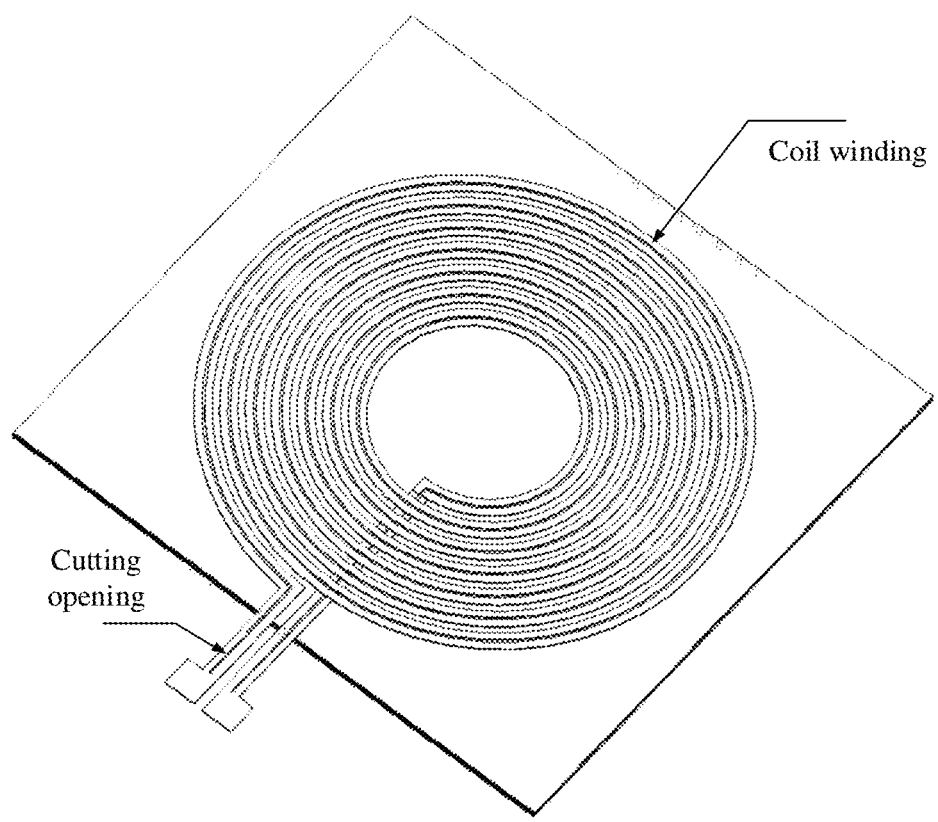
FIG. 1 is a schematic structural diagram of a wireless charging coil according to the related art.
Figure 2:
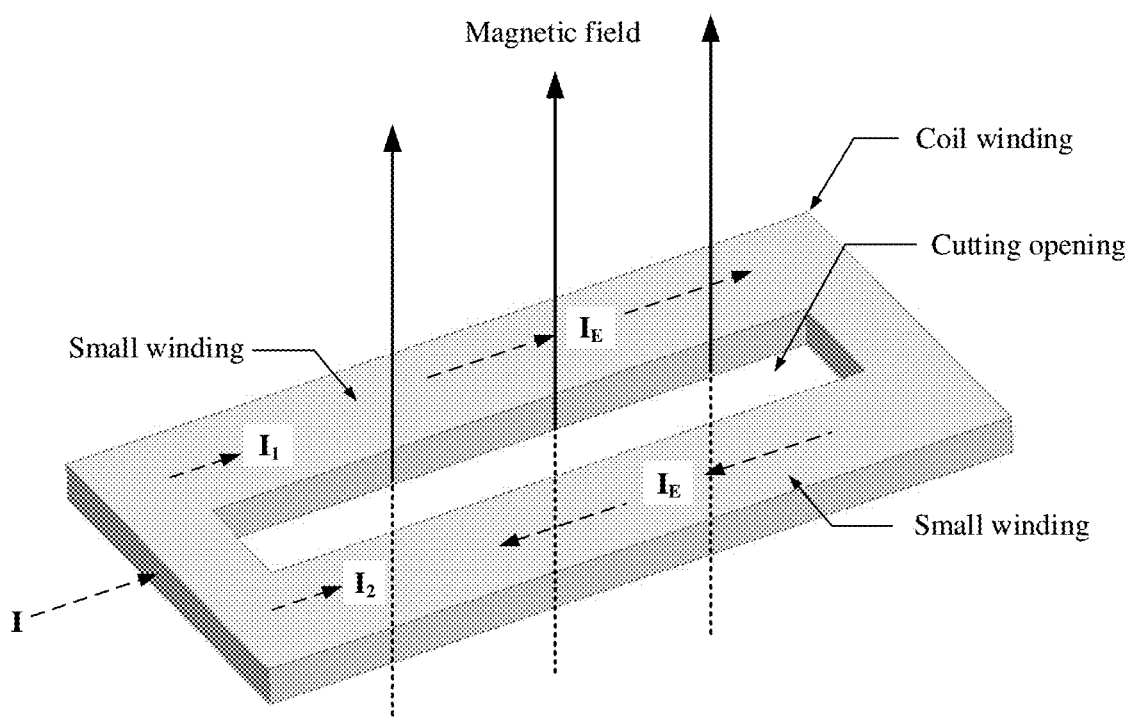
FIG. 2 is a schematic diagram of an induced current in a small winding according to the related art.
Figure 3:
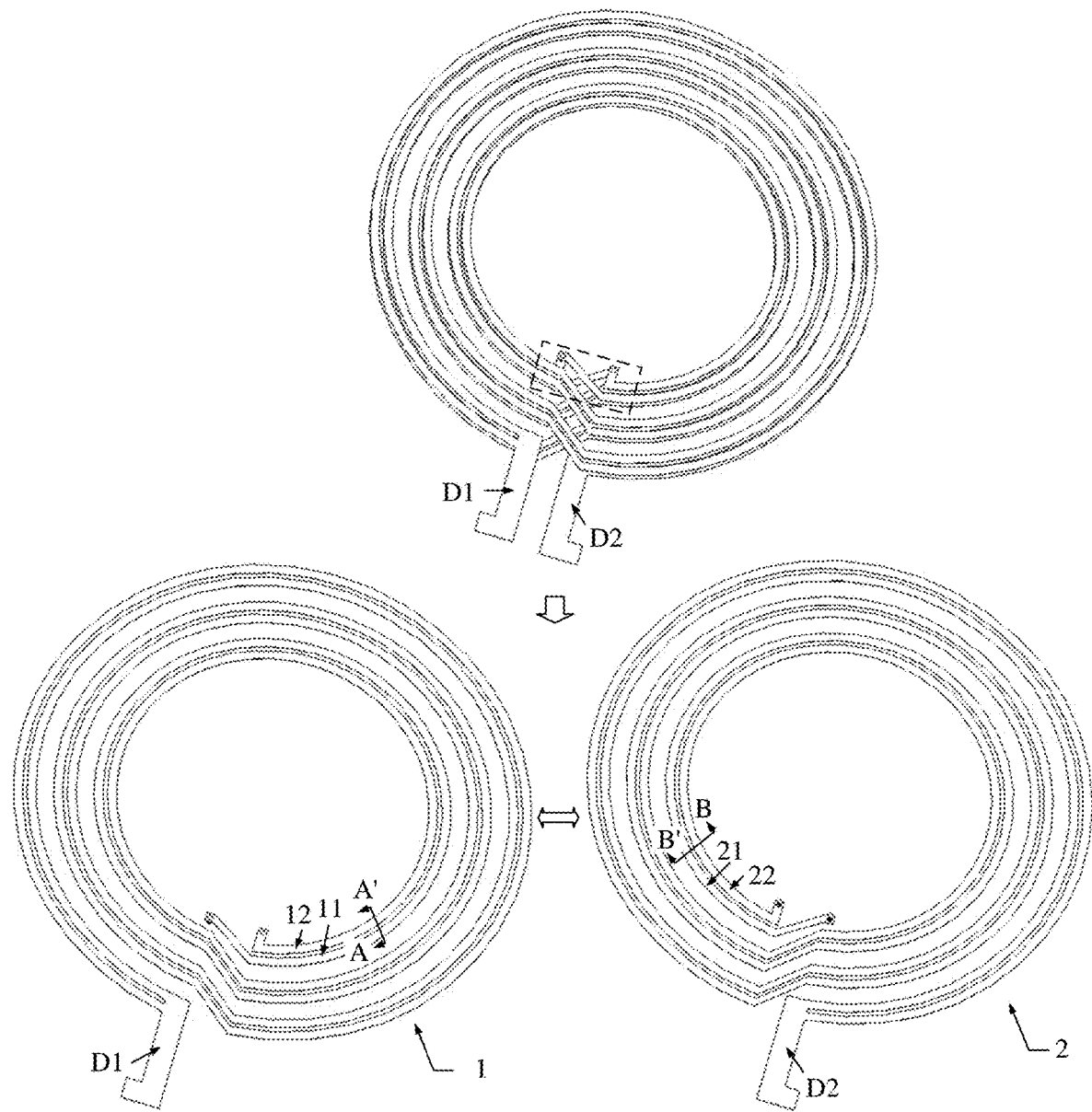
FIG. 3 is a schematic structural diagram of a first coil module according to an embodiment of this application.
Figure 4:
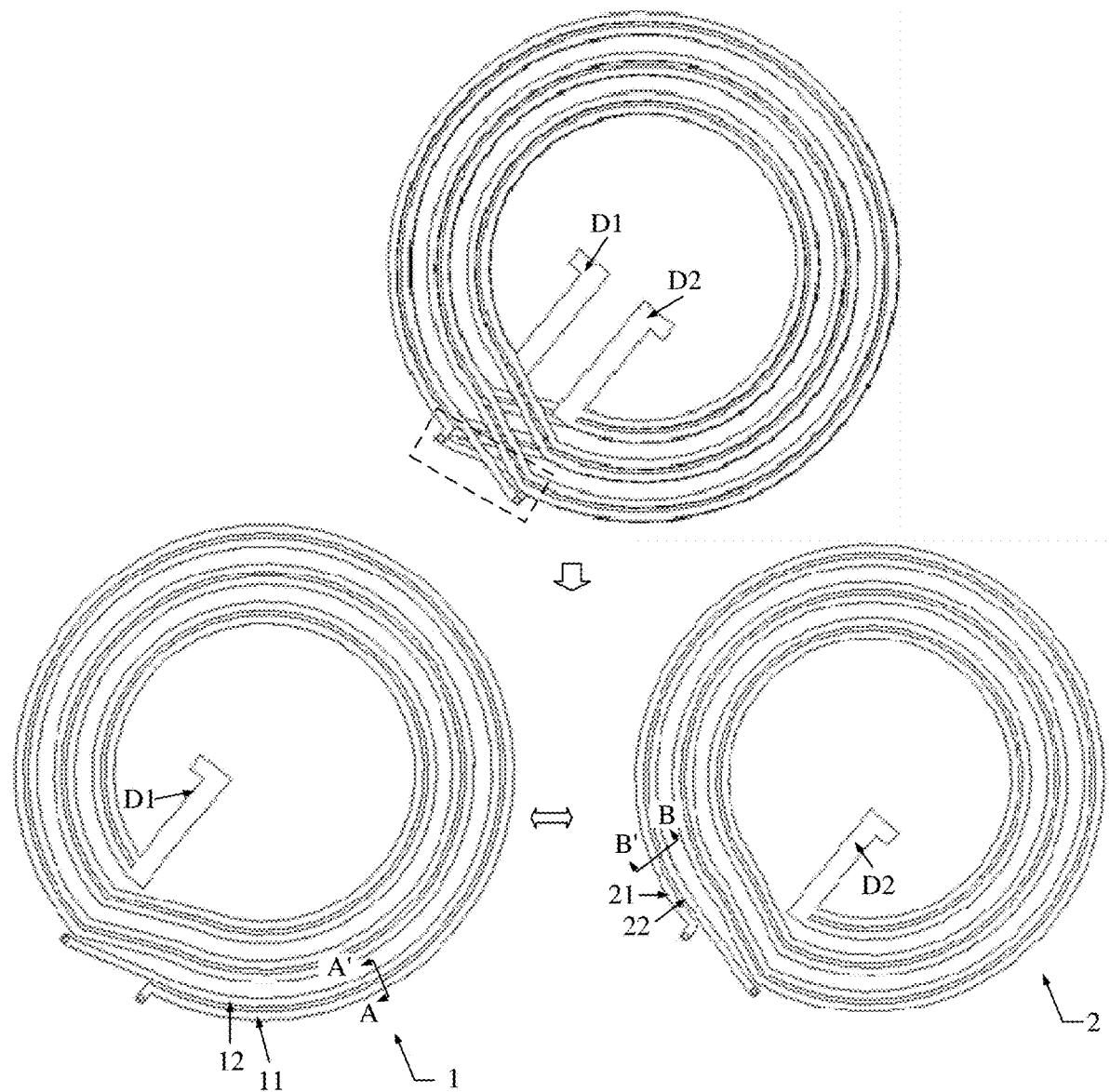
FIG. 4 is a schematic structural diagram of a second coil module according to an embodiment of this application.

FIG. 3 or FIG. 4 is a schematic structural diagram of a coil module according to an embodiment of this application. Referring to FIG. 3 or FIG. 4, the coil module includes a first planar coil winding 1 and a second planar coil winding 2 that are insulated from each other, and the first planar coil winding 1 and the second planar coil winding 2 each include a plurality of coils.

A first coil of the first planar coil winding 1 includes a first outer side part 11 and a first inner side part 12. An end part of the first coil of the first planar coil winding 1 includes an end part of the first outer side part 11 and an end part of the first inner side part 12. Between the first outer side part 11 and the first inner side part 12, there is a gap extending along a coiling direction of the first coil of the first planar coil winding 1.

A first coil of the second planar coil winding 2 includes a second outer side part 21 and a second inner side part 22. An end part of the first coil of the second planar coil winding 2 includes an end part of the second outer side part 21 and an end part of the second inner side part 22. Between the second outer side part 21 and the second inner side part 22, there is a gap extending along a coiling direction of the first coil of the second planar coil winding 2.

The end part of the first outer side part 11 is connected to the end part of the second inner side part 22, and the end part of the second outer side part 21 is connected to the end part of the first inner side part 12.

Optionally, referring to FIG. 3, the first coil of the first planar coil winding 1 is an innermost coil of the first planar coil winding 1, and the first coil of the second planar coil winding 2 is an innermost coil of the second planar coil winding 2.

Optionally, referring to FIG. 4, the first coil of the first planar coil winding 1 is an outermost coil of the first planar coil winding 1, and the first coil of the second planar coil winding 2 is an outermost coil of the second planar coil winding 2.

It should be noted that the first planar coil winding 1 (or the second planar coil winding 2) is a conductive pattern formed by winding a conductor. The conductive pattern may be a circular ring, an elliptic ring, or the like. Any one of the plurality of coils included in the first planar coil winding 1 (or the second planar coil winding 2) is formed by evenly winding the conductor 360 degrees. Widths of the plurality of coils in the first planar coil winding 1 (or the second planar coil winding 2) may be different. For example, in a sequence from the innermost coil to the outermost coil, the widths of the plurality of coils in the first planar coil winding 1 (or the second planar coil winding 2) may gradually increase, or may first increase and then decrease. It should be noted that the plurality of coils in "the plurality of coils included in the first planar coil winding 1 (or the second planar coil winding 2)" are usually far more than two coils.

In addition, the first planar coil winding 1 and the second planar coil winding 2 may be insulated from each other by using an insulating medium. The insulating medium between the first planar coil winding 1 and the second planar coil winding 2 is used to isolate the first planar coil winding 1 from the second planar coil winding 2, so that parts of the first planar coil winding 1 and the second planar coil winding 2 other than mutually connected parts remain insulated from each other. Specifically, an insulation layer may be disposed between the first planar coil winding 1 and the second planar coil winding 2. In this case, the first planar coil winding 1 may be disposed on a circuit board such as a printed circuit board (PCB) or a flexible printed board (FPC), and the second planar coil winding 2 may also be disposed on a circuit board such as a PCB or an FPC. Alternatively, surfaces of the plurality of coils in the first planar coil winding 1 and surfaces of the plurality of coils in the second planar coil winding 2 may be covered with an insulating substance. In this case, the plurality of coils in the first planar coil winding 1 may be a flat wire, an enameled wire, or the like, and the plurality of coils in the second planar coil winding 2 may also be a flat wire, an enameled wire, or the like. When the plurality of coils in the first planar coil winding 1 (or the second planar coil winding 2) are a flat wire, the plurality of coils in the first planar coil winding 1 (or the second planar coil winding 2) may be formed by using a die cut process, an etching method, an electroplating addition method, or the like. When the plurality of coils in the first planar coil winding 1 (or the second planar coil winding 2) are an enameled wire, the first planar coil winding 1 (or the second planar coil winding 2) may be formed by winding a plurality of conducting wires, and each of the plurality of conducting wires may be a single-strand wire, a stranded wire, or the like. This is not limited in the embodiments of this application.

It should be noted that the gap that is between the first outer side part 11 and the first inner side part 12 and that extends along the coiling direction of the first coil of the first planar coil winding 1 may be formed in a manner such as cutting, chemical corrosion, or parallel winding. Specifically, the first coil of the first planar coil winding 1 may be cut, chemically corroded, or the like, to obtain the first outer side part 11 and the first inner side part 12. In this case, there is a gap between the first outer side part 11 and the first inner side part 12. Alternatively, the first coil of the first planar coil winding 1 may be formed by winding a plurality of conducting wires in parallel. In this case, the first outer side part 11 may be one conducting wire, the first inner side part 12 may be another conducting wire, and there is a gap between the first outer side part 11 and the first inner side part 12.

In addition, the end part of the first outer side part 11 is separated from the end part of the first inner side part 12. One end that is of the first outer side part 11 and that is away from the end part of the second inner side part 22 and one end that is of the first inner side part 12 and that is away from the end part of the second outer side part 21 may be connected to each other by using a part of the first coil of the first planar coil winding 1 other than the first outer side part 11 and the first inner side part 12, or may be connected to each other by using a coil of the first planar coil winding 1 other than the first coil, or may be connected to each other by using a conducting wire connected between the first planar coil winding 1 and a lead-out end or lead-in end of the coil module, or may be connected to each other by using a connection terminal between the coil module and an external circuit, or the like.

It should be noted that the gap that is between the second outer side part 21 and the second inner side part 22 and that extends along the coiling direction of the first coil of the second planar coil winding 2 may be formed in a manner such as cutting, chemical corrosion, or parallel winding. Specifically, the first coil of the second planar coil winding 2 may be cut, chemically corroded, or the like, to obtain the second outer side part 21 and the second inner side part 22. In this case, there is a gap between the second outer side part 21 and the second inner side part 22. Alternatively, the first coil of the second planar coil winding 2 may be formed by winding a plurality of conducting wires in parallel. In this case, the second outer side part 21 may be one conducting wire, the second inner side part 22 may be another conducting wire, and there is a gap between the second outer side part 21 and the second inner side part 22.

In addition, the end part of the second outer side part 21 is separated from the end part of the second inner side part 22. One end that is of the second outer side part 21 and that is away from the end part of the first inner side part 12 and one end that is of the second inner side part 22 and that is away from the end part of the first outer side part 11 may be connected to each other by using a part of the first coil of the second planar coil winding 2 other than the second outer side part 21 and the second inner side part 22, or may be connected to each other by using a coil of the second planar coil winding 2 other than the first coil, or may be connected to each other by using a conducting wire connected between the second planar coil winding 2 and a lead-out end or lead-in end of the coil module, or may be connected to each other by using a connection terminal between the coil module and an external circuit, or the like.

It should be noted that, a current that flows into the coil module from an external circuit or a current generated by the coil module may first flow into the first outer side part 11 and the first inner side part 12 in the first coil of the first planar coil winding 1, then flow to the second inner side part 22 in the first coil of the second planar coil winding 2 from the first outer side part 11 and flow to the second outer side part 21 in the first coil of the second planar coil winding 2 from the first inner side part 12 simultaneously, and finally flow out of the second planar coil winding 2.

Alternatively, a current that flows into the coil module from an external circuit or a current generated by the coil module may first flow into the second inner side part 22 and the second outer side part 21 in the first coil of the second planar coil winding 2, then flow to the first outer side part 11 in the first coil of the first planar coil winding 1 from the second inner side part 22 and flow to the first inner side part 12 in the first coil of the first planar coil winding 1 from the second outer side part 21 simultaneously, and finally flow out of the first planar coil winding 1.

Figure 5:
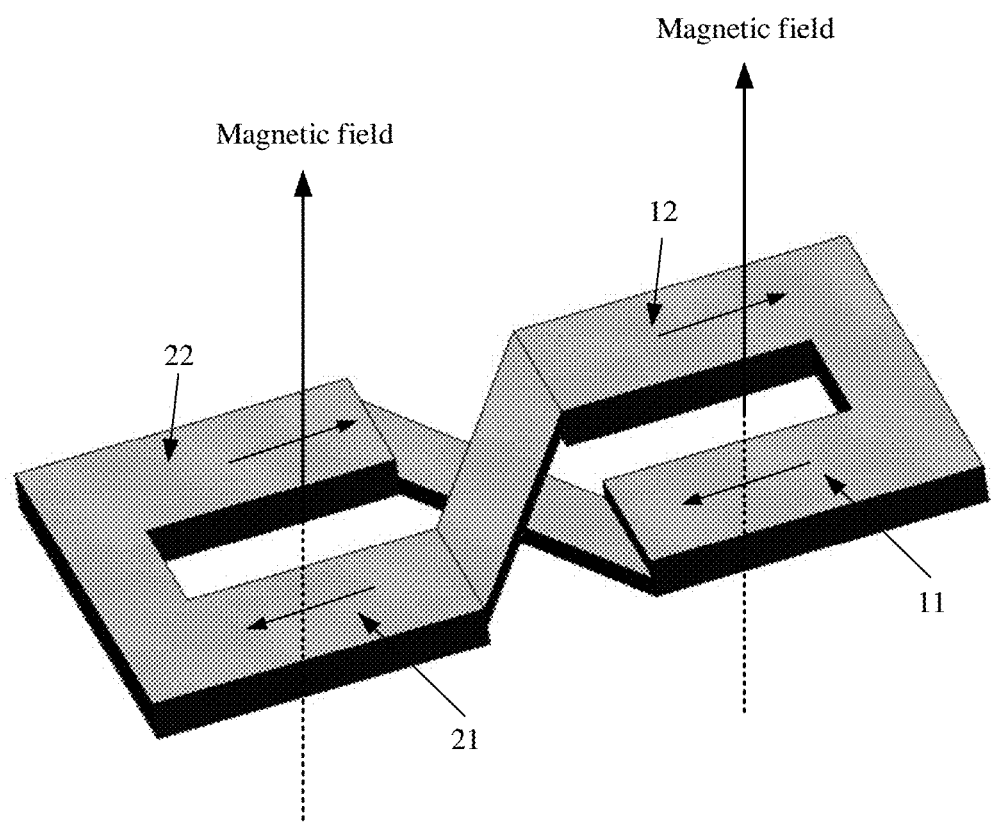
FIG. 5 is a schematic diagram of a cross connection between an outer side part and an inner side part according to an embodiment of this application.
Figure 6:
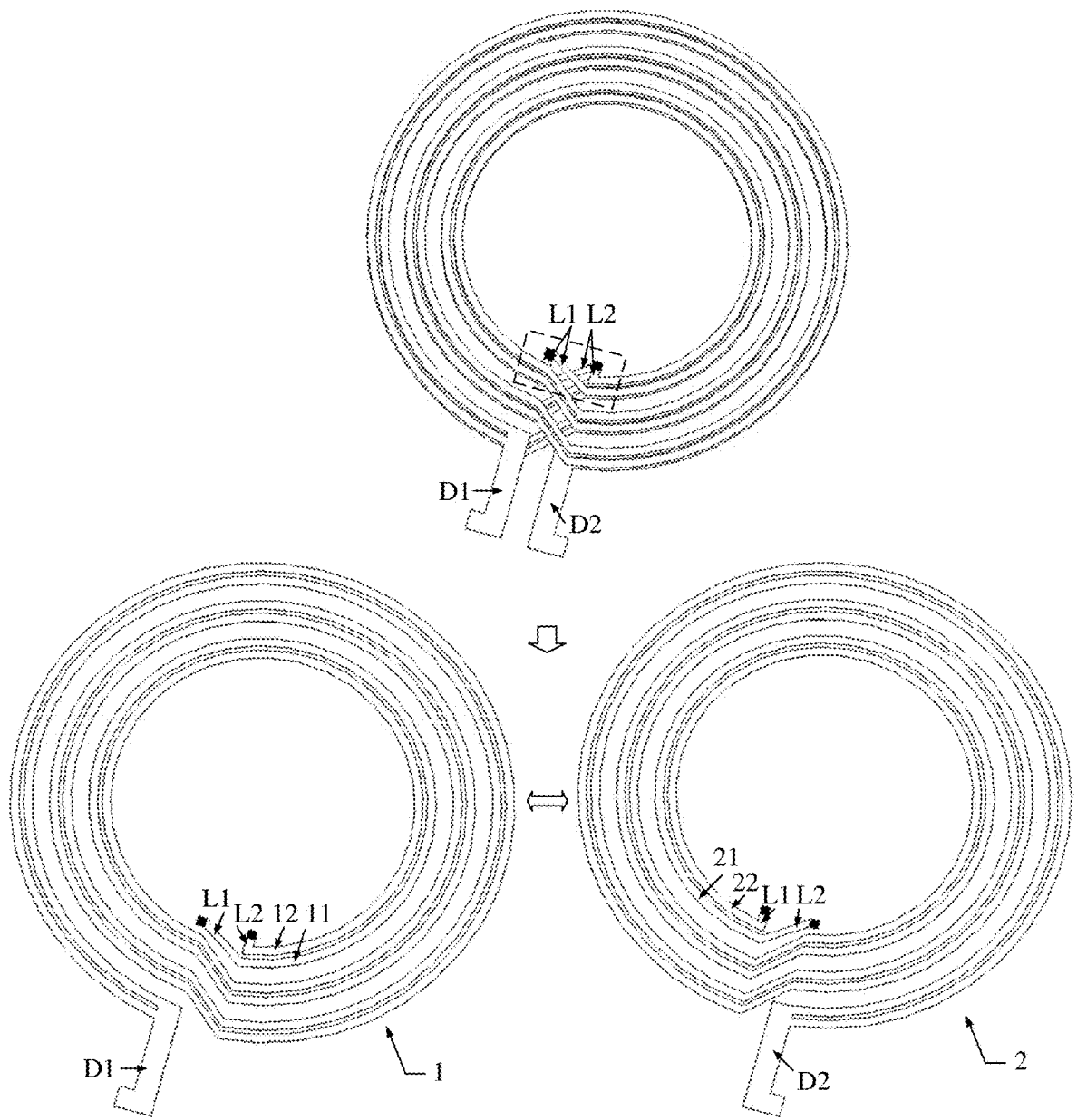
FIG. 6 is a schematic structural diagram of a third coil module according to an embodiment of this application.

It should be noted that a serial cross-connection structure is formed between the first coil of the first planar coil winding 1 and the first coil of the second planar coil winding 2. Referring to FIG. 5, the end part of the first coil of the first planar coil winding 1 is connected to the end part of the first coil of the second planar coil winding 2. Specifically, the end part of the first outer side part 11 is connected to the end part of the second inner side part 22, and the end part of the first inner side part 12 is connected to the end part of the second outer side part 21. In this way, on a plane on which the first planar coil winding 1 (or the second planar coil winding 2) is located, a projection of a target conducting wire that is constituted by the first outer side part 11 and the second inner side part 22 crosses a projection of a target conducting wire that is constituted by the first inner side part 12 and the second outer side part 21. In this case, when a magnetic field passes through the gap between the first outer side part 11 and the first inner side part 12 and passes through the gap between the second outer side part 21 and the second inner side part 22, a direction of an induced current generated on the first outer side part 11 and the second inner side part 22 is opposite to that of an induced current generated on the first inner side part 12 and the second outer side part 21. Therefore, the induced currents can cancel out at least a part of each other, thereby effectively reducing a circulating current loss in the first planar coil winding 1 and the second planar coil winding 2, and improving wireless charging efficiency of the coil module.

In a possible implementation, the end part of the first outer side part 11 and the end part of the second inner side part 22 may be connected to each other through at least one first via hole, and the end part of the second outer side part 21 and the end part of the first inner side part 12 may be connected to each other through at least one second via hole.

It should be noted that, the at least one first via hole penetrates the end part of the first outer side part 11 and the end part of the second inner side part 22, and the end part of the first outer side part 11 and the end part of the second inner side part 22 are electrically connected to each other through the at least one first via hole, and the at least one second via hole penetrates the end part of the second outer side part 21 and the end part of the first inner side part 12, and the end part of the second outer side part 21 and the end part of the first inner side part 12 are electrically connected to each other through the at least one second via hole.

In another possible implementation, as shown in FIG. 6, FIG. 7, FIG. 8, or FIG. 9, the coil module may further include a first connection part L1, the first connection part L1 is located between the first outer side part 11 and the second inner side part 22, and the end part of the first outer side part 11 and the end part of the second inner side part 22 may be connected to each other by using the first connection part L1, and the coil module may further include a second connection part L2, the second connection part L2 is located between the second outer side part 21 and the first inner side part 12, and the end part of the second outer side part 21 and the end part of the first inner side part 12 may be connected to each other by using the second connection part L2.

It should be noted that the first connection part L1 and the end part of the first outer side part 11 may be connected to each other through integral forming, welding, a via hole, or the like. A pulse-heated reflow soldering (hot bar) process, a laser welding process, or the like may be used for the welding. Similarly, the first connection part L1 and the end part of the second inner side part 22 may be connected to each other through integral forming, welding, a via hole, or the like, the second connection part L2 and the end part of the second outer side part 21 may be connected to each other through integral forming, welding, a via hole, or the like, and the second connection part L2 and the end part of the first inner side part 12 may be connected to each other through integral forming, welding, a via hole, or the like.

In addition, the first connection part L1 may be a single connection part, or may be formed by sequentially connecting a plurality of connection parts in series in a length direction. The plurality of connection parts may be connected in series through a via hole, or may be connected in series through welding. Similarly, the second connection part L2 may be a single connection part, or may be formed by sequentially connecting a plurality of connection parts in series in a length direction. The plurality of connection parts may be connected in series through a via hole, or may be connected in series through welding.

Moreover, the first connection part L1 is not electrically connected to the second connection part L2. The first connection part L1 is not electrically connected to a part of the coil module other than the end part of the first outer side part 11 and the end part of the second inner side part 22. The second connection part L2 is not electrically connected to a part of the coil module other than the end part of the first inner side part 12 and the end part of the second outer side part 21.

Figure 10:
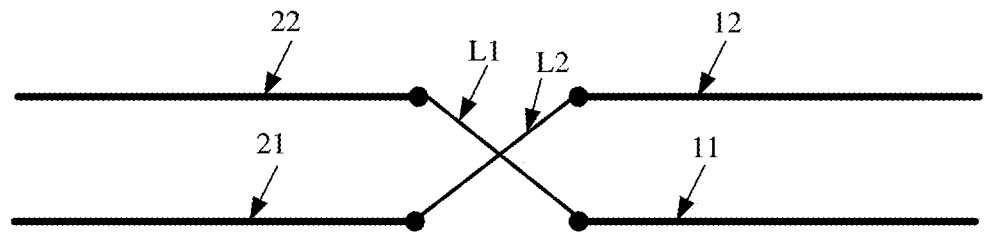
FIG. 10 is a schematic diagram of a connection part according to an embodiment of this application.
Figure 11:
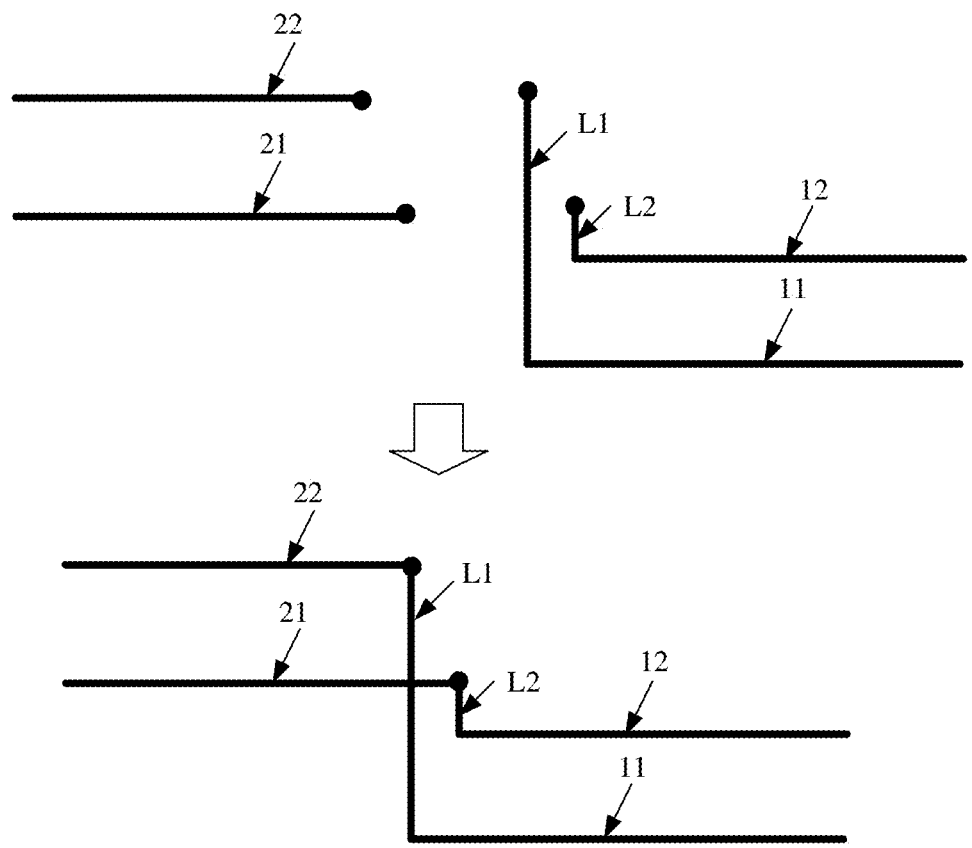
FIG. 11 is a schematic diagram of another connection part according to an embodiment of this application.
Figure 12:
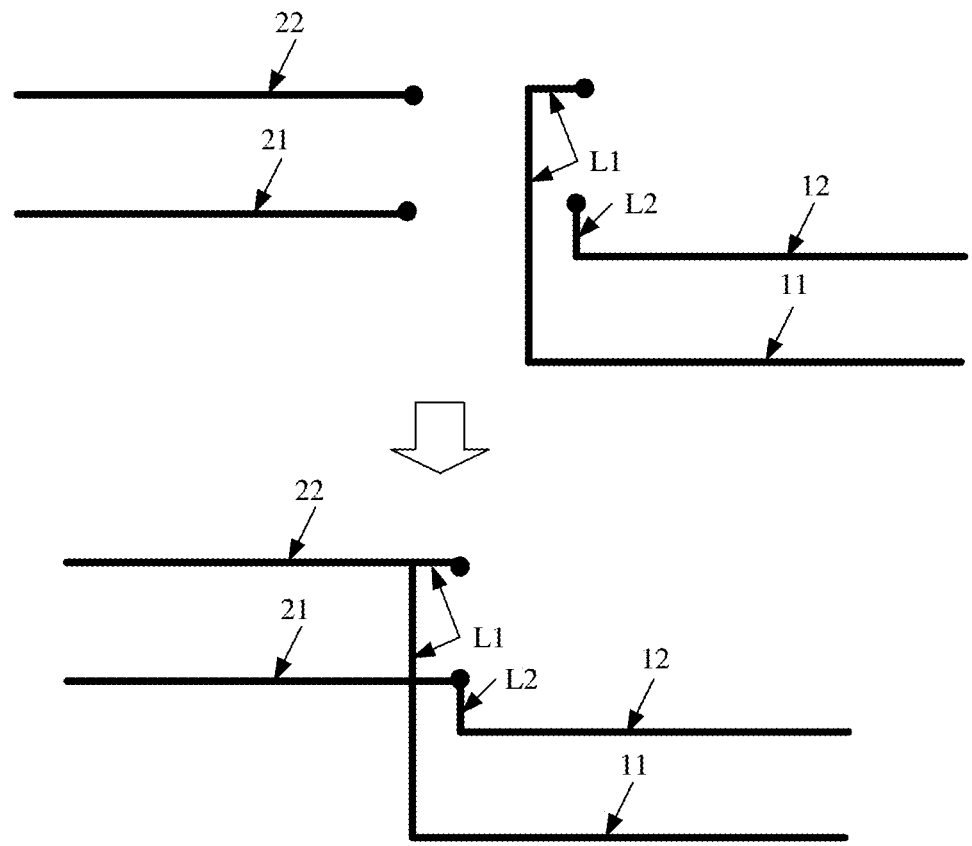
FIG. 12 is a schematic diagram of still another connection part according to an embodiment of this application.

In this case, to ensure that the first connection part L1 is not electrically connected to the second connection part L2, as shown in FIG. 10, when a projection of the first connection part L1 and a projection of the second connection part L2 overlap on the plane on which the first planar coil winding 1 (or the second planar coil winding 2) is located, an insulating medium is required between the first connection part L1 and the second connection part L2, to isolate the first connection part L1 from the second connection part L2. Specifically, an insulation layer may be disposed between the first connection part L1 and the second connection part L2, or a surface of the first connection part L1 and a surface of the second connection part L2 may be covered with an insulating substance. As shown in FIG. 11 or FIG. 12, when a projection of the first connection part L1 and a projection of the second connection part L2 do not overlap on the plane on which the first planar coil winding 1 (or the second planar coil winding 2) is located, the first connection part L1 needs to be separated from the second connection part L2, to be specific, a gap is required between the first connection part L1 and the second connection part L2.

In addition, to ensure that the first connection part L1 is not electrically connected to a part of the coil module other than the end part of the first outer side part 11 and the end part of the second inner side part 22, the surface of the first connection part L1 may be covered with an insulating substance, or the first connection part L1 may be separated from the part of the coil module other than the end part of the first outer side part 11 and the end part of the second inner side part 22.

Similarly, to ensure that the second connection part L2 is not electrically connected to a part of the coil module other than the end part of the first inner side part 12 and the end part of the second outer side part 21, the surface of the second connection part L2 may be covered with an insulating substance, or the second connection part L2 may be separated from the part of the coil module other than the end part of the first inner side part 12 and the end part of the second outer side part 21.

It should be noted that, when an insulation layer is disposed between the first planar coil winding 1 and the second planar coil winding 2, the first planar coil winding 1 may be located at one side of the insulation layer, and the second planar coil winding 2 may be located at the other side of the insulation layer. In such a structure, the first connection part L1 and the second connection part L2 may be separately located at different sides of the insulation layer, or may be located at a same side of the insulation layer. In addition, when the first connection part L1 is formed by sequentially connecting a plurality of connection parts in series in the length direction, the plurality of connection parts may be separately located at different sides of the insulation layer, or may be located at a same side of the insulation layer, and when the second connection part L2 is formed by sequentially connecting a plurality of connection parts in series in the length direction, the plurality of connection parts may be separately located at different sides of the insulation layer, or may be located at a same side of the insulation layer.

For example, both the first planar coil winding 1 and the first connection part L1 are located at one side of the insulation layer, and both the second planar coil winding 2 and the second connection part L2 are located at the other side of the insulation layer. For another example, both the first planar coil winding 1 and the second connection part L2 may be located at one side of the insulation layer, and both the second planar coil winding 2 and the first connection part L1 may be located at the other side of the insulation layer. For another example, the first planar coil winding 1 is located at one side of the insulation layer, the second planar coil winding 2, the first connection part L1, and the second connection part L2 are all located at the other side of the insulation layer, and the first connection part L1 and the second connection part L2 are separated from each other. For another example, the first planar coil winding 1, the first connection part L1, and the second connection part L2 are all located at one side of the insulation layer, the second planar coil winding 2 is located at the other side of the insulation layer, and the first connection part L1 and the second connection part L2 are separated from each other.

It should be noted that, when the surfaces of the plurality of coils in the first planar coil winding 1 and the surfaces of the plurality of coils in the second planar coil winding 2 are covered with an insulating substance, the surface of the first connection part L1 and the surface of the second connection part L2 may also be covered with an insulating substance.

In this case, the end part of the first outer side part 11, the first connection part L1, and the end part of the second inner side part 22 may be integrally formed. In this case, the first outer side part 11, the first connection part L1, and the second inner side part 22 may belong to a same conducting wire. In addition, the end part of the first inner side part 12, the second connection part L2, and the end part of the second outer side part 21 may be integrally formed. In this case, the first inner side part 12, the second connection part L2, and the second outer side part 21 may belong to a same conducting wire.

Based on the foregoing structure, wireless charging efficiency may be further improved by using the following three refined structures. The following separately describes the three refined structures.

In a first refined structure, an area of a projection of the gap between the first outer side part 11 and the first inner side part 12 on the plane on which the first planar coil winding 1 (or the second planar coil winding 2) is located is equal to or close to an area of a projection of the gap between the second outer side part 21 and the second inner side part 22 on the plane on which the first planar coil winding 1 (or the second planar coil winding 2) is located.

To be specific, an induced current generated when a magnetic field passes through the gap between the first outer side part 11 and the first inner side part 12 is equal to or close to an induced current generated when a magnetic field passes through the gap between the second outer side part 21 and the second inner side part 22.

It should be noted that "an area of a projection of the gap between the first outer side part 11 and the first inner side part 12 on the plane on which the first planar coil winding 1 is located is close to an area of a projection of the gap between the second outer side part 21 and the second inner side part 22 on the plane on which the first planar coil winding 1 is located" means that a difference between the two areas is less than or equal to a first preset value. The first preset value may be set in advance, and the first preset value may be set to a relatively small value. For example, the first preset value may be 30% of either of the two areas. Certainly, the first preset value may alternatively be another value. This is not limited in this embodiment of this application.

In addition, "an induced current generated when a magnetic field passes through the gap between the first outer side part 11 and the first inner side part 12 is close to an induced current generated when a magnetic field passes through the gap between the second outer side part 21 and the second inner side part 22" means that a difference between the two induced currents is less than or equal to a second preset value. The second preset value may be set in advance, and the second preset value may be set to a relatively small value. For example, the second preset value may be 30% of either of the two induced currents. Certainly, the second preset value may alternatively be another value. This is not limited in this embodiment of this application.

Figure 13:
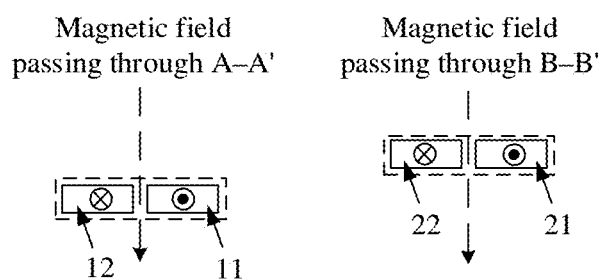
FIG. 13 is a schematic diagram of induced currents in coils according to an embodiment of this application.

It should be noted that FIG. 13 is a cross section chart of A-A' and B-B' in FIG. 3 or FIG. 4. As shown in FIG. 13, when a magnetic field passes through the gap between the first outer side part 11 and the first inner side part 12, induced currents with almost equal magnitudes and in opposite directions are generated in the first outer side part 11 and the first inner side part 12, and when the magnetic field passes through the gap between the second outer side part 21 and the second inner side part 22, induced currents with almost equal magnitudes and in opposite directions are generated in the second outer side part 21 and the second inner side part 22. Therefore, when the area of the projection of the gap between the first outer side part 11 and the first inner side part 12 on the plane on which the first planar coil winding 1 is located is equal to or close to the area of the projection of the gap between the second outer side part 21 and the second inner side part 22 on the plane on which the first planar coil winding 1 is located, an induced current generated when a magnetic field passes through the gap between the first outer side part 11 and the first inner side part 12 is equal to or close to an induced current generated when a magnetic field passes through the gap between the second outer side part 21 and the second inner side part 22. In this way, an induced-current cancellation effect can be effectively improved, thereby effectively improving wireless charging efficiency.

Figure 14:
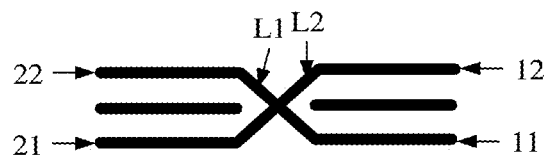
FIG. 14 is a schematic diagram of a first type of crossing between an outer side part and an inner side part according to an embodiment of this application.

In a second refined structure, referring to FIG. 14, the first coil of the first planar coil winding 1 may include a plurality of parts. The plurality of parts may include the first outer side part 11, the first inner side part 12, and at least one other part. Any two of the plurality of parts are separated from each other. The end part of the first coil of the first planar coil winding 1 includes the end part of the first outer side part 11, the end part of the first inner side part 12, and an end part of the at least one other part. The first coil of the second planar coil winding 2 may also include a plurality of parts. The plurality of parts may include the second outer side part 21, the second inner side part 22, and at least one other part. Any two of the plurality of parts are separated from each other. The end part of the first coil of the second planar coil winding 2 includes the end part of the second outer side part 21, the end part of the second inner side part 22, and an end part of the at least one other part.

A quantity of the plurality of parts included in the first coil of the first planar coil winding 1 is the same as a quantity of the plurality of parts included in the first coil of the second planar coil winding 2. Moreover, the plurality of parts included in the first coil of the first planar coil winding 1 are in a one-to-one correspondence with the plurality of parts included in the first coil of the second planar coil winding 2. In this case, the coil module may further include a plurality of connection parts. A quantity of the plurality of connection parts is also the same as the quantity of the plurality of parts included in the first coil of the first planar coil winding 1. Moreover, the plurality of connection parts are in a one-to-one correspondence with the plurality of parts included in the first coil of the first planar coil winding 1. The end part of the first outer side part 11, the end part of the first inner side part 12, and the end part of the at least one other part of the first coil of the first planar coil winding 1 may be respectively connected to the end part of the second inner side part 22, the end part of the second outer side part 21, and the end part of the at least one other part of the first coil of the second planar coil winding 2 by using the plurality of connection parts. In this way, a serial cross-connection structure is formed between the first coil of the first planar coil winding 1 and the first coil of the second planar coil winding 2, to be specific, projections of a plurality of target conducting wires formed by the plurality of parts included in the first coil of the first planar coil winding 1 and the plurality of parts included in the first coil of the second planar coil winding 2 cross on the plane on which the first planar coil winding 1 (or the second planar coil winding 2) is located. This can not only reduce an eddy current loss by reducing a coil width, but also reduce a circulating current loss in the first planar coil winding 1 and the second planar coil winding 2 by using the serial cross-connection structure, thereby effectively improving wireless charging efficiency.

It should be noted that the plurality of connection parts are not electrically connected to each other, and any one of the plurality of connection parts is not electrically connected to a part of the coil module other than an end part of a part included in the first coil of the first planar coil winding 1 and an end part of a part included in the first coil of the second planar coil winding 2 that are connected to the connection part.

Figure 15:
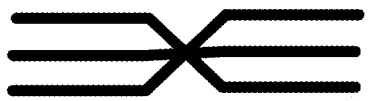
FIG. 15 is a schematic diagram of a second type of crossing between an outer side part and an inner side part according to an embodiment of this application.
Figure 16:
FIG. 16 is a schematic diagram of a third type of crossing between an outer side part and an inner side part according to an embodiment of this application.

For example, when the first coil of the first planar coil winding 1 further includes one part in addition to the first outer side part 11 and the first inner side part 12, and the first coil of the second planar coil winding 2 further includes one part in addition to the second outer side part 21 and the second inner side part 22, the three parts of the first coil of the first planar coil winding 1 may be respectively connected to the three parts of the first coil of the second planar coil winding 2 by using three connection parts, so that a serial cross-connection structure shown in FIG. 15 or FIG. 16 can be formed.

Figure 17:
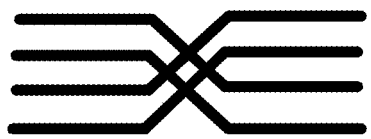
FIG. 17 is a schematic diagram of a fourth type of crossing between an outer side part and an inner side part according to an embodiment of this application.
Figure 18:
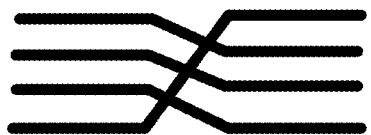
FIG. 18 is a schematic diagram of a fifth type of crossing between an outer side part and an inner side part according to an embodiment of this application.
Figure 19:
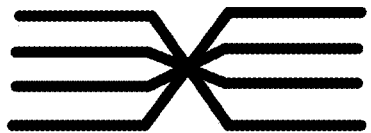
FIG. 19 is a schematic diagram of a sixth type of crossing between an outer side part and an inner side part according to an embodiment of this application.

For another example, when the first coil of the first planar coil winding 1 further includes two parts in addition to the first outer side part 11 and the first inner side part 12, and the first coil of the second planar coil winding 2 further includes two parts in addition to the second outer side part 21 and the second inner side part 22, the four parts of the first coil of the first planar coil winding 1 may be respectively connected to the four parts of the first coil of the second planar coil winding 2 by using four connection parts, so that a serial cross-connection structure shown in FIG. 17, FIG. 18, or FIG. 19 can be formed.

In a third refined structure, a location of the first outer side part 11 is opposite to a location of the second outer side part 21, and a location of the first inner side part 12 is opposite to a location of the second inner side part 22.

To be specific, a projection of the first outer side part 11 on the plane on which the first planar coil winding 1 (or the second planar coil winding 2) is located coincides with a projection of the second outer side part 21 on the plane on which the first planar coil winding 1 (or the second planar coil winding 2) is located, and a projection of the first inner side part 12 on the plane on which the first planar coil winding 1 (or the second planar coil winding 2) is located coincides with a projection of the second inner side part 22 on the plane on which the first planar coil winding 1 (or the second planar coil winding 2) is located.

It should be noted that, because the first outer side part 11 and the first inner side part 12 belong to the first coil of the first planar coil winding 1, and the second outer side part 21 and the second inner side part 22 belong to the first coil of the second planar coil winding 2, it is relatively easy to dispose the first outer side part 11 and the second outer side part 21 at locations opposite to each other, and dispose the first inner side part 12 and the second inner side part 22 at locations opposite to each other.

Figure 20:
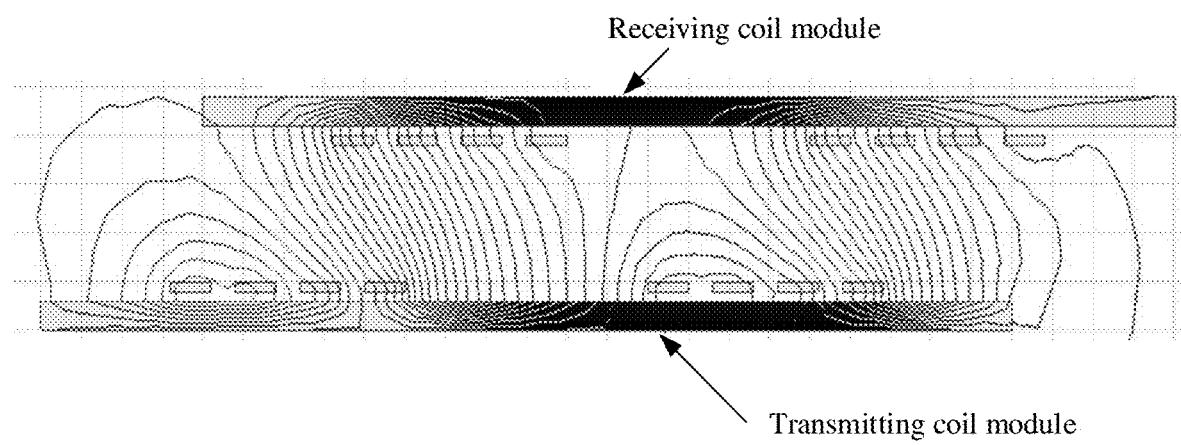
FIG. 20 is a schematic diagram of magnetic field distribution according to an embodiment of this application.

In addition, as shown in FIG. 20, in actual application, a transmitting coil module and a receiving coil module may not be precisely aligned with each other, and may deviate from each other to some extent, resulting in uneven magnetic-field distribution between the transmitting coil module and the receiving coil module, that is, resulting in different magnetic-field distributions at different locations of the transmitting coil module or the receiving coil module. In this embodiment of this application, after the first outer side part 11 and the second outer side part 21 are disposed at locations opposite to each other, and the first inner side part 12 and the second inner side part 22 are disposed at locations opposite to each other, when the transmitting coil module and the receiving coil module are not precisely aligned with each other, a magnetic field in which the first outer side part 11 and the first inner side part 12 are located can be relatively the same as a magnetic field in which the second outer side part 21 and the second inner side part 22 are located. In this case, an induced current generated when the magnetic field passes through the gap between the first outer side part 11 and the first inner side part 12 is relatively close to an induced current generated when the magnetic field passes through the gap between the second outer side part 21 and the second inner side part 22, so that an induced-current cancellation effect can be effectively improved, thereby effectively improving wireless charging efficiency.

Based on the foregoing structure, a parallel cross-connection between the coil of the first planar coil winding 1 and the coil of the second planar coil winding 2 may be further implemented. The following describes the parallel cross-connection structure.

Figure 21:
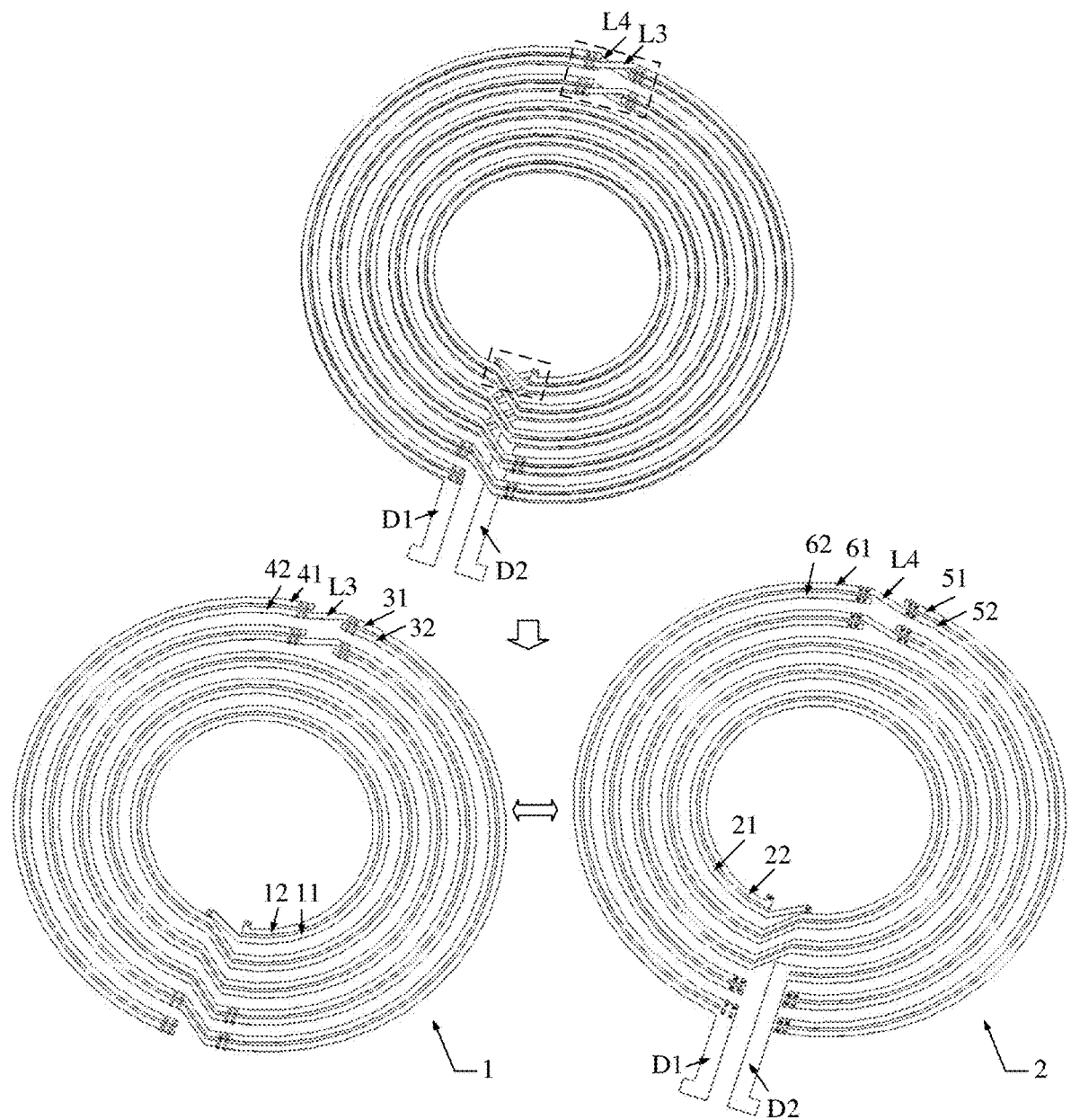
FIG. 21 is a schematic structural diagram of a seventh coil module according to an embodiment of this application.

Referring to FIG. 21, the coil module may further include a third connection part L3 and a fourth connection part L4.

Parts in the first planar coil winding 1 other than the first outer side part 11 and the first inner side part 12 include a first segment and a second segment. There is an opening between the first segment and the second segment. The first segment includes a third outer side part 31 and a third inner side part 32. Between the third outer side part 31 and the third inner side part 32, there is a gap extending along a coiling direction of the first segment. The second segment includes a fourth outer side part 41 and a fourth inner side part 42. Between the fourth outer side part 41 and the fourth inner side part 42, there is a gap extending along a coiling direction of the second segment.

Parts in the second planar coil winding 2 other than the second outer side part 21 and the second inner side part 22 include a third segment and a fourth segment. There is an opening between the third segment and the fourth segment. The third segment includes a fifth outer side part 51 and a fifth inner side part 52. Between the fifth outer side part 51 and the fifth inner side part 52, there is a gap extending along a coiling direction of the third segment. The fourth segment includes a sixth outer side part 61 and a sixth inner side part 62. Between the sixth outer side part 61 and the sixth inner side part 62, there is a gap extending along a coiling direction of the fourth segment.

The third outer side part 31 and the fifth outer side part 51 are connected in parallel. The third inner side part 32 and the fifth inner side part 52 are connected in parallel. The fourth outer side part 41 and the sixth outer side part 61 are connected in parallel. The fourth inner side part 42 and the sixth inner side part 62 are connected in parallel. The third connection part L3 is located between the third outer side part 31 and the fourth inner side part 42. The third outer side part 31 and the fourth inner side part 42 are connected to each other by using the third connection part L3. The fourth connection part L4 is located between the fifth inner side part 52 and the sixth outer side part 61. The fifth inner side part 52 and the sixth outer side part 61 are connected to each other by using the fourth connection part L4.

In this case, the first coil of the first planar coil winding 1 and the first coil of the second planar coil winding 2 are in a serial cross-connection structure, and the first and the second segments of the first planar coil winding 1 and the third and the fourth segments of the second planar coil winding 2 are in a parallel cross-connection structure.

It should be noted that, a current that flows into the coil module from an external circuit or a current generated by the coil module may first flow into the third outer side part 31 in the first segment of the first planar coil winding 1 and the fifth outer side part 51 in the third segment of the second planar coil winding 2, and simultaneously flow into the third inner side part 32 in the first segment of the first planar coil winding 1 and the fifth inner side part 52 in the third segment of the second planar coil winding 2, then flow to the fourth inner side part 42 in the second segment of the first planar coil winding 1 and the sixth inner side part 62 in the fourth segment of the second planar coil winding 2 from the third outer side part 31 and the fifth outer side part 51 through the third connection part L3, and simultaneously flow to the fourth outer side part 41 in the second segment of the first planar coil winding 1 and the sixth outer side part 61 in the fourth segment of the second planar coil winding 2 from the third inner side part 32 and the fifth inner side part 52 through the fourth connection part L4, and finally flow out of the second planar coil winding 2.

Alternatively, a current that flows into the coil module from an external circuit or a current generated by the coil module may first flow into the sixth outer side part 61 in the fourth segment of the second planar coil winding 2 and the fourth outer side part 41 in the second segment of the first planar coil winding 1, and simultaneously flow into the sixth inner side part 62 in the fourth segment of the second planar coil winding 2 and the fourth inner side part 42 in the second segment of the first planar coil winding 1, then flow to the third inner side part 32 in the first segment of the first planar coil winding 1 and the fifth inner side part 52 in the third segment of the second planar coil winding 2 from the sixth outer side part 61 and the fourth outer side part 41 through the fourth connection part L4, and simultaneously flow to the third outer side part 31 in the first segment of the first planar coil winding 1 and the fifth outer side part 51 in the third segment of the second planar coil winding 2 from the sixth inner side part 62 and the fourth inner side part 42 through the third connection part L3, and finally flow out of the first planar coil winding 1.

It should be noted that, a structure of the third outer side part 31 and the third inner side part 32, a structure of the fourth outer side part 41 and the fourth inner side part 42, a structure of the fifth outer side part 51 and the fifth inner side part 52, and a structure of the sixth outer side part 61 and the sixth inner side part 62 are similar to that of the first outer side part 11 and the first inner side part 12, and details are not described in this embodiment of this application again.

In addition, the third connection part L3 is located in the opening between the first segment and the second segment, and the fourth connection part L4 is located in the opening between the third segment and the fourth segment. The third connection part L3 and the third outer side part 31 may be connected to each other through integral forming, welding, a via hole, or the like. The third connection part L3 and the fourth inner side part 42 may be connected to each other through integral forming, welding, a via hole, or the like. The fourth connection part L4 and the fifth inner side part 52 may be connected to each other through integral forming, welding, a via hole, or the like. The fourth connection part L4 and the sixth outer side part 61 may be connected to each other through integral forming, welding, a via hole, or the like.

Moreover, the third connection part L3 is not electrically connected to the fourth connection part L4. The third connection part L3 is not electrically connected to a part of the coil module other than the third outer side part 31, the fifth outer side part 51, the fourth inner side part 42, and the sixth inner side part 62. The fourth connection part L4 is not electrically connected to a part of the coil module other than the fifth inner side part 52, the third inner side part 32, the sixth outer side part 61, and the fourth outer side part 41.

When the third outer side part 31 and the fifth outer side part 51 are connected in parallel, the third outer side part 31 and the fifth outer side part 51 may be connected in parallel through at least two via holes. Specifically, at least one third via hole penetrates a first end of the third outer side part 31 and a first end of the fifth outer side part 51, and the first end of the third outer side part 31 is electrically connected to the first end of the fifth outer side part 51 through the at least one third via hole, at least one fourth via hole penetrates a second end of the third outer side part 31 and a second end of the fifth outer side part 51, and the second end of the third outer side part 31 is electrically connected to the second end of the fifth outer side part 51 through the at least one fourth via hole. In this way, the third outer side part 31 and the fifth outer side part 51 are connected in parallel. A manner in which the third inner side part 32 and the fifth inner side part 52 are connected in parallel, a manner in which the fourth outer side part 41 and the sixth outer side part 61 are connected in parallel, and a manner in which the fourth inner side part 42 and the sixth inner side part 62 are connected in parallel are similar to a manner in which the third outer side part 31 and the fifth outer side part 51 are connected in parallel, and details are not described in this embodiment of this application again.

Figure 22:
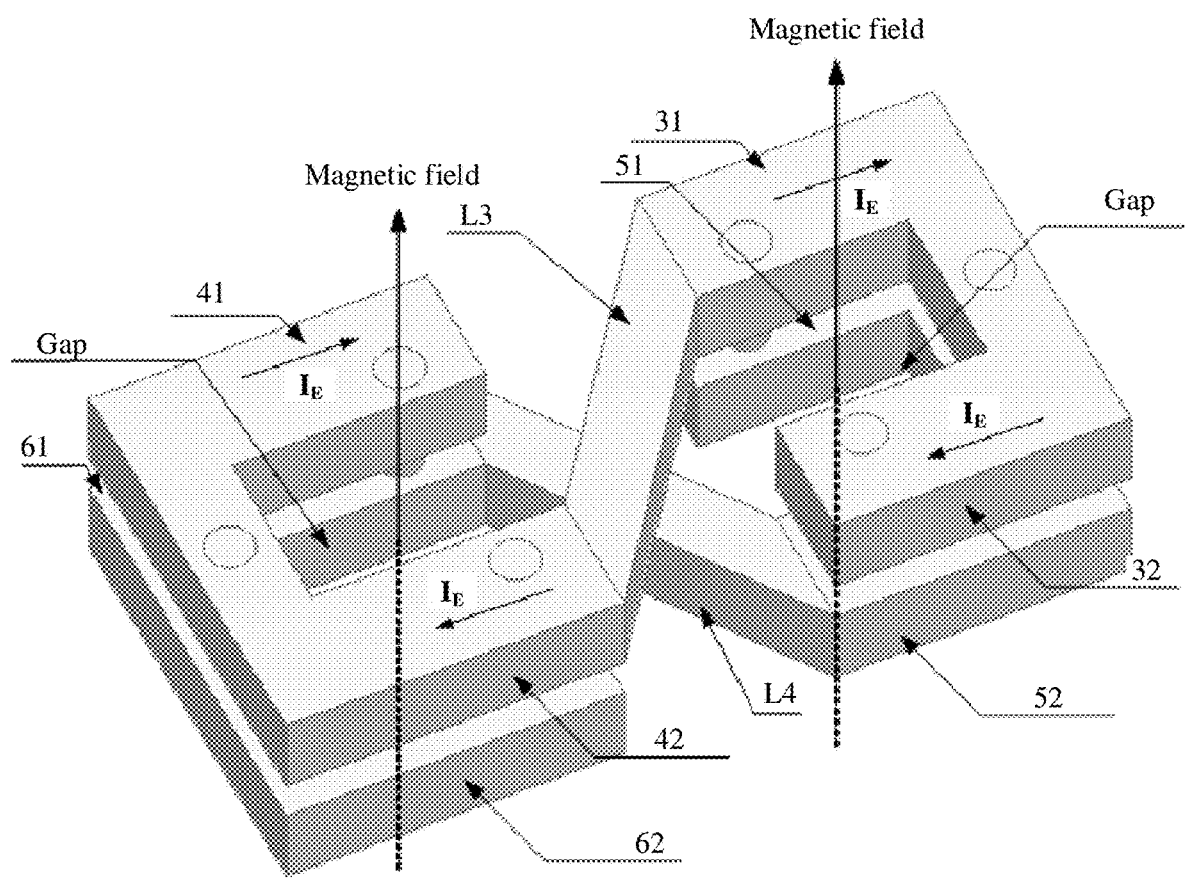
FIG. 22 is a schematic diagram of another cross connection between an outer side part and an inner side part according to an embodiment of this application.

It should be noted that, referring to FIG. 22, the third outer side part 31, the fifth outer side part 51, the third connection part L3, the fourth inner side part 42, and the sixth inner side part 62 form one target conducting wire, and the third inner side part 32, the fifth inner side part 52, the fourth connection part L4, the fourth outer side part 41, and the sixth outer side part 61 form one target conducting wire. Projections of the two target conducting wires cross each other on the plane on which the first planar coil winding 1 (or the second planar coil winding 2) is located. In this case, when a magnetic field passes through the gap between the third outer side part 31 and the third inner side part 32, the gap between the fifth outer side part 51 and the fifth inner side part 52, the gap between the fourth outer side part 41 and the fourth inner side part 42, and the gap between the sixth outer side part 61 and the sixth inner side part 62, induced currents $I_E$ generated on the two target conducting wires are in opposite directions. Therefore, the induced currents can cancel out at least a part of each other, thereby effectively reducing a circulating current loss in the first planar coil winding 1 and the second planar coil winding 2, and improving wireless charging efficiency of the coil module.

Figure 23:
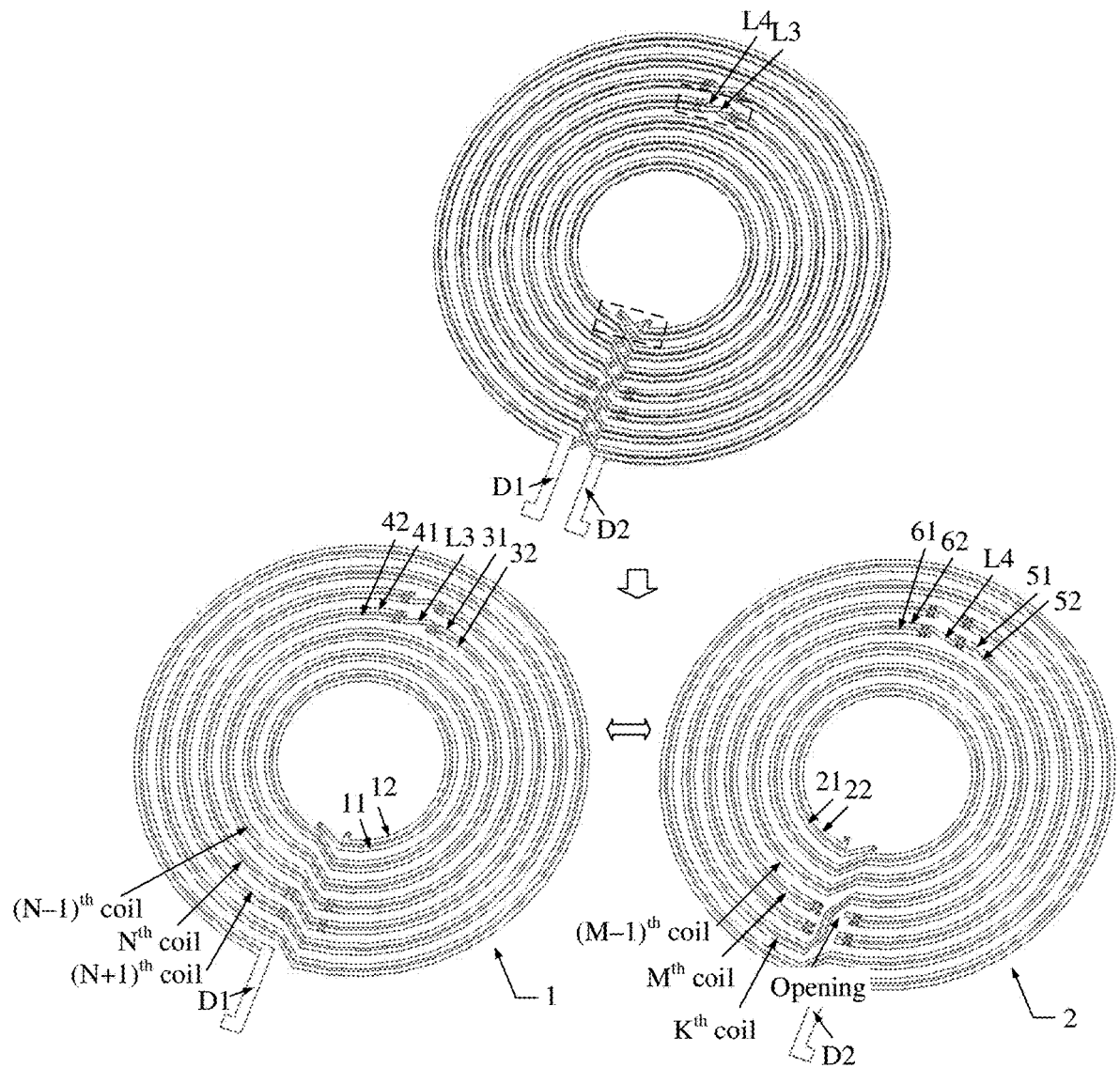
FIG. 23 is a schematic structural diagram of an eighth coil module according to an embodiment of this application.

Further, referring to FIG. 23, the first segment and the second segment are located at an $N^{th}$ coil of the first planar coil winding 1, the third segment and the fourth segment are located at an $M^{th}$ coil of the second planar coil winding 2, the $N^{th}$ coil is any coil between the innermost coil of the first planar coil winding 1 and the outermost coil of the first planar coil winding 1, and the $M^{th}$ coil is any coil between the innermost coil of the second planar coil winding 2 and the outermost coil of the second planar coil winding 2.

One end of the $N^{th}$ coil extends to one end of an $(N-1)^{th}$ coil in the first planar coil winding 1, where the $(N-1)^{th}$ coil is located at an inner side of the $N^{th}$ coil and is adjacent to the $N^{th}$ coil. The other end of the $N^{th}$ coil extends to one end of an $(N+1)^{th}$ coil in the first planar coil winding 1, where the $(N+1)^{th}$ coil is located at an outer side of the $N^{th}$ coil and is adjacent to the $N^{th}$ coil. The $M^{th}$ coil has another opening in addition to the opening between the third segment and the fourth segment. One end of an $(M-1)^{th}$ coil in the second planar coil winding 2 passes through the another opening and extends to one end of a $K^{th}$ coil that is in the second planar coil winding 2 and that is located at an outer side of the $M^{th}$ coil, where the $(M-1)^{th}$ coil is located at an inner side of the $M^{th}$ coil and is adjacent to the $M^{th}$ coil.

In this case, in the first planar coil winding 1 and the second planar coil winding 2, the $(N+1)^{th}$ coil and the $N^{th}$ coil may be first connected in series, next, the $N^{th}$ coil and the $M^{th}$ coil are connected in parallel, and the $N^{th}$ coil, the $(N-1)^{th}$ coil, and the first coil of the first planar coil winding 1 are sequentially connected in series, then the first coil of the first planar coil winding 1 and the first coil of the second planar coil winding 2 are connected in series, and finally, the first coil of the second planar coil winding 2, the $(M-1)^{th}$ coil, and the $K^{th}$ coil are sequentially connected in series.

It should be noted that, a current that flows into the coil module from an external circuit or a current generated by the coil module may flow into the $(N+1)^{th}$ coil of the first planar coil winding 1, then flow from the $(N+1)^{th}$ coil to the $N^{th}$ coil of the first planar coil winding 1 and the $M^{th}$ coil of the second planar coil winding 2, then flow from the $N^{th}$ coil and the $M^{th}$ coil to the $(N-1)^{th}$ coil of the first planar coil winding 1, then flow from the $(N-1)^{th}$ coil to the first coil of the first planar coil winding 1, then flow from the first coil of the first planar coil winding 1 to the first coil of the second planar coil winding 2, then flow from the first coil of the second planar coil winding 2 to the $(M-1)^{th}$ coil of the second planar coil winding 2, then flow from the $(M-1)^{th}$ coil to the $K^{th}$ coil of the second planar coil winding 2, and finally flow out of the second planar coil winding 2.

Alternatively, a current that flows into the coil module from an external circuit or a current generated by the coil module may flow into the $K^{th}$ coil of the second planar coil winding 2, then flow from the $K^{th}$ coil to the $(M-1)^{th}$ coil of the second planar coil winding 2, then flow from the $(M-1)^{th}$ coil to the first coil of the second planar coil winding 2, then flow from the first coil of the second planar coil winding 2 to the first coil of the first planar coil winding 1, then flow from the first coil of the first planar coil winding 1 to the $(N-1)^{th}$ coil of the first planar coil winding 1, then flow from the $(N-1)^{th}$ coil to the $N^{th}$ coil of the first planar coil winding 1 and the $M^{th}$ coil of the second planar coil winding 2, then flow from the $N^{th}$ coil and the $M^{th}$ coil to the $(N+1)^{th}$ coil of the first planar coil winding 1, and finally flow out of the first planar coil winding 1.

In the foregoing structure, the coil module may further include a lead-in end and a lead-out end that are connected to the external circuit, and the external circuit may provide electric energy for the first planar coil winding 1 and the second planar coil winding 2 through the lead-in end and the lead-out end, or the first planar coil winding 1 and the second planar coil winding 2 may output electric energy to the external circuit through the lead-in end and the lead-out end. The following describes a structure of the lead-in end and the lead-out end of the coil module.

In a first possible implementation, the first coil of the first planar coil winding 1 is the innermost coil of the first planar coil winding 1, and the first coil of the second planar coil winding 2 is the innermost coil of the second planar coil winding 2. In this case, referring to FIG. 3, FIG. 6, FIG. 7, FIG. 21, or FIG. 23, the coil module includes a first conducting wire D1 and a second conducting wire D2. One end of the first conducting wire D1 is a first end of the coil module, and the other end of the first conducting wire D1 is connected to an end part of a first target coil. One end of the second conducting wire D2 is a second end of the coil module, and the other end of the second conducting wire D2 is connected to an end part of a second target coil. One of the first end of the coil module and the second end of the coil module is the lead-in end, and the other is the lead-out end.

It should be noted that the first target coil is the last coil connected in series to an end part of the innermost coil of the first planar coil winding 1, in the plurality of coils of the first planar coil winding 1 in a sequence from the innermost coil to the outermost coil. In other words, the first target coil is an outermost coil in at least one coil sequentially connected in series to the end part of the innermost coil of the first planar coil winding 1. The second target coil is the last coil connected in series to an end part of the innermost coil of the second planar coil winding 2, in the plurality of coils of the second planar coil winding 2 in a sequence from the innermost coil to the outermost coil. In other words, the second target coil is an outermost coil in at least one coil sequentially connected in series to the end part of the innermost coil of the second planar coil winding 2.

For example, as shown in FIG. 21, in the plurality of coils of the first planar coil winding 1 in the sequence from the innermost coil to the outermost coil, the last coil connected in series to the end part of the innermost coil of the first planar coil winding 1 is the outermost coil of the first planar coil winding 1, and therefore, the outermost coil of the first planar coil winding 1 is the first target coil, in the plurality of coils of the second planar coil winding 2 in the sequence from the innermost coil to the outermost coil, the last coil connected in series to the end part of the innermost coil of the second planar coil winding 2 is a third coil of the second planar coil winding 2, and therefore, the third coil of the second planar coil winding 2 is the second target coil.

When the other end of the first conducting wire D1 is connected to the end part of the first target coil, the other end of the first conducting wire D1 may directly coincide with the end part of the first target coil. Alternatively, if the first target coil is connected in parallel to one coil of the second planar coil winding 2, the other end of the first conducting wire D1 may coincide with an end part of the one coil that is of the second planar coil winding 2 and that is connected in parallel to the first target coil. A manner in which the other end of the second conducting wire D2 is connected to the end part of the second target coil is similar to a manner in which the other end of the first conducting wire D1 is connected to the end part of the first target coil. Details are not described in this embodiment of this application again.

Figure 7:
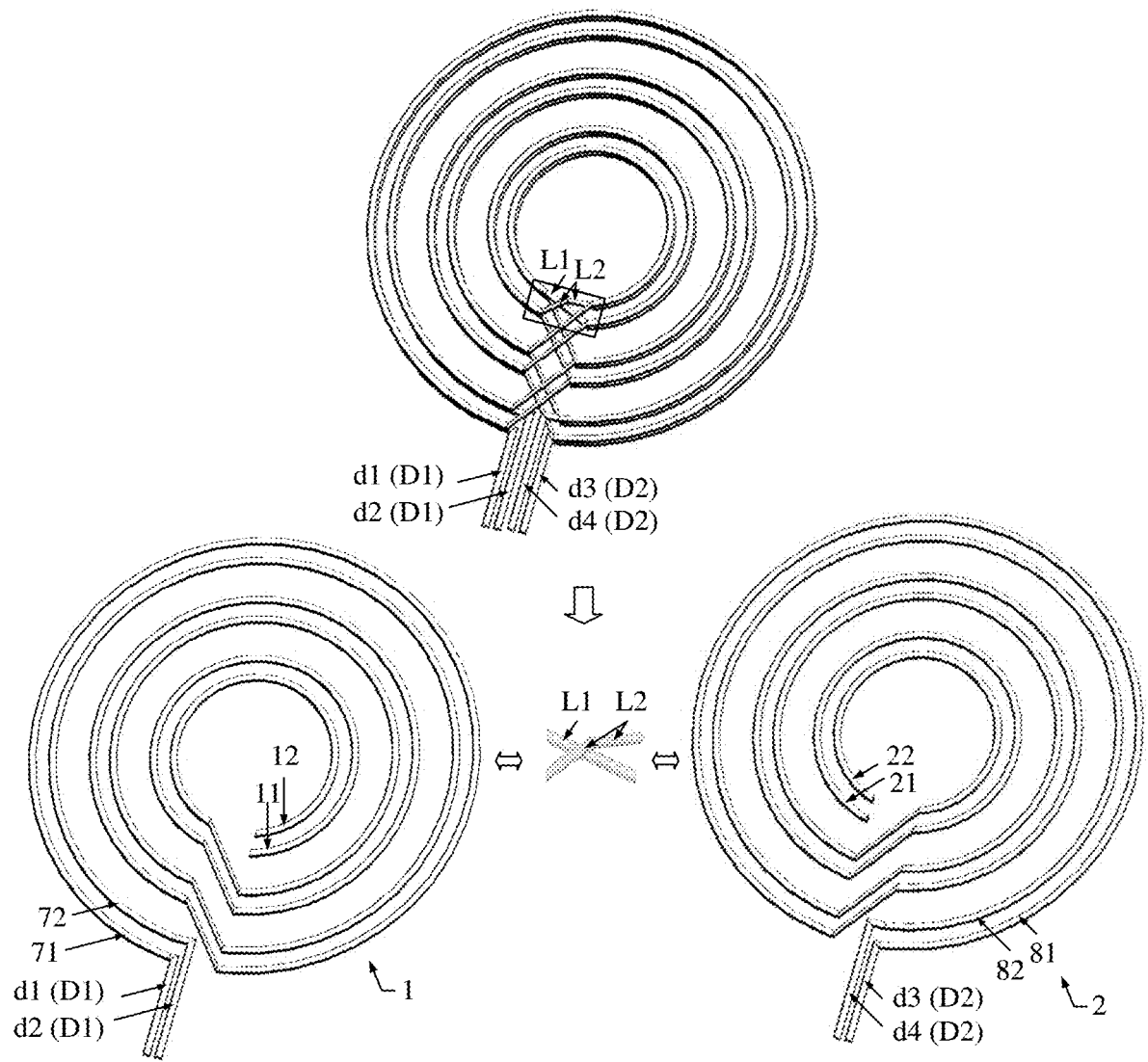
FIG. 7 is a schematic structural diagram of a fourth coil module according to an embodiment of this application.
Figure 8:
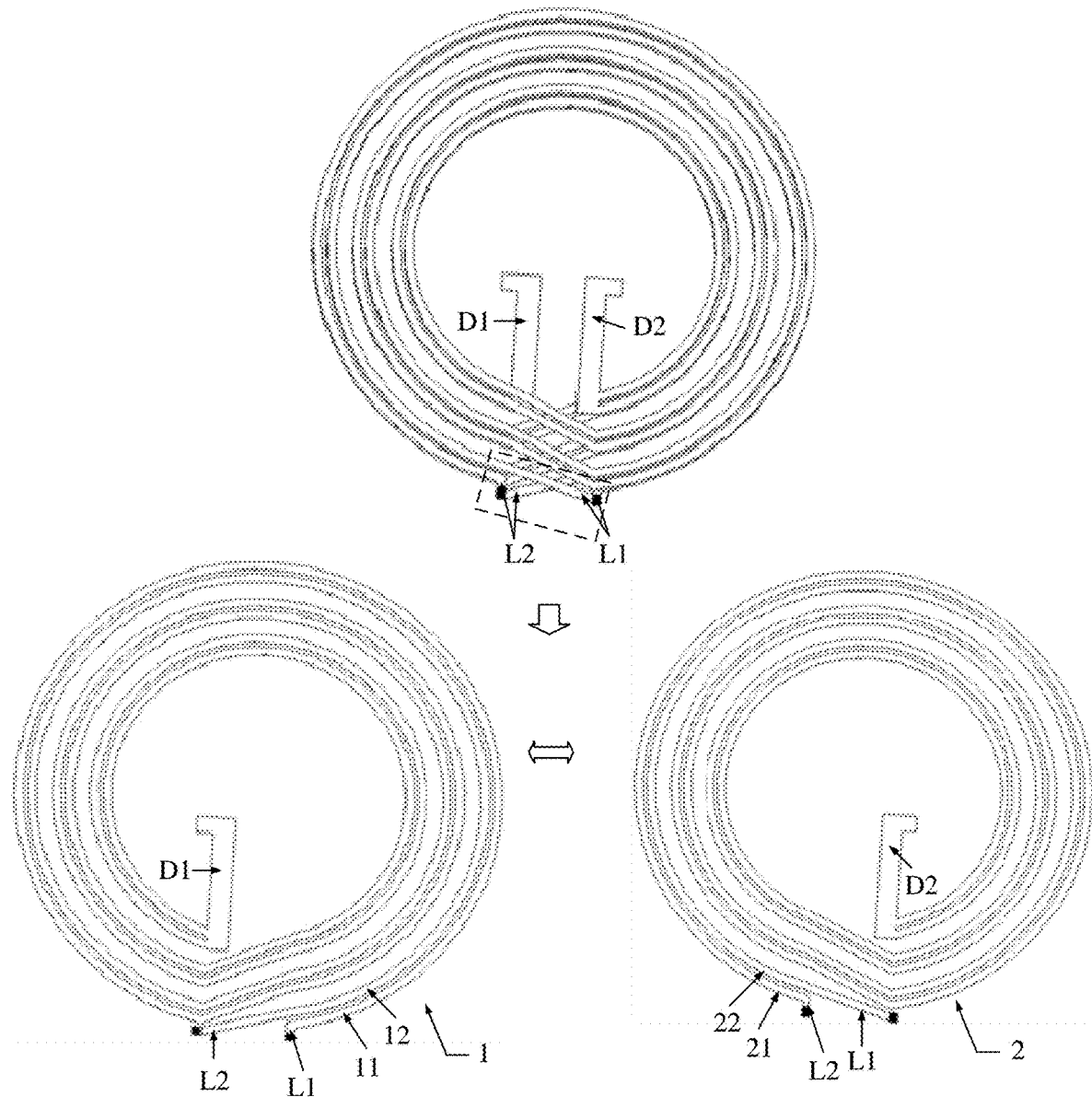
FIG. 8 is a schematic structural diagram of a fifth coil module according to an embodiment of this application.

Further, referring to FIG. 7, along a length direction of the first conducting wire D1, the first conducting wire D1 includes a first conducting sub-wire d1 and a second conducting sub-wire d2 that are separated from each other, and along a coiling direction of the first target coil, the first target coil includes a seventh outer side part 71 and a seventh inner side part 72 that are separated from each other. An end part of the seventh outer side part 71 is connected to an end part of the first conducting sub-wire d1, and an end part of the seventh inner side part 72 is connected to an end part of the second conducting sub-wire d2.

In this case, a target conducting wire is formed by connecting the end part of the seventh outer side part 71 and the end part of the first conducting sub-wire d1, and a target conducting wire is formed by connecting the end part of the seventh inner side part 72 and the end part of the second conducting sub-wire d2. When the first conducting sub-wire d1 is located at an outer side of the second conducting sub-wire d2, projections of the two target conducting wires do not cross each other on the plane on which the first planar coil winding 1 (or the second planar coil winding 2) is located. When the first conducting sub-wire d1 is located at an inner side of the second conducting sub-wire d2, projections of the two target conducting wires cross each other on the plane on which the first planar coil winding 1 (or the second planar coil winding 2) is located.

It should be noted that the end part of the first conducting sub-wire d1 is separated from the end part of the second conducting sub-wire d2. One end that is of the first conducting sub-wire d1 and that is away from the end part of the seventh outer side part 71 may be connected to one end that is of the second conducting sub-wire d2 and that is away from the end part of the seventh inner side part 72, to form the first end of the coil module, and the connection may be implemented by using a terminal, to form the first end of the coil module.

Further, referring to FIG. 7, along a length direction of the second conducting wire D2, the second conducting wire D2 includes a third conducting sub-wire d3 and a fourth conducting sub-wire d4 that are separated from each other, and along a coiling direction of the second target coil, the second target coil includes an eighth outer side part 81 and an eighth inner side part 82 that are separated from each other. An end part of the eighth outer side part 81 is connected to an end part of the third conducting sub-wire d3, and an end part of the eighth inner side part 82 is connected to an end part of the fourth conducting sub-wire d4.

In this case, a target conducting wire is formed by connecting the end part of the eighth outer side part 81 and the end part of the third conducting sub-wire d3, and a target conducting wire is formed by connecting the end part of the eighth inner side part 82 and the end part of the fourth conducting sub-wire d4. When the third conducting sub-wire d3 is located at an outer side of the fourth conducting sub-wire d4, projections of the two target conducting wires do not cross each other on the plane on which the first planar coil winding 1 (or the second planar coil winding 2) is located. When the third conducting sub-wire d3 is located at an inner side of the fourth conducting sub-wire d4, projections of the two target conducting wires cross each other on the plane on which the first planar coil winding 1 (or the second planar coil winding 2) is located.

It should be noted that the end part of the third conducting sub-wire d3 is separated from the end part of the fourth conducting sub-wire d4. One end that is of the third conducting sub-wire d3 and that is away from the end part of the eighth outer side part 81 may be connected to one end that is of the fourth conducting sub-wire d4 and that is away from the end part of the eighth inner side part 82, to form the second end of the coil module, and the connection may be implemented by using a terminal, to form the second end of the coil module.

In a second possible implementation, the first coil of the first planar coil winding 1 is the outermost coil of the first planar coil winding 1, and the first coil of the second planar coil winding 2 is the outermost coil of the second planar coil winding 2. In this case, referring to FIG. 4, FIG. 8, or FIG. 9, the coil module includes a first conducting wire D1 and a second conducting wire D2. One end of the first conducting wire D1 is a first end of the coil module, and the other end of the first conducting wire D1 is connected to an end part of a third target coil. One end of the second conducting wire D2 is a second end of the coil module, and the other end of the second conducting wire D2 is connected to an end part of a fourth target coil. One of the first end of the coil module and the second end of the coil module is the lead-in end, and the other is the lead-out end.

It should be noted that the third target coil is the last coil connected in series to an end part of the outermost coil of the first planar coil winding 1, in the plurality of coils of the first planar coil winding 1 in a sequence from the outermost coil to the innermost coil. In other words, the third target coil is an innermost coil in at least one coil sequentially connected in series to the end part of the outermost coil of the first planar coil winding 1. The fourth target coil is the last coil connected in series to an end part of the outermost coil of the second planar coil winding 2, in the plurality of coils of the second planar coil winding 2 in a sequence from the outermost coil to the innermost coil. In other words, the fourth target coil is an innermost coil in at least one coil sequentially connected in series to the end part of the outermost coil of the second planar coil winding 2.

When the other end of the first conducting wire D1 is connected to the end part of the third target coil, the other end of the first conducting wire D1 may directly coincide with the end part of the third target coil. Alternatively, if the third target coil is connected in parallel to one coil of the second planar coil winding 2, the other end of the first conducting wire D1 may coincide with an end part of the one coil that is of the second planar coil winding 2 and that is connected in parallel to the third target coil. A manner in which the other end of the second conducting wire D2 is connected to the end part of the fourth target coil is similar to a manner in which the other end of the first conducting wire D1 is connected to the end part of the third target coil. Details are not described in this embodiment of this application again.

Figure 9:
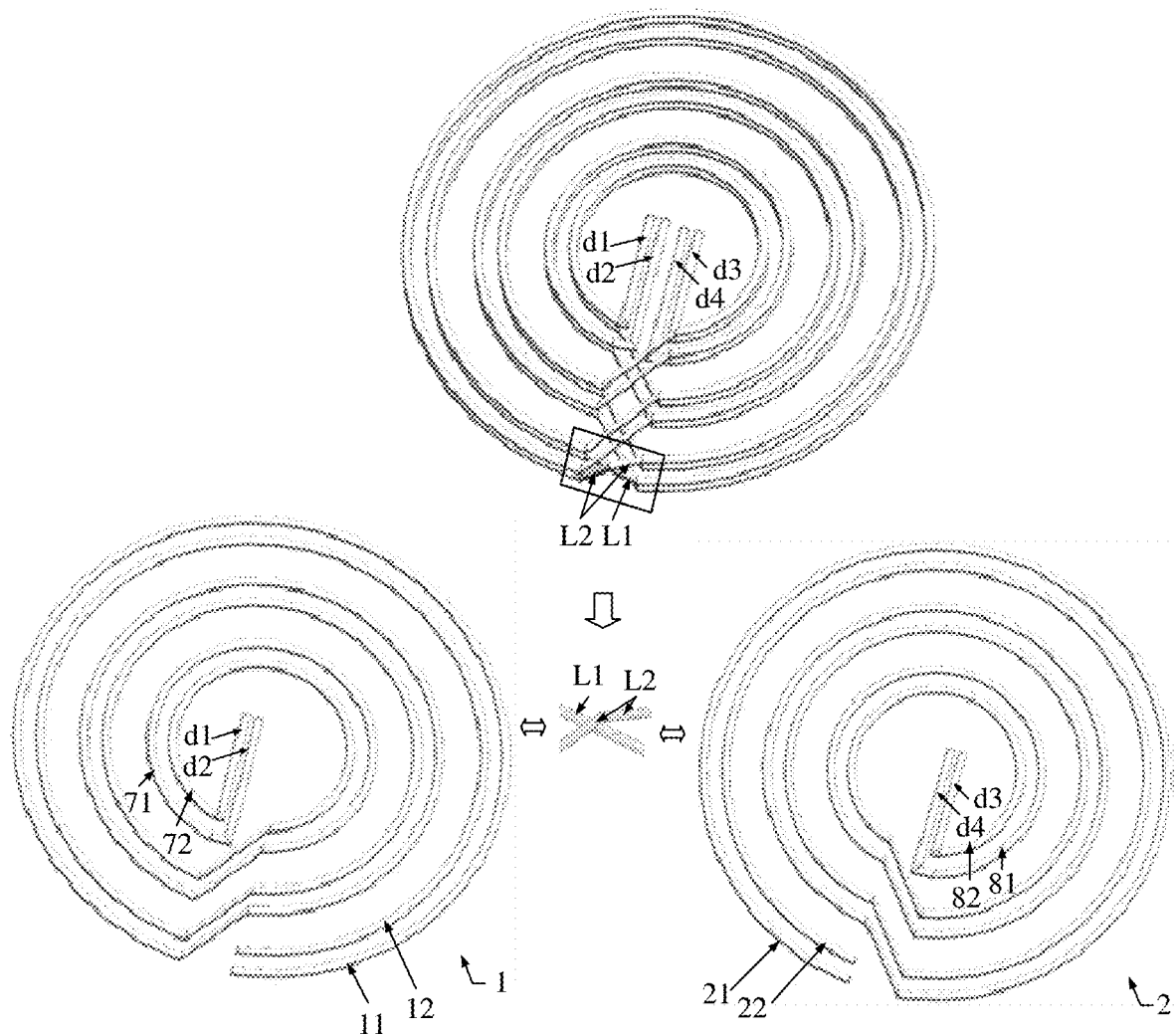
FIG. 9 is a schematic structural diagram of a sixth coil module according to an embodiment of this application.

Further, referring to FIG. 9, along a length direction of the first conducting wire D1, the first conducting wire D1 includes a first conducting sub-wire d1 and a second conducting sub-wire d2 that are separated from each other, and along a coiling direction of the third target coil, the third target coil includes a seventh outer side part 71 and a seventh inner side part 72 that are separated from each other. An end part of the seventh outer side part 71 is connected to an end part of the first conducting sub-wire d1, and an end part of the seventh inner side part 72 is connected to an end part of the second conducting sub-wire d2.

In this case, a target conducting wire is formed by connecting the end part of the seventh outer side part 71 and the end part of the first conducting sub-wire d1, and a target conducting wire is formed by connecting the end part of the seventh inner side part 72 and the end part of the second conducting sub-wire d2. When the first conducting sub-wire d1 is located at an outer side of the second conducting sub-wire d2, projections of the two target conducting wires do not cross each other on the plane on which the first planar coil winding 1 (or the second planar coil winding 2) is located. When the first conducting sub-wire d1 is located at an inner side of the second conducting sub-wire d2, projections of the two target conducting wires cross each other on the plane on which the first planar coil winding 1 (or the second planar coil winding 2) is located.

It should be noted that the end part of the first conducting sub-wire d1 is separated from the end part of the second conducting sub-wire d2. One end that is of the first conducting sub-wire d1 and that is away from the end part of the seventh outer side part 71 may be connected to one end that is of the second conducting sub-wire d2 and that is away from the end part of the seventh inner side part 72, to form the first end of the coil module, and the connection may be implemented by using a terminal, to form the first end of the coil module.

Further, referring to FIG. 9, along a length direction of the second conducting wire D2, the second conducting wire D2 includes a third conducting sub-wire d3 and a fourth conducting sub-wire d4 that are separated from each other, and along a coiling direction of the fourth target coil, the fourth target coil includes an eighth outer side part 81 and an eighth inner side part 82 that are separated from each other. An end part of the eighth outer side part 81 is connected to an end part of the third conducting sub-wire d3, and an end part of the eighth inner side part 82 is connected to an end part of the fourth conducting sub-wire d4.

In this case, a target conducting wire is formed by connecting the end part of the eighth outer side part 81 and the end part of the third conducting sub-wire d3, and a target conducting wire is formed by connecting the end part of the eighth inner side part 82 and the end part of the fourth conducting sub-wire d4. When the third conducting sub-wire d3 is located at an outer side of the fourth conducting sub-wire d4, projections of the two target conducting wires do not cross each other on the plane on which the first planar coil winding 1 (or the second planar coil winding 2) is located. When the third conducting sub-wire d3 is located at an inner side of the fourth conducting sub-wire d4, projections of the two target conducting wires cross each other on the plane on which the first planar coil winding 1 (or the second planar coil winding 2) is located.

It should be noted that the end part of the third conducting sub-wire d3 is separated from the end part of the fourth conducting sub-wire d4. One end that is of the third conducting sub-wire d3 and that is away from the end part of the eighth outer side part 81 may be connected to one end that is of the fourth conducting sub-wire d4 and that is away from the end part of the eighth inner side part 82, to form the second end of the coil module, and the connection may be implemented by using a terminal, to form the second end of the coil module.

In this embodiment of this application, the coil module includes the first planar coil winding 1 and the second planar coil winding 2 that are insulated from each other, and the first planar coil winding 1 and the second planar coil winding 2 each include a plurality of coils. The first coil of the first planar coil winding 1 includes the first outer side part 11 and the first inner side part 12. The end part of the first coil of the first planar coil winding 1 includes the end part of the first outer side part 11 and the end part of the first inner side part 12. Between the first outer side part 11 and the first inner side part 12, there is the gap extending along the coiling direction of the first coil of the first planar coil winding 1. The first coil of the second planar coil winding 2 includes the second outer side part 21 and the second inner side part 22. The end part of the first coil of the second planar coil winding 2 includes the end part of the second outer side part 21 and the end part of the second inner side part 22. Between the second outer side part 21 and the second inner side part 22, there is the gap extending along the coiling direction of the first coil of the second planar coil winding 2. The end part of the first outer side part 11 is connected to the end part of the second inner side part 22, and the end part of the second outer side part 21 is connected to the end part of the first inner side part 12. In this way, on the plane on which the first planar coil winding 1 (or the second planar coil winding 2) is located, the projection of the target conducting wire that is constituted by the first outer side part 11 and the second inner side part 22 crosses the projection of the target conducting wire that is constituted by the first inner side part 12 and the second outer side part 21. In this case, when a magnetic field passes through the gap between the first outer side part 11 and the first inner side part 12 and passes through the gap between the second outer side part 21 and the second inner side part 22, a direction of an induced current generated on the first outer side part 11 and the second inner side part 22 is opposite to that of an induced current generated on the first inner side part 12 and the second outer side part 21. Therefore, the induced currents can cancel out at least a part of each other, thereby effectively reducing a circulating current loss in the first planar coil winding 1 and the second planar coil winding 2, and improving wireless charging efficiency of the coil module.

Figure 24:
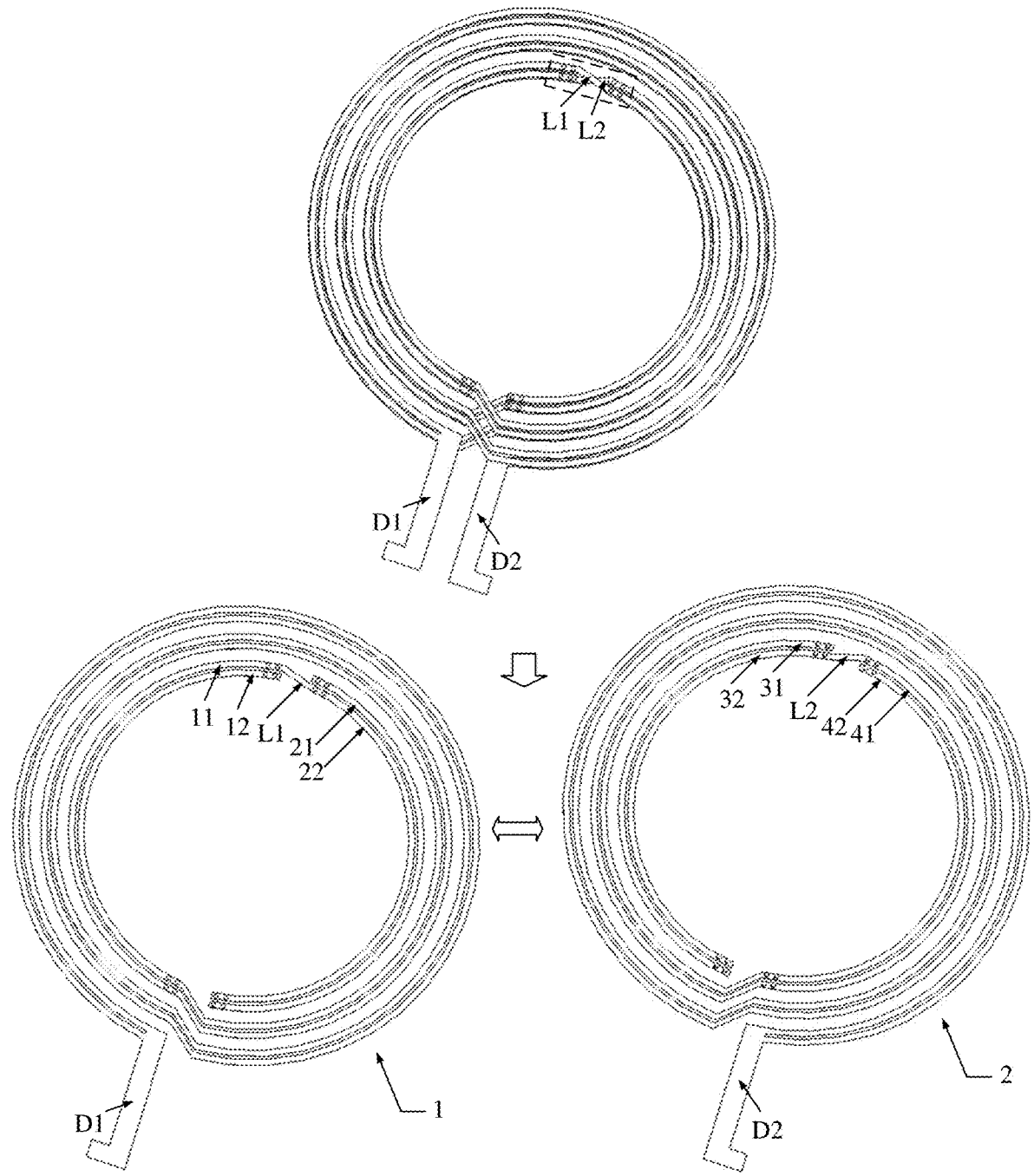
FIG. 24 is a schematic structural diagram of a ninth coil module according to an embodiment of this application.

FIG. 24 is a schematic structural diagram of a coil module according to an embodiment of this application. Referring to FIG. 24, the coil module includes a first connection part L1, a second connection part L2, a first conducting wire D1, a second conducting wire D2, and a first planar coil winding 1 and a second planar coil winding 2 that are insulated from each other. The first planar coil winding 1 and the second planar coil winding 2 each include a plurality of coils.

An innermost coil of the first planar coil winding 1 includes a first segment and a second segment. There is an opening between the first segment and the second segment. The first segment includes a first outer side part 11 and a first inner side part 12. Between the first outer side part 11 and the first inner side part 12, there is a gap extending along a coiling direction of the first segment. The second segment includes a second outer side part 21 and a second inner side part 22. Between the second outer side part 21 and the second inner side part 22, there is a gap extending along a coiling direction of the second segment. A first end of the second segment is an end part of the innermost coil of the first planar coil winding 1. A second end of the second segment is opposite to the first end of the second segment and is close to a first end of the first segment.

An innermost coil of the second planar coil winding 2 includes a third segment and a fourth segment. There is an opening between the third segment and the fourth segment. The third segment includes a third outer side part 31 and a third inner side part 32. Between the third outer side part 31 and the third inner side part 32, there is a gap extending along a coiling direction of the third segment. The fourth segment includes a fourth outer side part 41 and a fourth inner side part 42. Between the fourth outer side part 41 and the fourth inner side part 42, there is a gap extending along a coiling direction of the fourth segment. A first end of the third segment is an end part of the innermost coil of the second planar coil winding 2. A second end of the third segment is opposite to the first end of the third segment and is close to a first end of the fourth segment.

The first outer side part 11 and the third outer side part 31 are connected in parallel, the first inner side part 12 and the third inner side part 32 are connected in parallel, the second outer side part 21 and the fourth outer side part 41 are connected in parallel, and the second inner side part 22 and the fourth inner side part 42 are connected in parallel. The first connection part L1 is located between the first outer side part 11 and the second inner side part 22. The first outer side part 11 and the second inner side part 22 are connected to each other by using the first connection part L1. The second connection part L2 is located between the third inner side part 32 and the fourth outer side part 41. The third inner side part 32 and the fourth outer side part 41 are connected to each other by using the second connection part L2.

One end of the first conducting wire D1 is a first end of the coil module. The other end of the first conducting wire D1 is connected to a second end of the first segment. One end of the second conducting wire D2 is a second end of the coil module. The other end of the second conducting wire D2 is connected to a second end of the fourth segment. One of the first end of the coil module and the second end of the coil module is a lead-in end, and the other is a lead-out end.

It should be noted that a current that flows into the coil module from an external circuit or a current generated by the coil module may flow into the first conducting wire D1, then flow from the first conducting wire D1 into the second end of the first segment of the first planar coil winding 1, then flow to the second inner side part 22 in the second segment of the first planar coil winding 1 and the fourth inner side part 42 in the fourth segment of the second planar coil winding 2 from the first outer side part 11 in the first segment and the third outer side part 31 in the third segment of the second planar coil winding 2 through the first connection part L1, and simultaneously flow to the second outer side part 21 in the second segment of the first planar coil winding 1 and the fourth outer side part 41 in the fourth segment of the second planar coil winding 2 from the first inner side part 12 in the first segment and the third inner side part 32 in the third segment of the second planar coil winding 2 through the second connection part L2, then flow from the second end of the fourth segment to the second conducting wire D2, and finally flow out of the second conducting wire D2.

Alternatively, a current that flows into the coil module from an external circuit or a current generated by the coil module may flow into the second conducting wire D2, then flow from the second conducting wire D2 into the second end of the fourth segment of the second planar coil winding 2, then flow to the third inner side part 32 in the third segment of the second planar coil winding 2 and the first inner side part 12 in the first segment of the first planar coil winding 1 from the fourth outer side part 41 in the fourth segment and the second outer side part 21 in the second segment of the first planar coil winding 1 through the second connection part L1, and simultaneously flow to the third outer side part 31 in the third segment of the second planar coil winding 2 and the first outer side part 11 in the first segment of the first planar coil winding 1 from the fourth inner side part 42 in the fourth segment and the second inner side part 22 in the second segment of the first planar coil winding 1 through the first connection part L1, then flow from the second end of the first segment to the first conducting wire D1, and finally flow out of the first conducting wire D1.

It should be noted that the first planar coil winding 1 (or the second planar coil winding 2) is a conductive pattern formed by winding a conductor. The conductive pattern may be a circular ring, an elliptic ring, or the like. Any one of the plurality of coils included in the first planar coil winding 1 (or the second planar coil winding 2) is formed by evenly winding the conductor 360 degrees. Widths of the plurality of coils in the first planar coil winding 1 (or the second planar coil winding 2) may be different. For example, in a sequence from the innermost coil to an outermost coil, the widths of the plurality of coils in the first planar coil winding 1 (or the second planar coil winding 2) may gradually increase, or may first increase and then decrease.

In addition, the first planar coil winding 1 and the second planar coil winding 2 may be insulated from each other by using an insulating medium. The insulating medium between the first planar coil winding 1 and the second planar coil winding 2 is used to isolate the first planar coil winding 1 from the second planar coil winding 2, so that parts of the first planar coil winding 1 and the second planar coil winding 2 other than mutually connected parts remain insulated from each other. Specifically, an insulation layer may be disposed between the first planar coil winding 1 and the second planar coil winding 2. In this case, the first planar coil winding 1 may be disposed on a circuit board such as a PCB or an FPC, and the second planar coil winding 2 may also be disposed on a circuit board such as a PCB or an FPC. Alternatively, surfaces of the plurality of coils in the first planar coil winding 1 and surfaces of the plurality of coils in the second planar coil winding 2 may be covered with an insulating substance. In this case, the plurality of coils in the first planar coil winding 1 may be a flat wire, an enameled wire, or the like, and the plurality of coils in the second planar coil winding 2 may also be a flat wire, an enameled wire, or the like. When the plurality of coils in the first planar coil winding 1 (or the second planar coil winding 2) are a flat wire, the plurality of coils in the first planar coil winding 1 (or the second planar coil winding 2) may be formed by using a die cut process, an etching method, an electroplating addition method, or the like. When the plurality of coils in the first planar coil winding 1 (or the second planar coil winding 2) are an enameled wire, the first planar coil winding 1 (or the second planar coil winding 2) may be formed by winding a plurality of conducting wires, and each of the plurality of conducting wires may be a single-strand wire, a stranded wire, or the like. This is not limited in this embodiment of this application.

It should be noted that the gap that is between the first outer side part 11 and the first inner side part 12 and that extends along the coiling direction of the first segment of the innermost coil of the first planar coil winding 1 may be formed in a manner such as cutting, chemical corrosion, or parallel winding. Specifically, the first segment of the innermost coil of the first planar coil winding 1 may be cut, chemically corroded, or the like, to obtain the first outer side part 11 and the first inner side part 12. In this case, there is a gap between the first outer side part 11 and the first inner side part 12. Alternatively, the first segment of the innermost coil of the first planar coil winding 1 may be formed by winding a plurality of conducting wires in parallel. In this case, the first outer side part n may be one conducting wire, the first inner side part 12 may be another conducting wire, and there is a gap between the first outer side part n and the first inner side part 12.

In addition, one end that is of the first outer side part 11 and that is close to the second inner side part 22 is separated from one end that is of the first inner side part 12 and that is close to the second inner side part 22. One end that is of the first outer side part 1 and that is away from the second inner side part 22 and one end that is of the first inner side part 12 and that is away from the second inner side part 22 may be connected to each other by using a part of the innermost coil of the first planar coil winding 1 other than the first segment and the second segment, or may be connected to each other by using a coil of the first planar coil winding 1 other than the innermost coil, or may be connected to each other by using a conducting wire connected between the first planar coil winding 1 and a lead-out end or lead-in end of the coil module, or may be connected to each other by using a connection terminal between the coil module and an external circuit, or the like.

It should be noted that the gap that is between the second outer side part 21 and the second inner side part 22 and that extends along the coiling direction of the second segment of the innermost coil of the first planar coil winding 1 may be formed in a manner such as cutting, chemical corrosion, or parallel winding. Specifically, the second segment of the innermost coil of the first planar coil winding 1 may be cut, chemically corroded, or the like, to obtain the second outer side part 21 and the second inner side part 22. In this case, there is a gap between the second outer side part 21 and the second inner side part 22. Alternatively, the second segment of the innermost coil of the first planar coil winding 1 may be formed by winding a plurality of conducting wires in parallel. In this case, the second outer side part 21 may be one conducting wire, the second inner side part 22 may be another conducting wire, and there is a gap between the second outer side part 21 and the second inner side part 22.

In addition, one end that is of the second outer side part 21 and that is close to the first outer side part 11 is separated from one end that is of the second inner side part 22 and that is close to the first outer side part 11. One end that is of the second outer side part 21 and that is away from the first outer side part 11 and one end that is of the second inner side part 22 and that is away from the first outer side part 11 may be connected to each other by using a part of the innermost coil of the first planar coil winding 1 other than the first segment and the second segment, or may be connected to each other by using a coil of the first planar coil winding 1 other than the innermost coil, or may be connected to each other by using a conducting wire connected between the first planar coil winding 1 and the lead-out end or lead-in end of the coil module, or may be connected to each other by using a connection terminal between the coil module and an external circuit, or the like.

It should be noted that the gap that is between the third outer side part 31 and the third inner side part 32 and that extends along the coiling direction of the third segment of the innermost coil of the second planar coil winding 2 may be formed in a manner such as cutting, chemical corrosion, or parallel winding. Specifically, the third segment of the innermost coil of the second planar coil winding 2 may be cut, chemically corroded, or the like, to obtain the third outer side part 31 and the third inner side part 32. In this case, there is a gap between the third outer side part 31 and the third inner side part 32. Alternatively, the third segment of the innermost coil of the second planar coil winding 2 may be formed by winding a plurality of conducting wires in parallel. In this case, the third outer side part 31 may be one conducting wire, the third inner side part 32 may be another conducting wire, and there is a gap between the third outer side part 31 and the third inner side part 32.

In addition, one end that is of the third outer side part 31 and that is close to the fourth outer side part 41 is separated from one end that is of the third inner side part 32 and that is close to the fourth outer side part 41. One end that is of the third outer side part 31 and that is away from the fourth outer side part 41 and one end that is of the third inner side part 32 and that is away from the fourth outer side part 41 may be connected to each other by using a part of the innermost coil of the second planar coil winding 2 other than the third segment and the fourth segment, or may be connected to each other by using a coil of the second planar coil winding 2 other than the innermost coil, or may be connected to each other by using a conducting wire connected between the second planar coil winding 2 and the lead-out end or lead-in end of the coil module, or may be connected to each other by using a connection terminal between the coil module and an external circuit, or the like.

It should be noted that the gap that is between the fourth outer side part 41 and the fourth inner side part 42 and that extends along the coiling direction of the fourth segment of the innermost coil of the second planar coil winding 2 may be formed in a manner such as cutting, chemical corrosion, or parallel winding. Specifically, the fourth segment of the innermost coil of the second planar coil winding 2 may be cut, chemically corroded, or the like, to obtain the fourth outer side part 41 and the fourth inner side part 42. In this case, there is a gap between the fourth outer side part 41 and the fourth inner side part 42. Alternatively, the fourth segment of the innermost coil of the second planar coil winding 2 may be formed by winding a plurality of conducting wires in parallel. In this case, the fourth outer side part 41 may be one conducting wire, the fourth inner side part 42 may be another conducting wire, and there is a gap between the fourth outer side part 41 and the fourth inner side part 42.

In addition, one end that is of the fourth outer side part 41 and that is close to the third inner side part 32 is separated from one end that is of the fourth inner side part 42 and that is close to the third inner side part 32. One end that is of the fourth outer side part 41 and that is away from the third inner side part 32 and one end that is of the fourth inner side part 42 and that is away from the third inner side part 32 may be connected to each other by using a part of the innermost coil of the second planar coil winding 2 other than the third segment and the fourth segment, or may be connected to each other by using a coil of the second planar coil winding 2 other than the innermost coil, or may be connected to each other by using a conducting wire connected between the second planar coil winding 2 and the lead-out end or lead-in end of the coil module, or may be connected to each other by using a connection terminal between the coil module and an external circuit, or the like.

It should be noted that, when the other end of the first conducting wire D1 is connected to the second end of the first segment, one or more coils may be connected between the other end of the first conducting wire D1 and the second end of the first segment, and the other end of the first conducting wire D1 may be connected to the second end of the first segment by using the one or more coils. Specifically, the other end of the first conducting wire D1 may be connected to an end part of a first target coil. The first target coil is the last coil connected in series to the second end of the first segment, in the plurality of coils of the first planar coil winding 1 in a sequence from the innermost coil to the outermost coil. In other words, the first target coil is an outermost coil in at least one coil connected in series to the second end of the first segment, in the plurality of coils of the first planar coil winding 1.

In addition, when the other end of the second conducting wire D2 is connected to the second end of the fourth segment, one or more coils may be connected between the other end of the second conducting wire D2 and the second end of the fourth segment, and the other end of the second conducting wire D2 may be connected to the second end of the fourth segment by using the one or more coils. Specifically, the other end of the second conducting wire D2 may be connected to an end part of a second target coil. The second target coil is the last coil connected in series to the second end of the fourth segment, in the plurality of coils of the second planar coil winding 2 in a sequence from the innermost coil to the outermost coil. In other words, the second target coil is an outermost coil in at least one coil connected in series to the second end of the fourth segment, in the plurality of coils of the second planar coil winding 2.

It should be noted that the first connection part L1 is located in the opening between the first segment and the second segment, and the second connection part L2 is located in the opening between the third segment and the fourth segment. The first outer side part 11 and the first connection part L1 may be connected to each other through integral forming, welding, or the like. The first connection part L1 and the second inner side part 22 may also be connected to each other through integral forming, welding, or the like. When the first outer side part 11, the first connection part L1, and the second inner side part 22 are integrally formed, the first outer side part 11, the first connection part L1, and the second inner side part 22 belong to a same conducting wire. The third inner side part 32 and the second connection part L2 may be connected to each other through integral forming, welding, or the like. The second connection part L2 and the fourth outer side part 41 may also be connected to each other through integral forming, welding, or the like. When the third inner side part 32, the second connection part L2, and the fourth outer side part 41 are integrally formed, the third inner side part 32, the second connection part L2, and the fourth outer side part 41 belong to a same conducting wire.

Moreover, the first connection part L1 is not electrically connected to the second connection part L2. The first connection part L1 is not electrically connected to a part of the coil module other than the first outer side part 11 and the second inner side part 22. The second connection part L2 is not electrically connected to a part of the coil module other than the third inner side part 32 and the fourth outer side part 41.

In addition, when the first outer side part 11 and the third outer side part 31 are connected in parallel, the first outer side part 11 and the third outer side part 31 may be connected in parallel through at least two via holes. Specifically, at least one first via hole penetrates a first end of the first outer side part 11 and a first end of the third outer side part 31, and the first end of the first outer side part 11 is electrically connected to the first end of the third outer side part 31 through the at least one first via hole, at least one second via hole penetrates a second end of the first outer side part 11 and a second end of the third outer side part 31, and the second end of the first outer side part 11 is electrically connected to the second end of the third outer side part 31 through the at least one second via hole. In this way, the first outer side part 11 and the third outer side part 31 are connected in parallel. A manner in which the first inner side part 12 and the third inner side part 32 are connected in parallel, a manner in which the second outer side part 21 and the fourth outer side part 41 are connected in parallel, and a manner in which the second inner side part 22 and the fourth inner side part 42 are connected in parallel are similar to a manner in which the first outer side part 11 and the third outer side part 31 are connected in parallel. Details are not described in this embodiment of this application again.

It should be noted that a winding direction of the plurality of coils of the first planar coil winding 1 is opposite to a winding direction of the plurality of coils of the second planar coil winding 2. In this case, a flow direction of a current in the first planar coil winding 1 is the same as a flow direction of a current in the second planar coil winding 2. In addition, after flowing into the first conducting wire D1, a current first flows through the first planar coil winding 1, then flows through the second planar coil winding 2, and finally flows out of the second conducting wire D2. Alternatively, after flowing into the second conducting wire D2, a current first flows through the second planar coil winding 2, then flows through the first planar coil winding 1, and finally flows out of the first conducting wire D1.

It should be noted that a parallel cross-connection structure is formed between the innermost coil of the first planar coil winding 1 and the innermost coil of the second planar coil winding 2. To be specific, the first outer side part 11, the third outer side part 31, the first connection part L1, the second inner side part 22, and the fourth inner side part 42 form one target conducting wire, and the first inner side part 12, the third inner side part 32, the second connection part L2, the second outer side part 21, and the fourth outer side part 41 form one target conducting wire. Projections of the two target conducting wires cross each other on a plane on which the first planar coil winding 1 (or the second planar coil winding 2) is located. In this case, when a magnetic field passes through the gap between the first outer side part 11 and the first inner side part 12, the gap between the third outer side part 31 and the third inner side part 32, the gap between the second outer side part 21 and the second inner side part 22, and the gap between the fourth outer side part 41 and the fourth inner side part 42, induced currents generated on the two target conducting wires are in opposite directions. Therefore, the induced currents can cancel out at least a part of each other, thereby effectively reducing a circulating current loss in the first planar coil winding 1 and the second planar coil winding 2, and improving wireless charging efficiency of the coil module.

Figure 25:
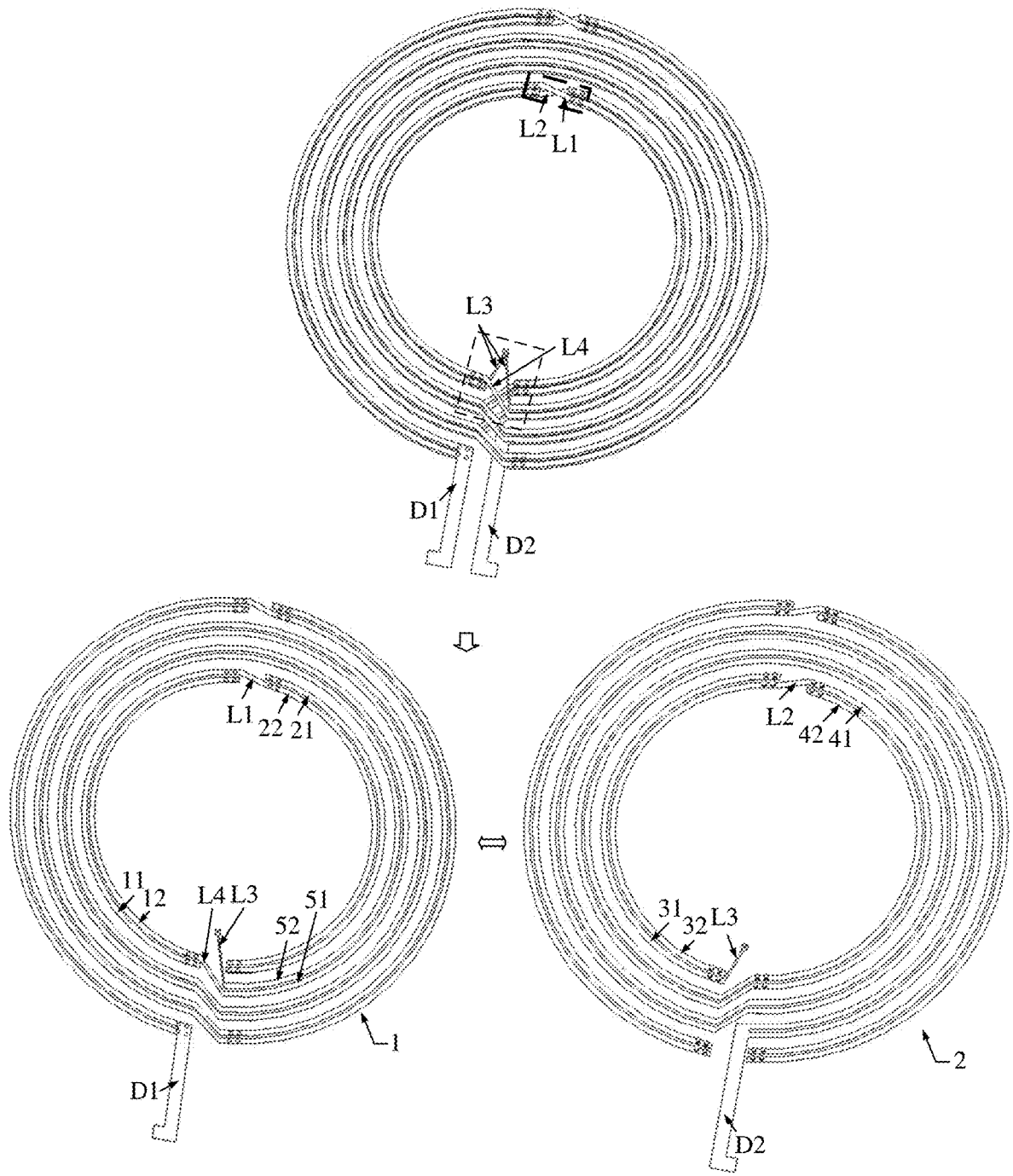
FIG. 25 is a schematic structural diagram of a tenth coil module according to an embodiment of this application.

Further, referring to FIG. 25, the coil module further includes a third connection part L3 and a fourth connection part L4.

A target coil of the first planar coil winding 1 includes a fifth segment. There is an opening between the fifth segment and the first segment. The fifth segment includes a fifth outer side part 51 and a fifth inner side part 52. The target coil is a coil in the first planar coil winding 1, at an outer side of the innermost coil of the first planar coil winding 1, and adjacent to the innermost coil of the first planar coil winding 1. Between the fifth outer side part 51 and the fifth inner side part 52, there is a gap extending along a coiling direction of the target coil. The other end of the first conducting wire D1 is connected to the second end of the first segment by using the target coil.

The third connection part L3 is located between the first outer side part 11 and the fifth inner side part 52. The first outer side part 11 and the fifth inner side part 52 are connected to each other by using the third connection part L3. The fourth connection part L4 is located between the first inner side part 12 and the fifth outer side part 51. The first inner side part 12 and the fifth outer side part 51 are connected to each other by using the fourth connection part L4.

It should be noted that both the third connection part L3 and the fourth connection part L4 are located in the opening between the fifth segment and the first segment. The third connection part L3 is not electrically connected to the fourth connection part L4. The third connection part L3 is not electrically connected to a part of the coil module other than the first outer side part 11, the third outer side part 31, and the fifth inner side part 52. The fourth connection part L4 is not electrically connected to a part of the coil module other than the first inner side part 12, the third inner side part 32, and the fifth outer side part 51.

In addition, the first inner side part 12, the fourth connection part L4, and the fifth outer side part 51 may be integrally formed. The third connection part L3 includes a first portion and a second portion that are separated from each other. The first portion and the fifth inner side part 52 are integrally formed, and the second portion and the third outer side part 31 are integrally formed. An end part of the first portion and an end part of the second portion that are close to each other (that is, one end that is of the first portion and that is away from the fifth inner side part 52, and one end that is of the second portion and that is away from the third outer side part 31) are connected to each other. For example, at least one via hole may penetrate the end part of the first portion and the end part of the second portion that are close to each other, and the end part of the first portion and the end part of the second portion that are close to each other may be electrically connected to each other through the at least one via hole.

It should be noted that, on the plane on which the first planar coil winding 1 (or the second planar coil winding 2) is located, a projection of a target conducting wire that is constituted by the first outer side part 11, the third connection part L3, and the fifth inner side part 52 crosses a projection of a target conducting wire that is constituted by the first inner side part 12, the fourth connection part L4, and the fifth outer side part 51. In this case, when a magnetic field passes through the gap between the first outer side part 11 and the first inner side part 12 and passes through the gap between the fifth outer side part 51 and the fifth inner side part 52, a direction of an induced current generated on the first outer side part 11 and the fifth inner side part 52 is opposite to that of an induced current generated on the fifth outer side part 51 and the first inner side part 12. Therefore, the induced currents can cancel out at least a part of each other, thereby effectively reducing a circulating current loss in the first planar coil winding 1 and the second planar coil winding 2, and improving wireless charging efficiency of the coil module.

Figure 26:
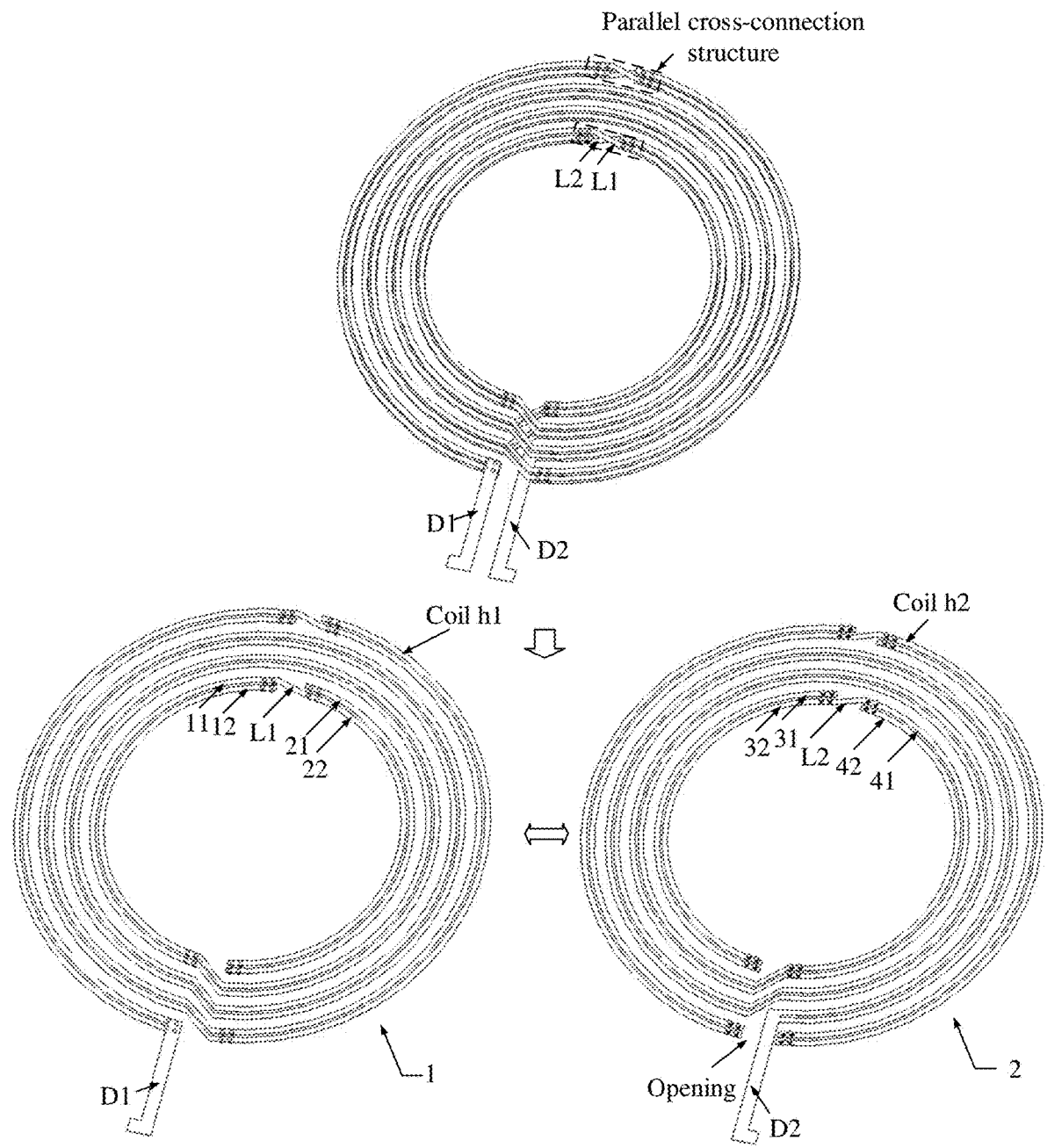
FIG. 26 is a schematic structural diagram of an eleventh coil module according to an embodiment of this application.

Further, referring to FIG. 26, in this embodiment of this application, not only a parallel cross-connection between the innermost coil of the first planar coil winding 1 and the innermost coil of the second planar coil winding 2 can be implemented, but also a parallel cross-connection between any coil h1 of the first planar coil winding 1 other than the innermost coil of the first planar coil winding 1 and any coil h2 of the second planar coil winding 2 other than the innermost coil of the second planar coil winding 2 can be implemented. A parallel cross-connection structure between the coil h1 and the coil h2 is similar to that between the innermost coil of the first planar coil winding 1 and the innermost coil of the second planar coil winding 2. Details are not described in this embodiment of this application again.

It should be noted that the coil h1 may be connected between the second end of the first segment and the other end of the first conducting wire D1, a part of the coil h2 other than a part that forms the parallel cross-connection structure with the coil h1 further has an opening, and the other end of the second conducting wire D2 may be connected to the second end of the fourth segment after passing through the opening.

In this embodiment of this application, the coil module includes the first connection part L1, the second connection part L2, the first conducting wire D1, the second conducting wire D2, and the first planar coil winding 1 and the second planar coil winding 2 that are insulated from each other. The innermost coil of the first planar coil winding 1 includes the first segment and the second segment. There is the opening between the first segment and the second segment. The first segment includes the first outer side part 11 and the first inner side part 12. The second segment includes the second outer side part 21 and the second inner side part 22. The first end of the second segment is the end part of the innermost coil of the first planar coil winding 1. The second end of the second segment is opposite to the first end of the second segment and is close to the first end of the first segment. The innermost coil of the second planar coil winding 2 includes the third segment and the fourth segment. There is the opening between the third segment and the fourth segment. The third segment includes the third outer side part 31 and the third inner side part 32. The fourth segment includes the fourth outer side part 41 and the fourth inner side part 42. The first end of the third segment is the end part of the innermost coil of the second planar coil winding 2. The second end of the third segment is opposite to the first end of the third segment and is close to the first end of the fourth segment. The first outer side part 11 and the third outer side part 31 are connected in parallel, the first inner side part 12 and the third inner side part 32 are connected in parallel, the second outer side part 21 and the fourth outer side part 41 are connected in parallel, and the second inner side part 22 and the fourth inner side part 42 are connected in parallel. The first connection part L1 is located between the first outer side part 11 and the second inner side part 22. The first outer side part 11 and the second inner side part 22 are connected to each other by using the first connection part L1. The second connection part L2 is located between the third inner side part 32 and the fourth outer side part 41. The third inner side part 32 and the fourth outer side part 41 are connected to each other by using the second connection part L2. One end of the first conducting wire D1 is the first end of the coil module. The other end of the first conducting wire D1 is connected to the second end of the first segment. One end of the second conducting wire D2 is the second end of the coil module. The other end of the second conducting wire D2 is connected to the second end of the fourth segment. One of the first end of the coil module and the second end of the coil module is the lead-in end, and the other is the lead-out end. In this way, the first outer side part 11, the third outer side part 31, the first connection part L1, the second inner side part 22, and the fourth inner side part 42 form one target conducting wire, and the first inner side part 12, the third inner side part 32, the second connection part L2, the second outer side part 21, and the fourth outer side part 41 form one target conducting wire. Projections of the two target conducting wires cross each other on the plane on which the first planar coil winding 1 (or the second planar coil winding 2) is located. In this case, when a magnetic field passes through the gap between the first outer side part 11 and the first inner side part 12, the gap between the third outer side part 31 and the third inner side part 32, the gap between the second outer side part 21 and the second inner side part 22, and the gap between the fourth outer side part 41 and the fourth inner side part 42, induced currents generated on the two target conducting wires are in opposite directions. Therefore, the induced currents can cancel out at least a part of each other, thereby effectively reducing a circulating current loss in the first planar coil winding 1 and the second planar coil winding 2, and improving wireless charging efficiency of the coil module.

Figure 27:
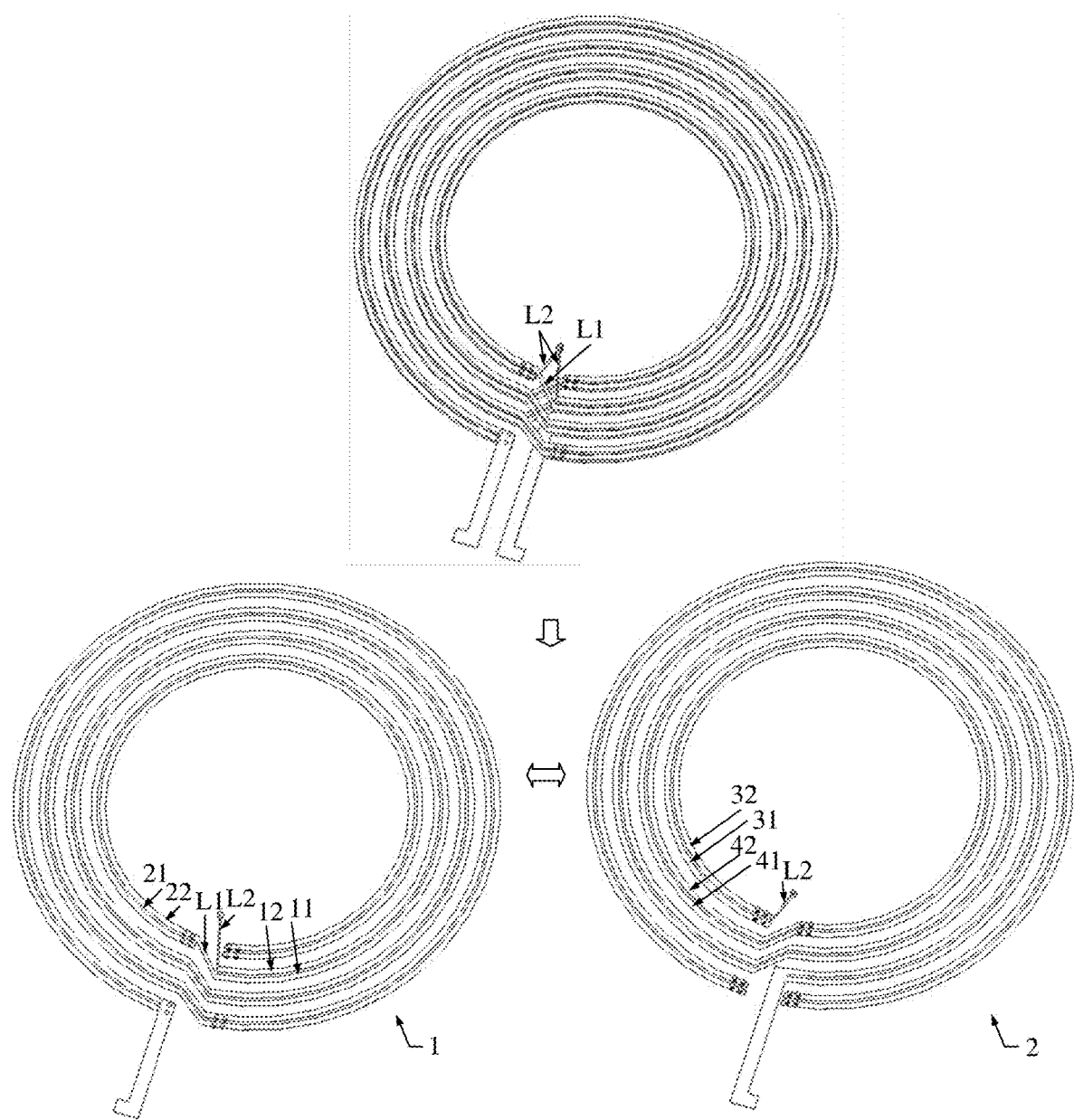
FIG. 27 is a schematic structural diagram of a twelfth coil module according to an embodiment of this application.
Figure 28:
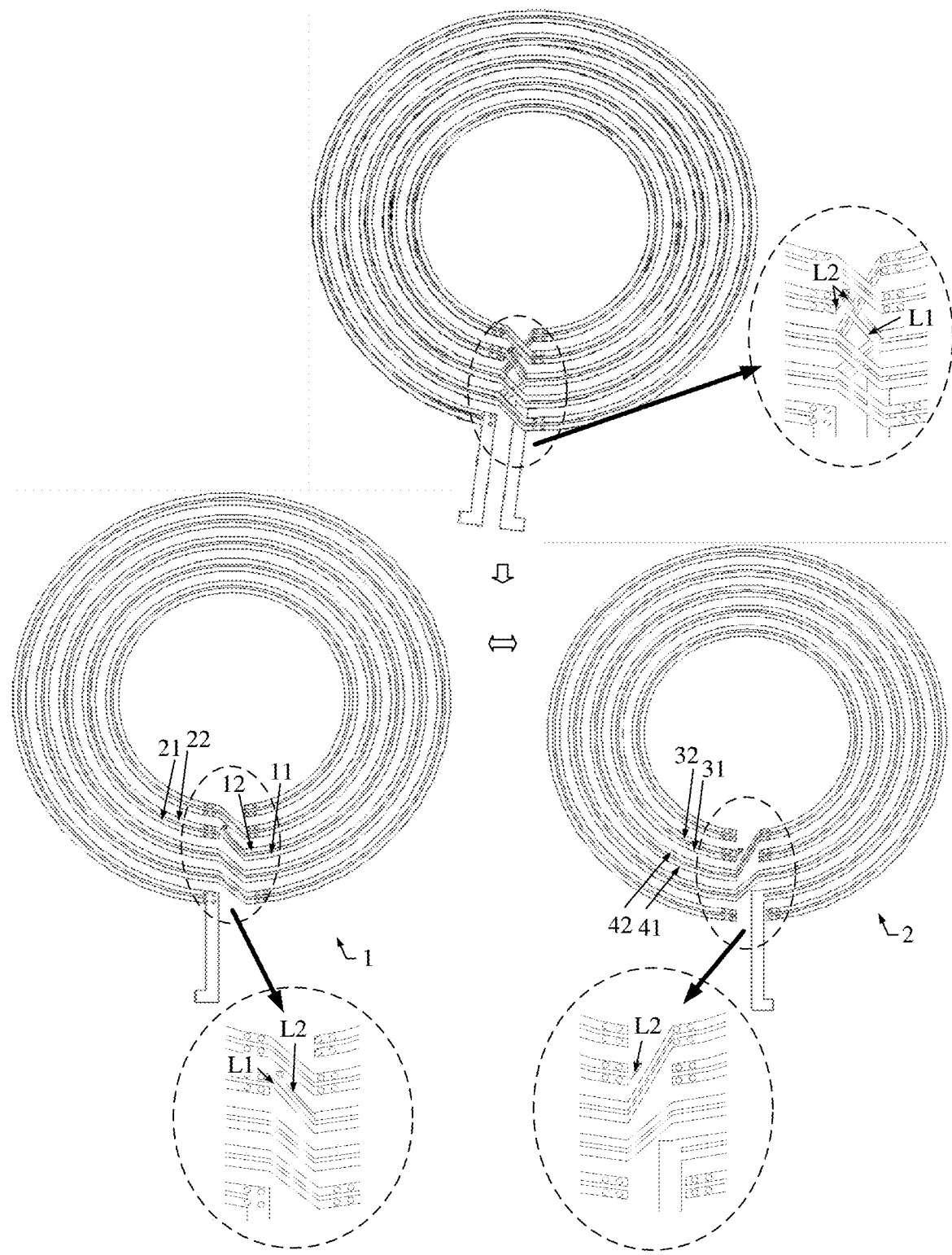
FIG. 28 is a schematic structural diagram of a thirteenth coil module according to an embodiment of this application.

FIG. 27 or FIG. 28 is a schematic structural diagram of a coil module according to an embodiment of this application. Referring to FIG. 27 or FIG. 28, the coil module includes a first connection part L1, a second connection part L2, and a first planar coil winding 1 and a second planar coil winding 2 that are insulated from each other. The first planar coil winding 1 and the second planar coil winding 2 each include a plurality of coils.

The first planar coil winding 1 includes a first segment and a second segment along a winding direction of the first planar coil winding 1. There is an opening between the first segment and the second segment. The first segment includes a first outer side part 11 and a first inner side part 12. Between the first outer side part 11 and the first inner side part 12, there is a gap extending along a coiling direction of the first segment. The second segment includes a second outer side part 21 and a second inner side part 22. Between the second outer side part 21 and the second inner side part 22, there is a gap extending along a coiling direction of the second segment. The first connection part L1 is located between the first outer side part 11 and the second inner side part 22. The first outer side part 11 and the second inner side part 22 are connected to each other by using the first connection part L1.

The second planar coil winding 2 includes a third segment. Along a thickness direction of the first planar coil winding 1, an end part that is of the third segment and that is close to the first segment at least partially overlaps an end part that is of the second segment and that is close to the first segment. The third segment includes a third outer side part 31 and a third inner side part 32. Between the third outer side part 31 and the third inner side part 32, there is a gap extending along a coiling direction of the third segment. The second connection part L2 is located between the third outer side part 31 and the first inner side part 12. The third outer side part 31 and the first inner side part 12 are connected to each other by using the second connection part L2. One end that is of the third outer side part 31 and that is close to the first inner side part 12 is connected to one end that is of the second outer side part 21 and that is close to the first inner side part 12.

It should be noted that a current that flows into the coil module from an external circuit or a current generated by the coil module may flow into the first outer side part 11 and the first inner side part 12 in the first segment of the first planar coil winding 1, then flow to the second inner side part 22 in the second segment of the first planar coil winding 1 from the first outer side part 11 through the first connection part L1, and flow to the third outer side part 31 in the third segment of the second planar coil winding 2 from the first inner side part 12 through the second connection part L2 simultaneously, then flow to the end that is of the second outer side part 21 and that is close to the first inner side part 12 from the end that is of the third outer side part 31 and that is close to the first inner side part 12, then flow to the second planar coil winding 2 from the second inner side part 22 and the second outer side part 21, and finally flow out of the second planar coil winding 2.

Alternatively, a current that flows into the coil module from an external circuit or a current generated by the coil module may flow into the second planar coil winding 2, then flow to the second outer side part 21 and the second inner side part 22 in the second segment of the first planar coil winding 1 from the second planar coil winding 2, then flow to the first outer side part 11 in the first segment of the first planar coil winding 1 from the second inner side part 22 through the first connection part L1, and flow to the end that is of the third outer side part 31 and that is close to the first inner side part 12 from the end that is of the second outer side part 21 and that is close to the first inner side part 12, simultaneously, then flow to the first inner side part 12 in the first segment of the first planar coil winding 1 from the third outer side part 31 through the second connection part L2, and finally flow out of the first planar coil winding 1.

It should be noted that the first planar coil winding 1 (or the second planar coil winding 2) is a conductive pattern formed by winding a conductor. The conductive pattern may be a circular ring, an elliptic ring, or the like. Any one of the plurality of coils included in the first planar coil winding 1 (or the second planar coil winding 2) is formed by evenly winding the conductor 360 degrees. Widths of the plurality of coils in the first planar coil winding 1 (or the second planar coil winding 2) may be different. For example, in a sequence from an innermost coil to an outermost coil, the widths of the plurality of coils in the first planar coil winding 1 (or the second planar coil winding 2) may gradually increase, or may first increase and then decrease.

In addition, the first planar coil winding 1 and the second planar coil winding 2 may be insulated from each other by using an insulating medium. The insulating medium between the first planar coil winding 1 and the second planar coil winding 2 is used to isolate the first planar coil winding 1 from the second planar coil winding 2, so that parts of the first planar coil winding 1 and the second planar coil winding 2 other than mutually connected parts remain insulated from each other. Specifically, an insulation layer may be disposed between the first planar coil winding 1 and the second planar coil winding 2. In this case, the first planar coil winding 1 may be disposed on a circuit board such as a PCB or an FPC, and the second planar coil winding 2 may also be disposed on a circuit board such as a PCB or an FPC. Alternatively, surfaces of the plurality of coils in the first planar coil winding 1 and surfaces of the plurality of coils in the second planar coil winding 2 may be covered with an insulating substance. In this case, the plurality of coils in the first planar coil winding 1 may be a flat wire, an enameled wire, or the like, and the plurality of coils in the second planar coil winding 2 may also be a flat wire, an enameled wire, or the like. When the plurality of coils in the first planar coil winding 1 (or the second planar coil winding 2) are a flat wire, the plurality of coils in the first planar coil winding 1 (or the second planar coil winding 2) may be formed by using a die cut process, an etching method, an electroplating addition method, or the like. When the plurality of coils in the first planar coil winding 1 (or the second planar coil winding 2) are an enameled wire, the first planar coil winding 1 (or the second planar coil winding 2) may be formed by winding a plurality of conducting wires, and each of the plurality of conducting wires may be a single-strand wire, a stranded wire, or the like. This is not limited in this embodiment of this application.

It should be noted that the gap that is between the first outer side part 11 and the first inner side part 12 and that extends along the coiling direction of the first segment may be formed in a manner such as cutting, chemical corrosion, or parallel winding. Specifically, the first segment may be cut, chemically corroded, or the like, to obtain the first outer side part 11 and the first inner side part 12. In this case, there is a gap between the first outer side part 11 and the first inner side part 12. Alternatively, the first segment may be formed by winding a plurality of conducting wires in parallel. In this case, the first outer side part 11 may be one conducting wire, the first inner side part 12 may be another conducting wire, and there is a gap between the first outer side part 11 and the first inner side part 12.

In addition, one end that is of the first outer side part 11 and that is close to the second inner side part 22 is separated from one end that is of the first inner side part 12 and that is close to the second inner side part 22. One end that is of the first outer side part 11 and that is away from the second inner side part 22 and one end that is of the first inner side part 12 and that is away from the second inner side part 22 may be connected to each other by using a part of the first planar coil winding 1 other than the first segment and the second segment, or may be connected to each other by using a conducting wire connected between the first planar coil winding 1 and a lead-out end or lead-in end of the coil module, or may be connected to each other by using a connection terminal between the coil module and an external circuit, or the like.

It should be noted that the gap that is between the second outer side part 21 and the second inner side part 22 and that extends along the coiling direction of the second segment may be formed in a manner such as cutting, chemical corrosion, or parallel winding. Specifically, the second segment may be cut, chemically corroded, or the like, to obtain the second outer side part 21 and the second inner side part 22. In this case, there is a gap between the second outer side part 21 and the second inner side part 22. Alternatively, the second segment may be formed by winding a plurality of conducting wires in parallel. In this case, the second outer side part 21 may be one conducting wire, the second inner side part 22 may be another conducting wire, and there is a gap between the second outer side part 21 and the second inner side part 22.

In addition, one end that is of the second outer side part 21 and that is close to the first outer side part 11 is separated from one end that is of the second inner side part 22 and that is close to the first outer side part 11. One end that is of the second outer side part 21 and that is away from the first outer side part 11 and one end that is of the second inner side part 22 and that is away from the first outer side part 11 may be connected to each other by using a part of the first planar coil winding 1 other than the first segment and the second segment, or may be connected to each other by using a conducting wire connected between the first planar coil winding 1 and the lead-out end or lead-in end of the coil module, or may be connected to each other by using a connection terminal between the coil module and an external circuit, or the like.

It should be noted that the gap that is between the third outer side part 31 and the third inner side part 32 and that extends along the coiling direction of the third segment may be formed in a manner such as cutting, chemical corrosion, or parallel winding. Specifically, the third segment may be cut, chemically corroded, or the like, to obtain the third outer side part 31 and the third inner side part 32. In this case, there is a gap between the third outer side part 31 and the third inner side part 32. Alternatively, the third segment may be formed by winding a plurality of conducting wires in parallel. In this case, the third outer side part 31 may be one conducting wire, the third inner side part 32 may be another conducting wire, and there is a gap between the third outer side part 31 and the third inner side part 32.

In addition, one end that is of the third outer side part 31 and that is close to the first outer side part 11 is separated from one end that is of the third inner side part 32 and that is close to the first outer side part 11. One end that is of the third outer side part 31 and that is away from the first outer side part 11 and one end that is of the third inner side part 32 and that is away from the first outer side part 11 may be connected to each other by using a part of the second planar coil winding 2 other than the third segment, or may be connected to each other by using a conducting wire connected between the second planar coil winding 2 and the lead-out end or lead-in end of the coil module, or may be connected to each other by using a connection terminal between the coil module and an external circuit, or the like.

It should be noted that both the first connection part L1 and the second connection part L2 are located in the opening between the first segment and the second segment. The first connection part L1 is not electrically connected to a part of the coil module other than the first outer side part n, the second inner side part 22, and the third inner side part 32. The second connection part L2 is not electrically connected to a part of the coil module other than the third outer side part 31, the second outer side part 21, and the first inner side part 12.

In addition, the first outer side part 1, the first connection part L1, and the second inner side part 22 are integrally formed. The second connection part L2 may include a first portion and a second portion that are separated from each other. The first portion and the first inner side part 12 are integrally formed, and the second portion and the third outer side part 31 are integrally formed. An end part of the first portion and an end part of the second portion that are close to each other (that is, one end that is of the first portion and that is away from the first inner side part 12, and one end that is of the second portion and that is away from the third outer side part 31) are connected to each other. For example, at least one via hole may penetrate the end part of the first portion and the end part of the second portion that are close to each other, and the end part of the first portion and the end part of the second portion that are close to each other may be electrically connected to each other through the at least one via hole.

When one end that is of the third outer side part 31 and that is close to the first inner side part 12 is connected to one end that is of the second outer side part 21 and that is close to the first inner side part 12, at least one first via hole penetrates the end that is of the second outer side part 21 and that is close to the first inner side part 12 and the end that is of the third outer side part 31 and that is close to the first inner side part 12. The end that is of the second outer side part 21 and that is close to the first inner side part 12 and the end that is of the third outer side part 31 and that is close to the first inner side part 12 are electrically connected to each other through the at least one first via hole.

It should be noted that, usually, the first planar coil winding 1 is referred to as a first-layer coil winding, and the second planar coil winding 2 is referred to as a second-layer coil winding. In this case, the third outer side part 31 and the second outer side part 21 are connected to each other in a cross-layer manner. In this way, a serial cross-connection between the first segment and the second segment in the first planar coil winding 1 can be implemented by using the first connection part L1 and the second connection part L2. In this case, on a plane on which the first planar coil winding 1 (or the second planar coil winding 2) is located, a projection of a target conducting wire that is constituted by the first outer side part 11, the first connection part L1, and the second inner side part 22 crosses a projection of a target conducting wire that is constituted by the first inner side part 12, the second connection part L2, and the second outer side part 21. In this case, when a magnetic field passes through the gap between the first outer side part 11 and the first inner side part 12 and passes through the gap between the second outer side part 21 and the second inner side part 22, a direction of an induced current generated on the first outer side part 11 and the second inner side part 22 is opposite to that of an induced current generated on the second outer side part 21 and the first inner side part 12. Therefore, the induced currents can cancel out at least a part of each other, thereby effectively reducing a circulating current loss in the first planar coil winding 1 and the second planar coil winding 2, and improving wireless charging efficiency of the coil module.

Further, one end that is of the second inner side part 22 and that is close to the first outer side part 11 is connected to one end that is of the third inner side part 32 and that is close to the first outer side part 11. Specifically, at least one second via hole penetrates the end that is of the second inner side part 22 and that is close to the first outer side part 11 and the end that is of the third inner side part 32 and that is close to the first outer side part 11. The end that is of the second inner side part 22 and that is close to the first outer side part 11 and the end that is of the third inner side part 32 and that is close to the first outer side part 11 are electrically connected to each other through the at least one second via hole.

It should be noted that a current that flows into the coil module from an external circuit or a current generated by the coil module may flow into the first outer side part 11 and the first inner side part 12 in the first segment of the first planar coil winding 1, then flow to the second inner side part 22 in the second segment of the first planar coil winding 1 and the third inner side part 32 in the third segment of the second planar coil winding 2 from the first outer side part 11 through the first connection part L1, and flow to the second outer side part 21 in the second segment of the first planar coil winding 1 and the third outer side part 31 in the third segment of the second planar coil winding 2 from the first inner side part 12 through the second connection part L2 simultaneously, then flow to the second planar coil winding 2 from the second outer side part 21 and the second inner side part 22, and finally flow out of the second planar coil winding 2.

Alternatively, a current that flows into the coil module from an external circuit or a current generated by the coil module may flow into the second planar coil winding 2, flow to the first outer side part 11 in the first segment of the first planar coil winding 1 from the third inner side part 32 in the third segment of the second planar coil winding 2 through the first connection part L1, and flow to the first inner side part 12 in the first segment of the first planar coil winding 1 from the third outer side part 31 in the third segment of the second planar coil winding 2 through the second connection part L2 simultaneously, or flow to the second outer side part 21 and the second inner side part 22 in the second segment of the first planar coil winding 1 from the second planar coil winding 2, and then flow to the first outer side part 11 from the second inner side part 22 through the first connection part L1, and flow to the first inner side part 12 from the second outer side part 21 through the second connection part L2 simultaneously, and finally flow out of the first planar coil winding 1.

In this case, the second inner side part 22 and the third inner side part 32 are connected to each other in a cross-layer manner. In this way, a serial cross-connection between the first segment in the first planar coil winding 1 and the third segment in the second planar coil winding 2 can be implemented by using the first connection part L1 and the second connection part L2. In this case, on the plane on which the first planar coil winding 1 (or the second planar coil winding 2) is located, a projection of a target conducting wire that is constituted by the first outer side part 11, the first connection part L1, and the third inner side part 32 crosses a projection of a target conducting wire that is constituted by the first inner side part 12, the second connection part L2, and the third outer side part 31. In this case, when a magnetic field passes through the gap between the first outer side part 11 and the first inner side part 12 and passes through the gap between the third outer side part 31 and the third inner side part 32, a direction of an induced current generated on the first outer side part 11 and the third inner side part 32 is opposite to that of an induced current generated on the third outer side part 31 and the first inner side part 12. Therefore, the induced currents can cancel out at least a part of each other, thereby effectively reducing a circulating current loss in the first planar coil winding 1 and the second planar coil winding 2, and improving wireless charging efficiency of the coil module.

Further, the second outer side part 21 and the third outer side part 31 are connected in parallel, and the second inner side part 22 and the third inner side part 32 are connected in parallel. In this case, the second planar coil winding 2 may further include a fourth segment. The fourth segment includes a fourth outer side part 41 and a fourth inner side part 42. Between the fourth outer side part 41 and the fourth inner side part 42, there is a gap extending along a coiling direction of the fourth segment. The fourth outer side part 41 and the third outer side part 31 are connected to each other. The fourth inner side part 42 and the third inner side part 32 are connected to each other.

It should be noted that, when the fourth outer side part 41 and the third outer side part 31 are connected to each other, the fourth outer side part 41 may be connected to the third outer side part 31 by using one or more coils. When the fourth inner side part 42 and the third inner side part 32 are connected to each other, the fourth inner side part 42 may be connected to the third inner side part 32 by using one or more coils. This is not limited in this embodiment of this application.

It should be noted that, the projection of the target conducting wire that is constituted by the first outer side part 11, the first connection part L1, and the third inner side part 32 crosses the projection of the target conducting wire that is constituted by the first inner side part 12, the second connection part L2, and the third outer side part 31 on the plane on which the first planar coil winding 1 (or the second planar coil winding 2) is located, the fourth outer side part 41 and the third outer side part 31 are connected to each other, and the fourth inner side part 42 and the third inner side part 32 are connected to each other, therefore, when a magnetic field passes through the gap between the first outer side part 11 and the first inner side part 12 and passes through the gap between the fourth outer side part 41 and the fourth inner side part 42, a direction of an induced current generated on the first outer side part 11 and the fourth inner side part 42 is opposite to that of an induced current generated on the fourth outer side part 41 and the first inner side part 12. Therefore, the induced currents can cancel out at least a part of each other, thereby effectively reducing a circulating current loss in the first planar coil winding 1 and the second planar coil winding 2, and improving wireless charging efficiency of the coil module.

It should be noted that, in addition to a serial cross-connection structure formed by using the first connection part L1 and the second connection part L2, the coil module may further include other structures, for example, a parallel cross-connection structure formed by any coil of the first planar coil winding 1 and any coil of the second planar coil winding 2, and a first conducting wire and a second conducting wire that are used to connect the first planar coil winding 1 and the second planar coil winding 2 to an external circuit. For these structures, refer to related descriptions in the foregoing embodiments. Details are not described in this embodiment of this application again.

In this embodiment of this application, the coil module includes the first connection part L1, the second connection part L2, and the first planar coil winding 1 and the second planar coil winding 2 that are insulated from each other. The first planar coil winding 1 includes the first segment and the second segment along the winding direction of the first planar coil winding 1. There is the opening between the first segment and the second segment. The first segment includes the first outer side part 11 and the first inner side part 12. The second segment includes the second outer side part 21 and the second inner side part 22. The first connection part L1 is located between the first outer side part 11 and the second inner side part 22. The first outer side part 11 and the second inner side part 22 are connected to each other by using the first connection part L1. The second planar coil winding 2 includes the third segment. Along the thickness direction of the first planar coil winding 1, the end part that is of the third segment and that is close to the first segment at least partially overlaps the end part that is of the second segment and that is close to the first segment. The third segment includes the third outer side part 31 and the third inner side part 32. The second connection part L2 is located between the third outer side part 31 and the first inner side part 12. The third outer side part 31 and the first inner side part 12 are connected to each other by using the second connection part L2. The end that is of the third outer side part 31 and that is close to the first inner side part 12 is connected to the end that is of the second outer side part 21 and that is close to the first inner side part 12. In this way, on the plane on which the first planar coil winding 1 (or the second planar coil winding 2) is located, the projection of the target conducting wire that is constituted by the first outer side part 11, the first connection part L1, and the second inner side part 22 crosses the projection of the target conducting wire that is constituted by the first inner side part 12, the second connection part L2, and the second outer side part 21. In this case, when a magnetic field passes through the gap between the first outer side part 11 and the first inner side part 12 and passes through the gap between the second outer side part 21 and the second inner side part 22, a direction of an induced current generated on the first outer side part 11 and the second inner side part 22 is opposite to that of an induced current generated on the second outer side part 21 and the first inner side part 12. Therefore, the induced currents can cancel out at least a part of each other, thereby effectively reducing a circulating current loss in the first planar coil winding 1 and the second planar coil winding 2, and improving wireless charging efficiency of the coil module.

Figure 29:
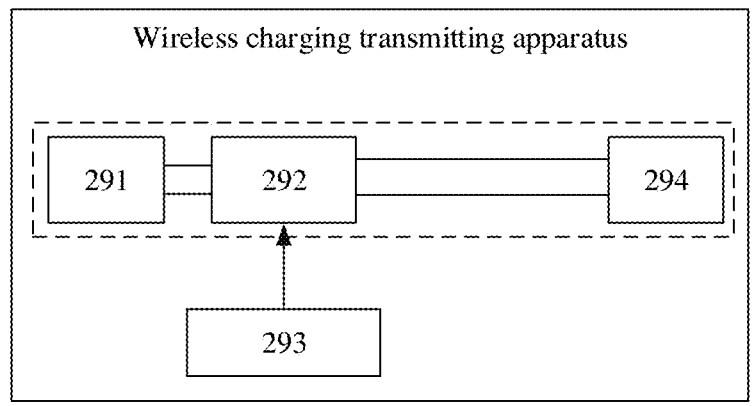
FIG. 29 is a schematic structural diagram of a first wireless charging transmitting apparatus according to an embodiment of this application.

FIG. 29 is a schematic structural diagram of a wireless charging transmitting apparatus according to an embodiment of this application. Referring to FIG. 29, the wireless charging transmitting apparatus includes a direct current/alternating current conversion circuit 292, a control unit 293, and a coil module 294 that is shown in any one of FIG. 3 to FIG. 28.

An input end of the direct current/alternating current conversion circuit 292 is connected to a direct current power source 291. Under control of the control unit 293, the direct current/alternating current conversion circuit 292 converts a direct-current signal input by the direct current power source 291 into an alternating-current signal, and transmits the alternating-current signal to the coil module 294, so that the coil module 294 transmits the alternating-current signal.

An output end of the direct current/alternating current conversion circuit 292 is connected to the coil module 294. A control end of the control unit 293 is connected to a controlled end of the direct current/alternating current conversion circuit 292.

It should be noted that the wireless charging transmitting apparatus may wirelessly charge a wireless charging receiving apparatus. For example, the wireless charging transmitting apparatus may be a wireless charger.

When the wireless charging transmitting apparatus needs to wirelessly charge the wireless charging receiving apparatus, the control unit 293 may control the direct current/alternating current conversion circuit 292 to be switched on, so that the direct current/alternating current conversion circuit 292 starts to work, and converts the direct-current signal input by the direct current power source 291 into the alternating-current signal.

Figure 30:
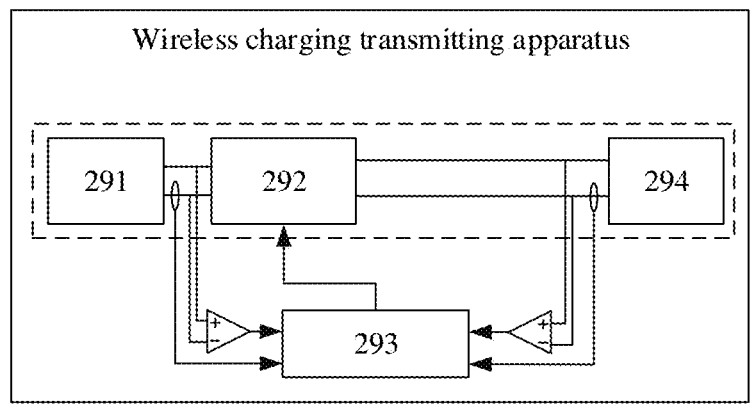
FIG. 30 is a schematic structural diagram of a second wireless charging transmitting apparatus according to an embodiment of this application.

Further, referring to FIG. 30, a first voltage detection end of the control unit 293 is connected to the direct current power source 291, a second voltage detection end of the control unit 293 is connected to the coil module 294, a first current detection end of the control unit 293 is connected to the direct current power source 291, and a second current detection end of the control unit 293 is connected to the coil module 294.

In this case, the control unit 293 may detect a voltage and current of the direct current power source 291, and detect a voltage and current of the coil module 294, and then control the direct current/alternating current conversion circuit 292 based on the detected voltages and currents.

Figure 31:
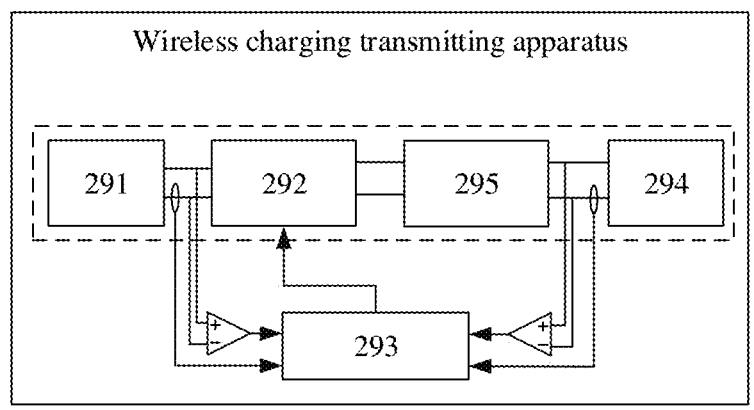
FIG. 31 is a schematic structural diagram of a third wireless charging transmitting apparatus according to an embodiment of this application.

Further, referring to FIG. 31, the wireless charging transmitting apparatus further includes a matching circuit 295. The matching circuit 295 is connected between the direct current/alternating current conversion circuit 292 and the coil module 294, and is configured to resonate with the coil module 294, so that the alternating-current signal output by the direct current/alternating current conversion circuit 292 can be efficiently transmitted to the coil module 294.

Figure 32:
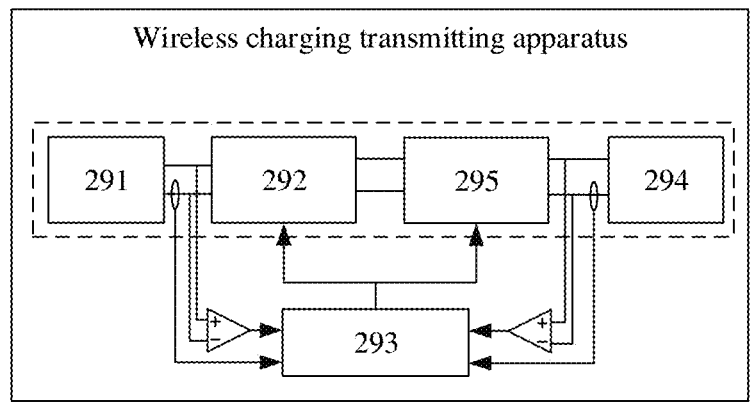
FIG. 32 is a schematic structural diagram of a fourth wireless charging transmitting apparatus according to an embodiment of this application.

Further, referring to FIG. 32, the control end of the control unit 293 is connected to a controlled end of the matching circuit 295.

In this case, when the wireless charging transmitting apparatus needs to wirelessly charge the wireless charging receiving apparatus, the control unit 293 may control the matching circuit 295 to be switched on, so that the matching circuit 295 starts to work, and resonates with the coil module 294.

In this embodiment of this application, the wireless charging transmitting apparatus includes the coil module 294. A circulating current loss in a first planar coil winding and a second planar coil winding included in the coil module 294 is relatively small. Therefore, wireless charging efficiency of the wireless charging transmitting apparatus can be improved.

Figure 33:
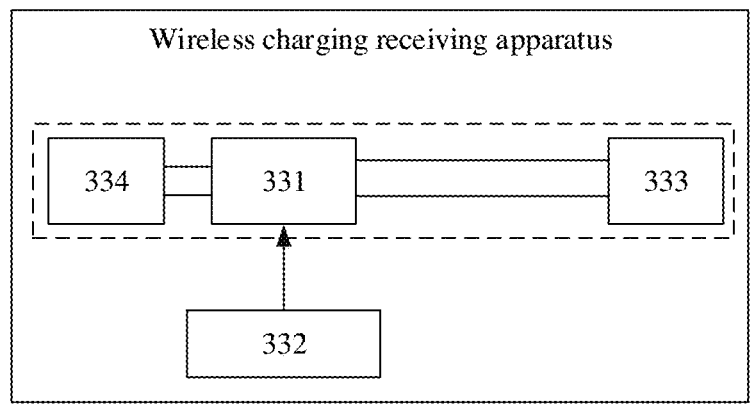
FIG. 33 is a schematic structural diagram of a first wireless charging receiving apparatus according to an embodiment of this application.

FIG. 33 is a schematic structural diagram of a wireless charging receiving apparatus according to an embodiment of this application. Referring to FIG. 33, the wireless charging receiving apparatus includes an alternating current/direct current conversion circuit 331, a control unit 332, a load 333, and a coil module 334 that is shown in any one of FIG. 3 to FIG. 21.

The coil module 334 is connected to an input end of the alternating current/direct current conversion circuit 331. The coil module 334 receives an alternating-current signal, and transmits the alternating-current signal to the alternating current/direct current conversion circuit 331. Under control of the control unit 332, the alternating current/direct current conversion circuit 331 converts the alternating-current signal into a direct-current signal, and outputs the direct-current signal to the load 333, to supply power to the load 333.

An output end of the alternating current/direct current conversion circuit 331 is connected to the load 333. A control end of the control unit 332 is connected to a controlled end of the alternating current/direct current conversion circuit 331.

It should be noted that the wireless charging receiving apparatus may be wirelessly charged by using a wireless charging transmitting apparatus. For example, the wireless charging receiving apparatus may be an electronic device such as a mobile phone or a tablet computer.

When the wireless charging receiving apparatus needs to be wirelessly charged by using the wireless charging transmitting apparatus, the control unit 332 may control the alternating current/direct current conversion circuit 331 to be switched on, so that the alternating current/direct current conversion circuit 331 starts to work, converts the alternating-current signal input by the coil module 334 into the direct-current signal, and outputs the direct-current signal to the load 333.

Figure 34:
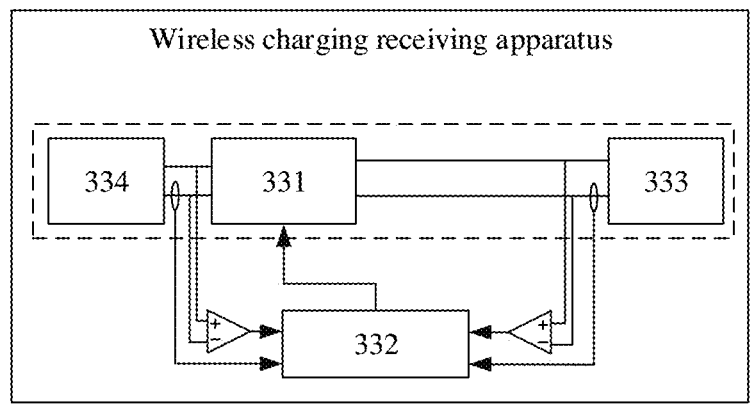
FIG. 34 is a schematic structural diagram of a second wireless charging receiving apparatus according to an embodiment of this application.

Further, referring to FIG. 34, a first voltage detection end of the control unit 332 is connected to the coil module 334, a second voltage detection end of the control unit 332 is connected to the load 333, a first current detection end of the control unit 332 is connected to the coil module 334, and a second current detection end of the control unit 332 is connected to the load 333.

In this case, the control unit 332 may detect a voltage and current of the coil module 334, and detect a voltage and current of the load 333, and then control the alternating current/direct current conversion circuit 331 based on the detected voltages and currents.

Figure 35:
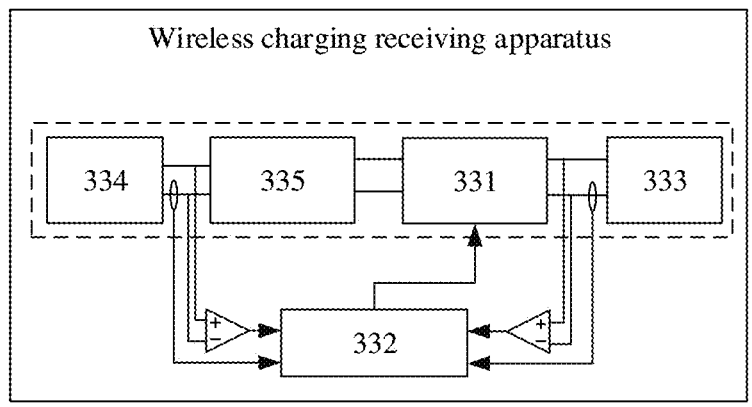
FIG. 35 is a schematic structural diagram of a third wireless charging receiving apparatus according to an embodiment of this application.

Further, referring to FIG. 35, the wireless charging receiving apparatus further includes a matching circuit 335. The matching circuit 335 is connected between the coil module 334 and the alternating current/direct current conversion circuit 331, and is configured to resonate with the coil module 334, so that the alternating-current signal output by the coil module 334 can be efficiently transmitted to the alternating current/direct current conversion circuit 331.

Figure 36:
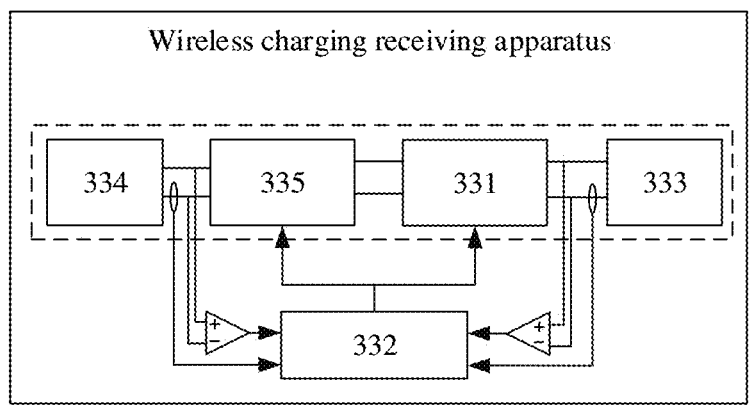
FIG. 36 is a schematic structural diagram of a fourth wireless charging receiving apparatus according to an embodiment of this application.

Further, referring to FIG. 36, the control end of the control unit 332 is connected to a controlled end of the matching circuit 335.

In this case, when the wireless charging receiving apparatus needs to be wirelessly charged by using the wireless charging transmitting apparatus, the control unit 332 may control the matching circuit 335 to be switched on, so that the matching circuit 335 starts to work, and resonates with the coil module 334.

In this embodiment of this application, the wireless charging receiving apparatus includes the coil module 334. A circulating current loss in a first planar coil winding and a second planar coil winding included in the coil module 334 is relatively small. Therefore, wireless charging efficiency of the wireless charging receiving apparatus can be improved.

Figure 37:
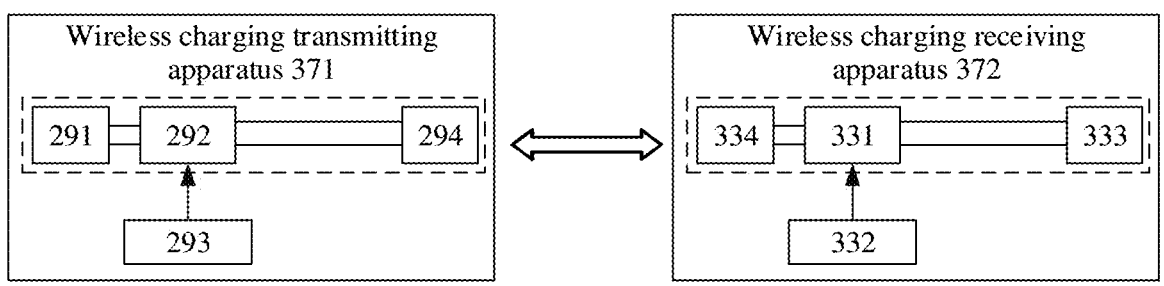
FIG. 37 is a schematic structural diagram of a wireless charging system according to an embodiment of this application.

FIG. 37 is a schematic structural diagram of a wireless charging system according to an embodiment of this application. Referring to FIG. 37, the wireless charging system includes a wireless charging transmitting apparatus 371 shown in any one of FIG. 29 to FIG. 32 and a wireless charging receiving apparatus 372 shown in any one of FIG. 33 to FIG. 36. The wireless charging transmitting apparatus is configured to wirelessly charge the wireless charging receiving apparatus.

It should be noted that, an alternating-current signal transmitted by a coil module in the wireless charging transmitting apparatus generates a magnetic field, and a coil module in the wireless charging receiving apparatus can generate a voltage through magnetic coupling, so that the wireless charging transmitting apparatus can wirelessly charge a load in the wireless charging receiving apparatus.

In this embodiment of this application, the wireless charging system includes the wireless charging transmitting apparatus and the wireless charging receiving apparatus. The wireless charging transmitting apparatus and the wireless charging receiving apparatus each include a coil module. A circulating current loss in a first planar coil winding and a second planar coil winding included in the coil module is relatively small. Therefore, wireless charging efficiency of the wireless charging system can be improved.

Figure 38:
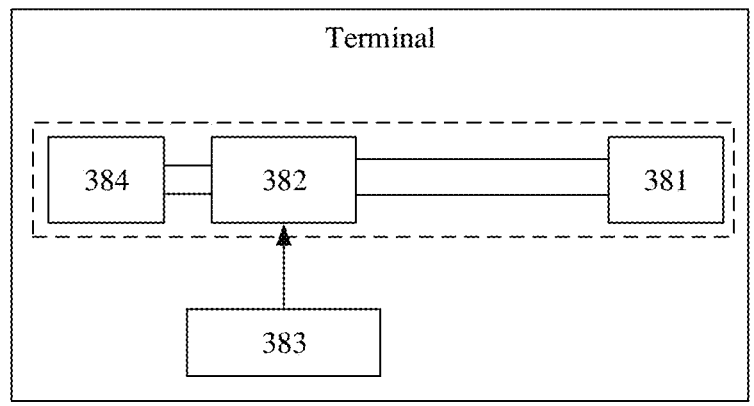
FIG. 38 is a schematic structural diagram of a first terminal according to an embodiment of this application.

FIG. 38 is a schematic structural diagram of a terminal according to an embodiment of this application. Referring to FIG. 38, the terminal includes a workload circuit 381, an alternating current/direct current conversion circuit 382, a charging control unit 383, and a coil module 384 that is shown in any one of FIG. 3 to FIG. 24.

The coil module 384 is connected to an input end of the alternating current/direct current conversion circuit 382. The coil module 384 receives an alternating-current signal, and transmits the alternating-current signal to the alternating current/direct current conversion circuit 382. Under control of the control unit 383, the alternating current/direct current conversion circuit 382 converts the alternating-current signal into a direct-current signal, and outputs the direct-current signal to the workload circuit 381.

An output end of the alternating current/direct current conversion circuit 382 is connected to the workload circuit 381. A control end of the charging control unit 383 is connected to a controlled end of the alternating current/direct current conversion circuit 382.

It should be noted that the terminal may be an electronic device such as a mobile phone or a tablet computer.

When the terminal needs to be wirelessly charged by using a wireless charger, the charging control unit 383 may control the alternating current/direct current conversion circuit 382 to be switched on, so that the alternating current/direct current conversion circuit 382 starts to work, converts the alternating-current signal input by the coil module 384 into the direct-current signal, and outputs the direct-current signal to the workload circuit 381.

Figure 39:
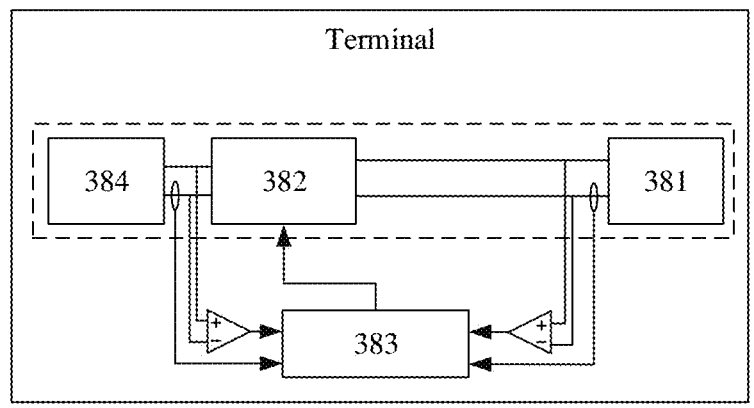
FIG. 39 is a schematic structural diagram of a second terminal according to an embodiment of this application.

Further, referring to FIG. 39, a first voltage detection end of the charging control unit 383 is connected to the coil module 384, a second voltage detection end of the charging control unit 383 is connected to the workload circuit 381, a first current detection end of the charging control unit 383 is connected to the coil module 384, and a second current detection end of the charging control unit 383 is connected to the workload circuit 381.

In this case, the charging control unit 383 may detect a voltage and current of the coil module 384, and detect a voltage and current of the workload circuit 381, and then control the alternating current/direct current conversion circuit 382 based on the detected voltages and currents.

Figure 40:
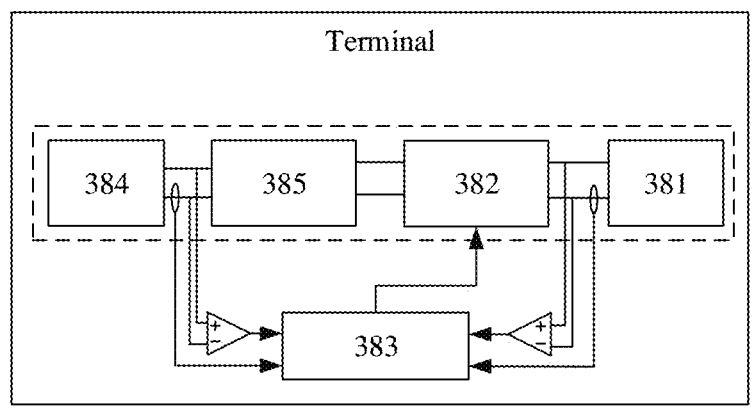
FIG. 40 is a schematic structural diagram of a third terminal according to an embodiment of this application.

Further, referring to FIG. 40, the terminal further includes a matching circuit 385. The matching circuit 385 is connected between the coil module 384 and the alternating current/direct current conversion circuit 382, and is configured to resonate with the coil module 384, so that the alternating-current signal output by the coil module 384 can be efficiently transmitted to the alternating current/direct current conversion circuit 382.

Figure 41:
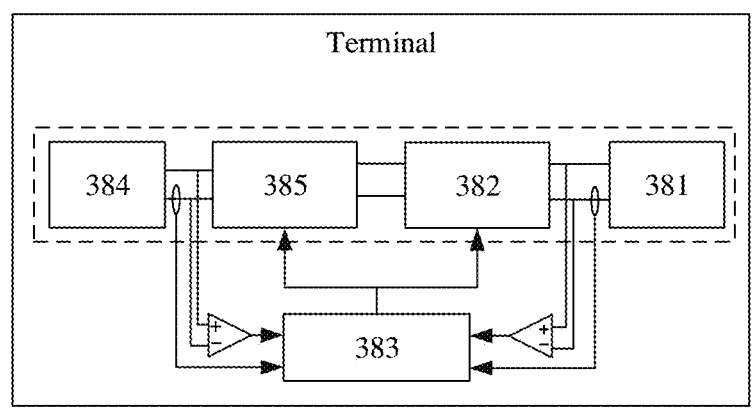
FIG. 41 is a schematic structural diagram of a fourth terminal according to an embodiment of this application.

Further, referring to FIG. 41, the control end of the charging control unit 383 is connected to a controlled end of the matching circuit 385.

In this case, when the terminal needs to be wirelessly charged by using a wireless charger, the charging control unit 383 may control the matching circuit 385 to be switched on, so that the matching circuit 385 starts to work, and resonates with the coil module 384.

In this embodiment of this application, the terminal includes the coil module 384. A circulating current loss in a first planar coil winding and a second planar coil winding included in the coil module 384 is relatively small. Therefore, wireless charging efficiency of the terminal can be improved.

The foregoing descriptions are the embodiments provided in this application, but are not intended to limit this application. Any modification, equivalent replacement, or improvement made without departing from the spirit and principle of this application shall fall within the protection scope of this application.

What is claimed is:
1. A coil module, comprising:
a first planar coil winding completely disposed in a first plane; and
a second planar coil winding completely disposed in a second plane spaced apart from the first plane, wherein the first planar coil winding and the second planar coil winding are insulated from each other, and wherein the first planar coil winding and the second planar coil winding each comprise a plurality of coils;

wherein a first coil of the first planar coil winding comprises a first outer side part and a first inner side part, wherein an end part of the first coil of the first planar coil winding comprises an end part of the first outer side part that is a termination of the first outer side part, and further comprises an end part of the first inner side part that is a termination of the first inner side part, and wherein a first gap extends along a coiling direction of the first coil of the first planar coil winding and between the first outer side part and the first inner side part;

wherein a first coil of the second planar coil winding comprises a second outer side part and a second inner side part, wherein an end part of the first coil of the second planar coil winding comprises an end part of the second outer side part that is a termination of the second outer side part and further comprises an end part of the second inner side part that is a termination of the second inner side part, and wherein a second gap extends along a coiling direction of the first coil of the second planar coil winding and between the second outer side part and the second inner side part;

wherein the end part of the first outer side part is electrically connected to the end part of the second inner side part, and wherein the end part of the second outer side part is electrically connected to the end part of the first inner side part; and wherein the first coil of the first planar coil winding is arranged according to at least one of:

the first planar coil winding is an innermost coil of the first planar coil winding, and the first coil of the second planar coil winding is an innermost coil of the second planar coil winding; or the first coil of the first planar coil winding is an outermost coil of the first planar coil winding, and the first coil of the second planar coil winding is an outermost coil of the second planar coil winding.

2. The module according to claim 1, wherein the end part of the first outer side part and the end part of the second inner side part are connected to each other through at least one first via hole.

3. The module according to claim 1, wherein the end part of the second outer side part and the end part of the first inner side part are connected to each other through at least one second via hole.

4. The module according to claim 1, further comprising a first connection part;

wherein the first connection part is disposed between the first outer side part and the second inner side part, and wherein the end part of the first outer side part and the end part of the second inner side part are connected to each other by the first connection part.

5. The module according to claim 1, further comprising a second connection part;

wherein the second connection part is disposed between the second outer side part and the first inner side part, and wherein the end part of the second outer side part and the end part of the first inner side part are connected to each other by the second connection part.

6. The module according to claim 1, further comprising:

a third connection part; and a fourth connection part;

wherein elements of the first planar coil winding, other than the first outer side part and the first inner side part, comprise a first segment and a second segment, wherein a first opening is disposed between the first segment and the second segment, wherein the first segment comprises a third outer side part and a third inner side part, wherein a third gap extends along a coiling direction of the first segment and between the third outer side part and the third inner side part, wherein the second segment comprises a fourth outer side part and a fourth inner side part, and wherein a fourth gap extends along a coiling direction of the second segment and between the fourth outer side part and the fourth inner side part;

wherein elements of the second planar coil winding, other than the second outer side part and the second inner side part, comprise a third segment and a fourth segment, wherein a second opening is disposed between the third segment and the fourth segment, wherein the third segment comprises a fifth outer side part and a fifth inner side part, wherein a fifth gap extends along a coiling direction of the third segment and between the fifth outer side part and the fifth inner side part, wherein the fourth segment comprises a sixth outer side part and a sixth inner side part, and wherein a sixth gap extends along a coiling direction of the fourth segment and between the sixth outer side part and the sixth inner side part; and wherein the third outer side part and the fifth outer side part are connected in parallel, wherein the third inner side part and the fifth inner side part are connected in parallel, wherein the fourth outer side part and the sixth outer side part are connected in parallel, wherein the fourth inner side part and the sixth inner side part are connected in parallel, wherein the third connection part is disposed between the third outer side part and the fourth inner side part, wherein the third outer side part and the fourth inner side part are connected to each other by the third connection part, wherein the fourth connection part is disposed between the fifth inner side part and the sixth outer side part, and wherein the fifth inner side part and the sixth outer side part are connected to each other by the fourth connection part.

7. The module according to claim 6, wherein the first segment and the second segment are located at an $N^{th}$ coil of the first planar coil winding, wherein the third segment and the fourth segment are located at an $M^{th}$ coil of the second planar coil winding, wherein the $N^{th}$ coil is a coil between the innermost coil of the first planar coil winding and the outermost coil of the first planar coil winding, and wherein the $M^{th}$ coil is a coil between the innermost coil of the second planar coil winding and the outermost coil of the second planar coil winding; and wherein a first end of the $N^{th}$ coil extends to a second end of an $(N-1)$th coil in the first planar coil winding, wherein the $(N-1)$th coil is disposed at an inner side of the $N^{th}$ coil and is adjacent to the $N^{th}$ coil, wherein a third end of the $N^{th}$ coil extends to a fourth end of an $(N+1)^{th}$ coil in the first planar coil winding, wherein the $(N+1)^{th}$ coil is disposed at an outer side of the $N^{th}$ coil and is adjacent to the $N^{th}$ coil, wherein the $M^{th}$ coil has a third opening, other than the second opening between the third segment and the fourth segment, wherein a fifth end of an $(M-1)^{th}$ coil in the second planar coil winding passes through the third opening and extends to a sixth end of a $K^{th}$ coil that is in the second planar coil winding and that is disposed at an outer side of the $M^{th}$ coil, and wherein the $(M-1)^{th}$ coil is located at an inner side of the $M^{th}$ coil and is adjacent to the $M^{th}$ coil.

8. The module according to claim 1, wherein the first coil of the first planar coil winding is the innermost coil of the first planar coil winding, and wherein the first coil of the second planar coil winding is the innermost coil of the second planar coil winding, and wherein the module further comprises a first conducting wire and a second conducting wire;

wherein a first end of the first conducting wire is a first end of the module, wherein a second end of the first conducting wire is connected to an end part of a first target coil, wherein the first target coil is the last coil connected in series to an end part of the innermost coil of the first planar coil winding, and wherein first target coil is the last coil in the plurality of coils of the first planar coil winding in a sequence from the innermost coil to the outermost coil;

wherein a first end of the second conducting wire is a second end of the module, wherein a second end of the second conducting wire is connected to an end part of a second target coil, wherein the second target coil is the last coil connected in series to an end part of the innermost coil of the second planar coil winding, and wherein the second target coil is the last coil in the plurality of coils of the second planar coil winding in a sequence from the innermost coil to the outermost coil; and wherein a first one of the first end of the module or the second end of the module is a lead-in end, and wherein a second one of the first end of the module or the second end of the module is a lead-out end.

9. The module according to claim 8, wherein the first conducting wire comprises, along a length direction of the first conducting wire, a first conducting sub-wire and a second conducting sub-wire that are separate from each other, and wherein the first target coil comprises, along a coiling direction of the first target coil, a seventh outer side part and a seventh inner side part that are separate from each other; and wherein an end part of the seventh outer side part is connected to an end part of the first conducting sub-wire, and wherein an end part of the seventh inner side part is connected to an end part of the second conducting sub-wire.

10. The module according to claim 8, wherein the second conducting wire comprises, along a length direction of the second conducting wire, a third conducting sub-wire and a fourth conducting sub-wire that are separate from each other, and wherein the second target coil comprises, along a coiling direction of the second target coil, an eighth outer side part and an eighth inner side part that are separate from each other; and wherein an end part of the eighth outer side part is connected to an end part of the third conducting sub-wire, and wherein an end part of the eighth inner side part is connected to an end part of the fourth conducting sub-wire.

11. The module according to claim 1, wherein the first coil of the first planar coil winding is the outermost coil of the first planar coil winding, wherein the first coil of the second planar coil winding is the outermost coil of the second planar coil winding, and wherein the module further comprises a first conducting wire and a second conducting wire;

wherein a first end of the first conducting wire is a first end of the module, wherein a second end of the first conducting wire is connected to an end part of a third target coil, wherein the third target coil is the last coil connected in series to an end part of the outermost coil of the first planar coil winding, and wherein the third target coil is the last coil in the plurality of coils of the first planar coil winding in a sequence from the outermost coil to the innermost coil;

wherein a first end of the second conducting wire is a second end of the module, wherein a second end of the second conducting wire is connected to an end part of a fourth target coil, wherein the fourth target coil is the last coil connected in series to an end part of the outermost coil of the second planar coil winding, and wherein the fourth target coil is the last coil in the plurality of coils of the second planar coil winding in a sequence from the outermost coil to the innermost coil; and wherein a first one of the first end of the module and the second end of the module is a lead-in end, and wherein a second one of the first end of the module and the second end of the module is a lead-out end.

12. The module according to claim 11, wherein the first conducting wire comprises, along a length direction of the first conducting wire, a first conducting sub-wire and a second conducting sub-wire that are separate from each other, and wherein the third target coil comprises, along a coiling direction of the third target coil, a seventh outer side part and a seventh inner side part that are separate from each other; and wherein an end part of the seventh outer side part is connected to an end part of the first conducting sub-wire, and wherein an end part of the seventh inner side part is connected to an end part of the second conducting sub-wire.

13. The module according to claim 11, wherein the second conducting wire comprises, along a length direction of the second conducting wire, a third conducting sub-wire and a fourth conducting sub-wire that are separate from each other, and wherein the fourth target coil comprises, along a coiling direction of the fourth target coil, an eighth outer side part and an eighth inner side part that are separate from each other; and wherein an end part of the eighth outer side part is connected to an end part of the third conducting sub-wire, and wherein an end part of the eighth inner side part is connected to an end part of the fourth conducting sub-wire.

14. A wireless charging transmitting apparatus, comprising:
a direct current/alternating current conversion circuit;
a control unit; and
a coil module, wherein the coil module comprises a first planar coil winding completely disposed in a first plane and further comprises a second planar coil winding completely disposed in a second plane spaced apart from the first plane, wherein the first planar coil winding and the second planar coil winding are insulated from each other, and wherein the first planar coil winding and the second planar coil winding each comprise a plurality of coils;

wherein a first coil of the first planar coil winding comprises a first outer side part and a first inner side part, wherein an end part of the first coil of the first planar coil winding comprises an end part of the first outer side part that is a termination of the first outer side part and further comprises an end part of the first inner side part that is a termination of the first inner side part, and wherein a first gap extends along a coiling direction of the first coil of the first planar coil winding and between the first outer side part and the first inner side part;

wherein a first coil of the second planar coil winding comprises a second outer side part and a second inner side part, wherein an end part of the first coil of the second planar coil winding comprises an end part of the second outer side part that is a termination of the second outer side part and further comprises an end part of the second inner side part that is a termination of the second inner side part, and wherein a second gap extends along a coiling direction of the first coil of the second planar coil winding and between the second outer side part and the second inner side part;

wherein the end part of the first outer side part is electrically connected to the end part of the second inner side part, and wherein the end part of the second outer side part is electrically connected to the end part of the first inner side part;

wherein the first coil of the first planar coil winding is arranged according to at least one of:

the first coil of the first planar coil winding is an innermost coil of the first planar coil winding, and the first coil of the second planar coil winding is an innermost coil of the second planar coil winding; or the first coil of the first planar coil winding is an outermost coil of the first planar coil winding, and the first coil of the second planar coil winding is an outermost coil of the second planar coil winding;

wherein an input end of the direct current/alternating current conversion circuit is connected to a direct current power source; and wherein the direct current/alternating current conversion circuit is configured to, under control of the control unit, convert a direct-current signal input by the direct current power source into an alternating-current signal, and is further configured to transmit the alternating-current signal to the coil module, wherein transmission of the alternating-current signal to the coil module causes the coil module to transmit the alternating-current signal.

15. The apparatus according to claim 14, further comprising a matching circuit;

wherein the matching circuit is connected between the direct current/alternating current conversion circuit and the coil module, and wherein the matching circuit is configured to resonate with the coil module.

16. The apparatus according to claim 14, further comprising a first connection part disposed between the first outer side part and the second inner side part, wherein the end part of the first outer side part and the end part of the second inner side part are connected to each other by the first connection part.

17. The apparatus according to claim 14, further comprising a second connection part disposed between the second outer side part and the first inner side part, wherein the end part of the second outer side part and the end part of the first inner side part are connected to each other by the second connection part.

18. The apparatus according to claim 14, further comprising a third connection part and a fourth connection part;

wherein elements of the first planar coil winding, other than the first outer side part and the first inner side part, comprise a first segment and a second segment, wherein a first opening is disposed between the first segment and the second segment, wherein the first segment comprises a third outer side part and a third inner side part, wherein a third gap extends along a coiling direction of the first segment and between the third outer side part and the third inner side part, wherein the second segment comprises a fourth outer side part and a fourth inner side part, and wherein a fourth gap extends along a coiling direction of the second segment between the fourth outer side part and the fourth inner side part;

wherein elements of the second planar coil winding, other than the second outer side part and the second inner side part, comprise a third segment and a fourth segment, wherein a second opening is disposed between the third segment and the fourth segment, wherein the third segment comprises a fifth outer side part and a fifth inner side part, wherein a fifth gap extends along a coiling direction of the third segment and between the fifth outer side part and the fifth inner side part, wherein the fourth segment comprises a sixth outer side part and a sixth inner side part, and wherein a sixth gap extends along a coiling direction of the fourth segment and between the sixth outer side part and the sixth inner side part; and wherein the third outer side part and the fifth outer side part are connected in parallel, wherein the third inner side part and the fifth inner side part are connected in parallel, wherein the fourth outer side part and the sixth outer side part are connected in parallel, wherein the fourth inner side part and the sixth inner side part are connected in parallel, wherein the third connection part is disposed between the third outer side part and the fourth inner side part, wherein the third outer side part and the fourth inner side part are connected to each other by the third connection part, wherein the fourth connection part is disposed between the fifth inner side part and the sixth outer side part, and wherein the fifth inner side part and the sixth outer side part are connected to each other by the fourth connection part.

19. A wireless charging receiving apparatus, comprising:
an alternating current/direct current conversion circuit;
a control unit;
a load; and
a coil module, wherein the coil module comprises a first planar coil winding completely disposed in a first plane and a second planar coil winding completely disposed in a second plane spaced apart from the first plane, wherein the first planar coil winding and a second planar coil winding are insulated from each other, and wherein the first planar coil winding and the second planar coil winding each comprise a plurality of coils;

wherein a first coil of the first planar coil winding comprises a first outer side part and a first inner side part, wherein an end part of the first coil of the first planar coil winding comprises an end part of the first outer side part that is a termination of the first outer side part and further comprises an end part of the first inner side part that is a termination of the first inner side part, and wherein a first gap extends along a coiling direction of the first coil of the first planar coil winding and between the first outer side part and the first inner side part;

wherein a first coil of the second planar coil winding comprises a second outer side part and a second inner side part, wherein an end part of the first coil of the second planar coil winding comprises an end part of the second outer side part that is a termination of the second outer side part and further comprises an end part of the second inner side part that is a termination of the second inner side part, and wherein a second gap extends along a coiling direction of the first coil of the second planar coil winding and between the second outer side part and the second inner side part;

wherein the end part of the first outer side part is electrically connected to the end part of the second inner side part, and wherein the end part of the second outer side part is electrically connected to the end part of the first inner side part;

wherein the first coil of the first planar coil winding is arranged according to at least one of:
  the first coil of the first planar coil winding is an innermost coil of the first planar coil winding, and the first coil of the second planar coil winding is an innermost coil of the second planar coil winding; or
  the first coil of the first planar coil winding is an outermost coil of the first planar coil winding, and the first coil of the second planar coil winding is an outermost coil of the second planar coil winding;

wherein the coil module is connected to an input end of the alternating current/direct current conversion circuit;

wherein the coil module is configured to receive an alternating-current signal, and is further configured to transmit the alternating-current signal to the alternating current/direct current conversion circuit; and wherein the alternating current/direct current conversion circuit is configured to convert, under control of the control unit, the alternating-current signal into a direct-current signal, and is further configured to supply power to the load by outputting the direct-current signal to the load.

20. The wireless charging receiving apparatus according to claim 19, further comprising a matching circuit;
  wherein the matching circuit is connected between the coil module and the alternating current/direct current conversion circuit; and
  wherein the matching circuit is configured to resonate with the coil module.

\* \* \* \* \*